United States Patent
Kusukame et al.

(10) Patent No.: US 10,378,960 B2
(45) Date of Patent: *Aug. 13, 2019

(54) INFRARED DETECTING DEVICE

(71) Applicant: PANASONIC INTELLECTUAL PROPERTY MANAGEMENT CO., LTD., Osaka (JP)

(72) Inventors: Koichi Kusukame, Nara (JP); Nawatt Silawan, Osaka (JP); Aki Yoneda, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/365,026

(22) Filed: Mar. 26, 2019

(65) Prior Publication Data

US 2019/0219449 A1 Jul. 18, 2019

Related U.S. Application Data

(63) Continuation of application No. 15/004,024, filed on Jan. 22, 2016, now Pat. No. 10,288,488.

(30) Foreign Application Priority Data

| Feb. 6, 2015 | (JP) | ................................. 2015-022504 |
| Aug. 31, 2015 | (JP) | ................................. 2015-171574 |

(51) Int. Cl.
| *G01J 5/02* | (2006.01) |
| *G01J 5/04* | (2006.01) |
| *G01J 5/08* | (2006.01) |
| *G01J 5/20* | (2006.01) |

(52) U.S. Cl.
CPC ............... *G01J 5/20* (2013.01); *G01J 5/0205* (2013.01); *G01J 5/04* (2013.01); *G01J 5/045* (2013.01); *G01J 5/047* (2013.01); *G01J 5/048* (2013.01); *G01J 5/0806* (2013.01); *G01J 5/089* (2013.01); *G01J 2005/202* (2013.01)

(58) Field of Classification Search
CPC .... G01J 5/20; G01J 5/0205; G01J 5/04; G01J 5/045; G01J 5/047; G01J 5/048; G01J 5/0806; G01J 5/089; G01J 2005/202
USPC ................. 250/349, 338.3, DIG. 1, 332, 334
See application file for complete search history.

(56) References Cited

U.S. PATENT DOCUMENTS

| 3,889,117 A | 6/1975 | Shaw, Jr. |
| 5,281,818 A | 1/1994 | Tomita et al. |
| 5,541,414 A | 7/1996 | Hori |
| 5,585,631 A | 12/1996 | Deguchi et al. |
| 5,660,471 A | 8/1997 | Yoshiike et al. |

(Continued)

FOREIGN PATENT DOCUMENTS

| JP | 6-094535 | 4/1994 |
| JP | 6-258137 | 9/1994 |

(Continued)

*Primary Examiner* — David P Porta
*Assistant Examiner* — Blake C Riddick
(74) *Attorney, Agent, or Firm* — Greenblum & Bernstein, P.L.C.

(57) ABSTRACT

An infrared detecting device includes: an infrared sensor that has one or more infrared detection elements arranged in one or more columns; and an IC chip that performs signal processing on a signal output from the infrared sensor. The infrared sensor and the IC chip are generally juxtaposed in a direction along a scan rotation axis of the infrared sensor.

7 Claims, 45 Drawing Sheets

(56) References Cited

U.S. PATENT DOCUMENTS

| | | |
|---|---|---|
| 2011/0175100 A1 | 7/2011 | Tsuji et al. |
| 2011/0175145 A1 | 7/2011 | Tsuji et al. |
| 2012/0018639 A1 | 1/2012 | Matsumoto et al. |
| 2012/0049067 A1 | 3/2012 | Takahashi et al. |
| 2013/0093037 A1 | 4/2013 | Kirihara et al. |
| 2013/0126739 A1 | 5/2013 | Oi et al. |
| 2014/0254880 A1 | 9/2014 | Srinivasan et al. |
| 2015/0168219 A1 | 6/2015 | Itoh et al. |
| 2015/0204556 A1 | 7/2015 | Kusukame et al. |
| 2016/0079293 A1 | 3/2016 | Ishii et al. |
| 2016/0146665 A1 | 5/2016 | Silawan et al. |

FOREIGN PATENT DOCUMENTS

| | | |
|---|---|---|
| JP | 7-209309 | 8/1995 |
| JP | 8-062044 | 3/1996 |
| JP | 11-281475 | 10/1999 |
| JP | 2006-177848 | 7/2006 |
| JP | 2010-078451 | 4/2010 |
| JP | 2010-078452 | 4/2010 |
| JP | 2010-216688 | 9/2010 |
| JP | 2011-174762 | 9/2011 |
| JP | 2012-008003 | 1/2012 |
| JP | 2013-024745 | 2/2013 |
| JP | 2014-102093 | 6/2014 |
| WO | 2014/185033 | 11/2014 |

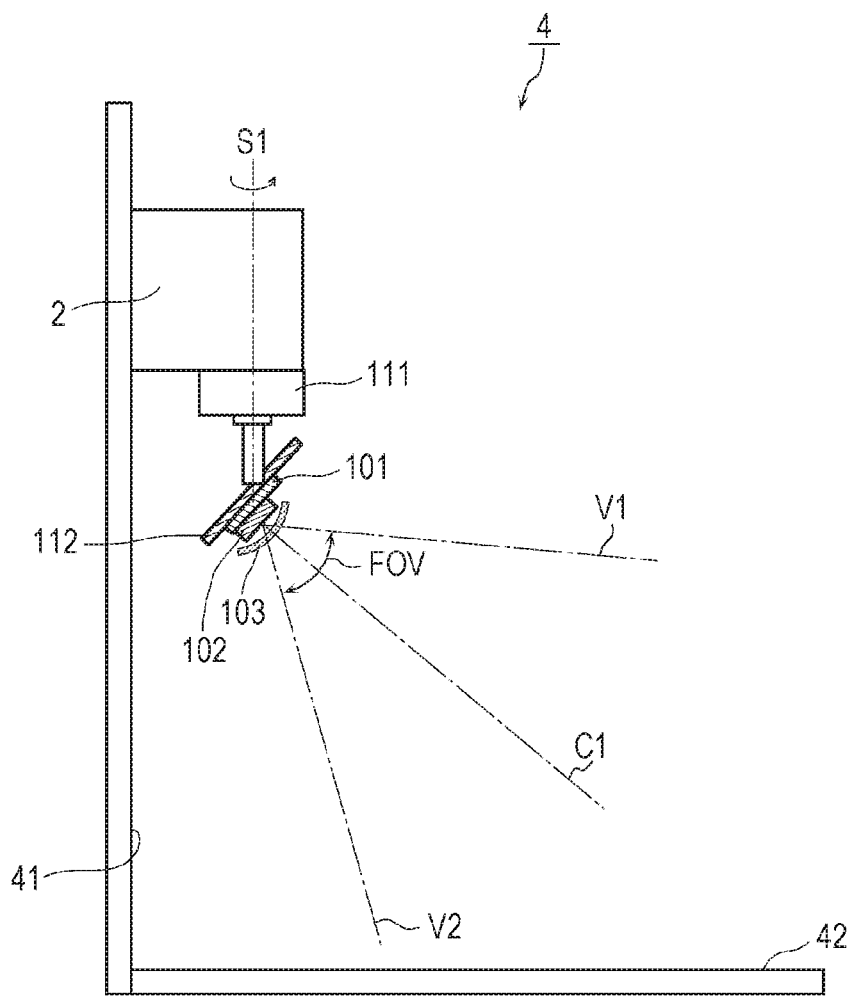

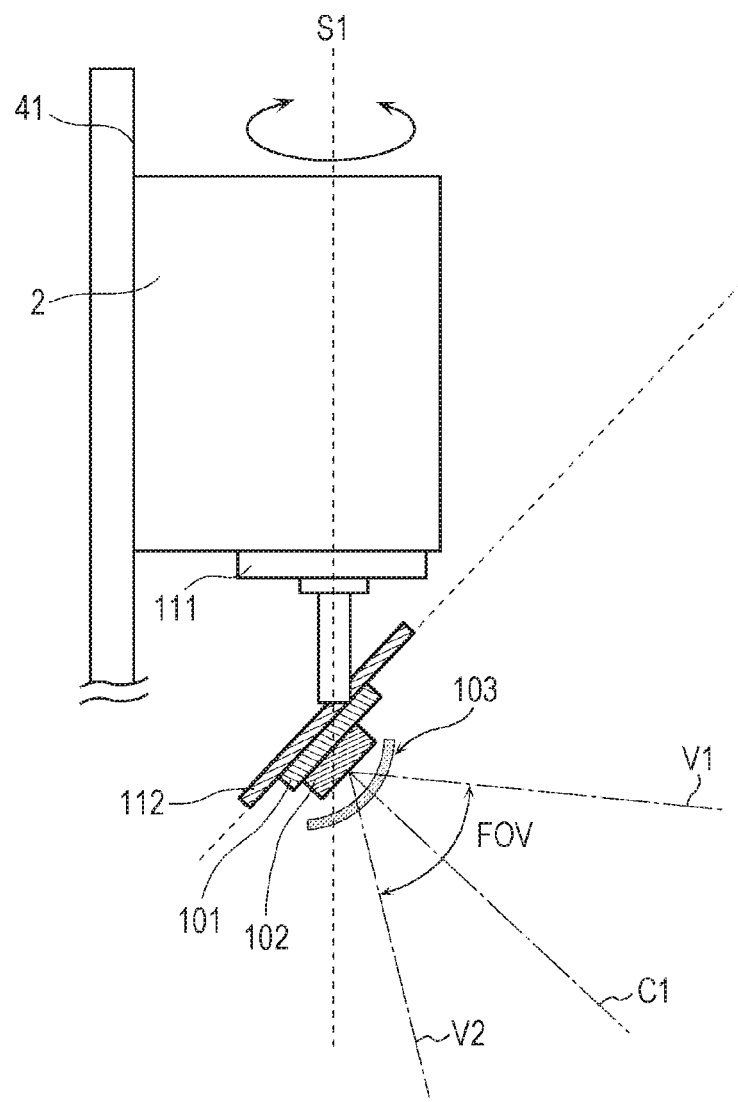

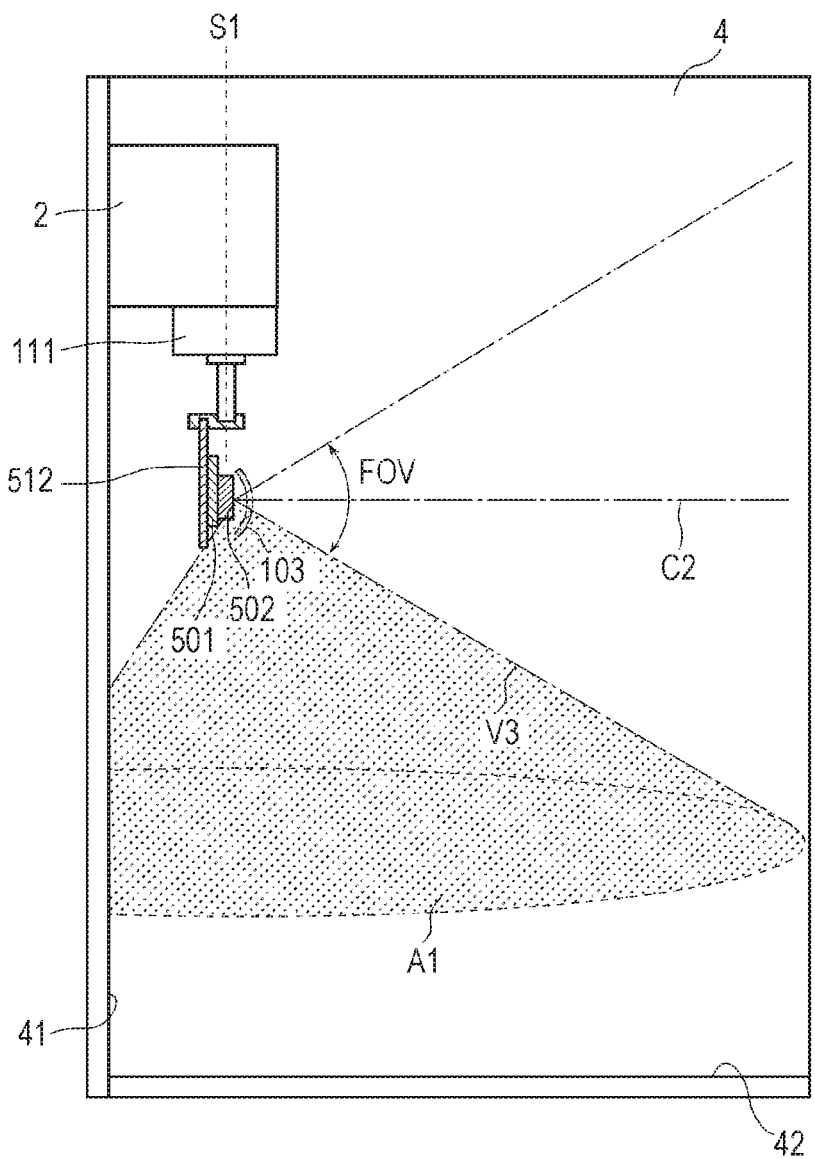

FIG. 16

| ROW NUMBER | HORIZONTAL DIMENSION | VERTICAL DIMENSION EXAMPLE 1 | VERTICAL DIMENSION EXAMPLE 2 |
|---|---|---|---|
| 1 | 1.00 | 1.00 | 0.75 |
| 2 | 0.99 | 1.00 | 0.75 |
| 3 | 0.98 | 1.00 | 0.75 |
| 4 | 0.97 | 1.00 | 0.75 |
| 5 | 0.95 | 1.00 | 0.75 |
| 6 | 0.92 | 1.00 | 0.75 |
| 7 | 0.90 | 1.00 | 0.75 |
| 8 | 0.87 | 1.00 | 0.75 |
| 9 | 0.83 | 1.00 | 0.75 |
| 10 | 0.79 | 1.00 | 0.75 |
| 11 | 0.75 | 1.00 | 0.75 |
| 12 | 0.71 | 1.00 | 0.75 |
| 13 | 0.66 | 1.00 | 0.75 |
| 14 | 0.61 | 1.00 | 0.75 |
| 15 | 0.56 | 1.00 | 0.75 |
| 16 | 0.50 | 1.00 | 0.75 |

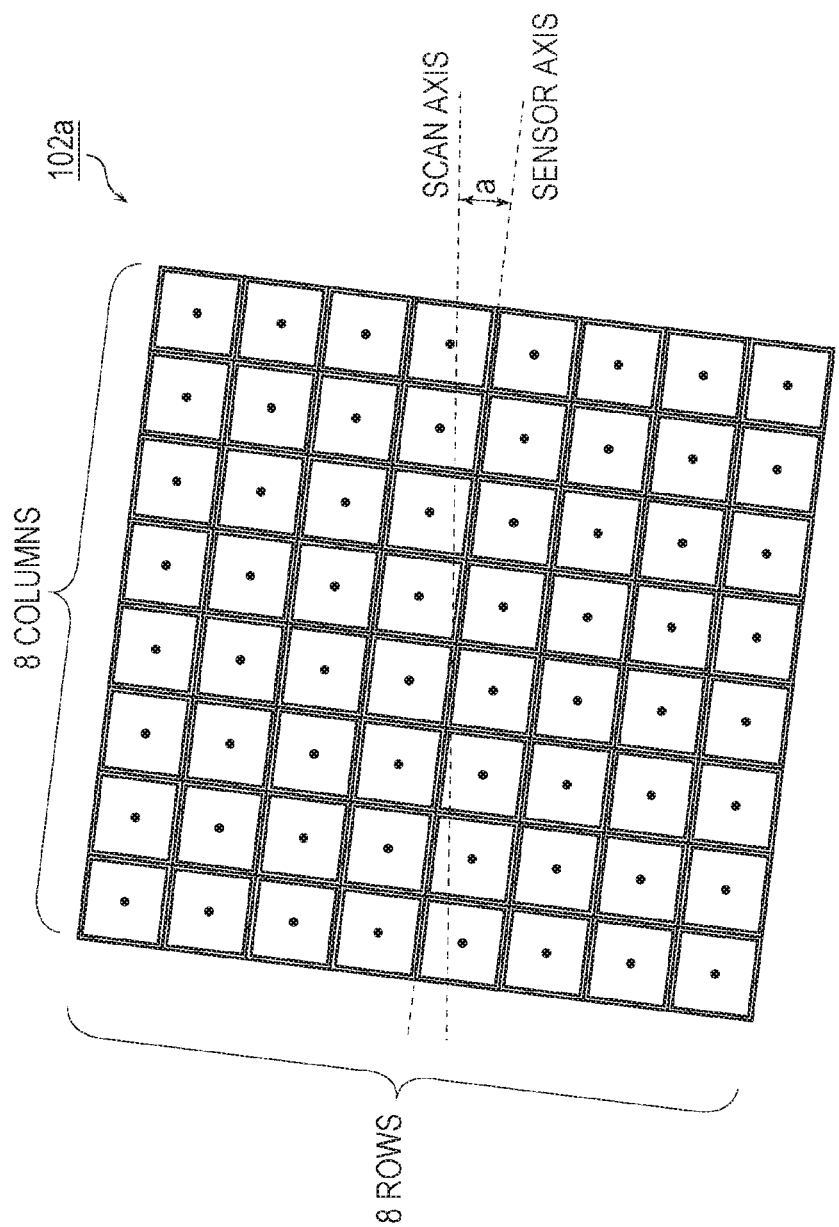

FIG. 41A
FIG. 41B
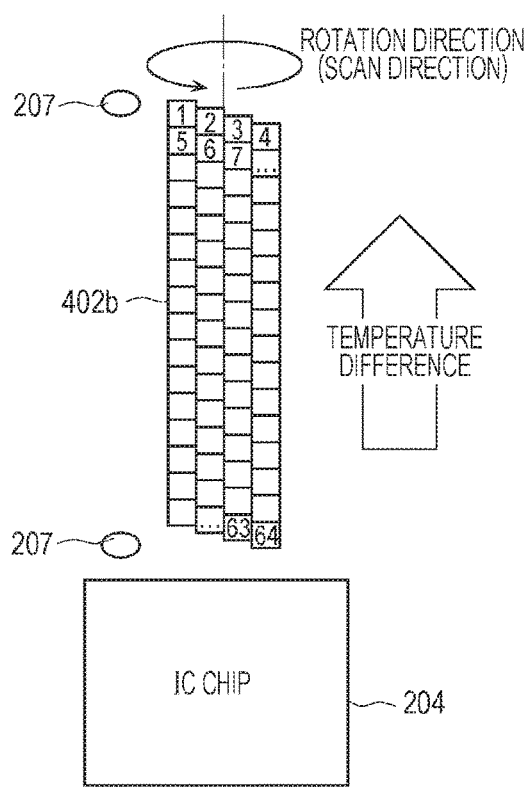
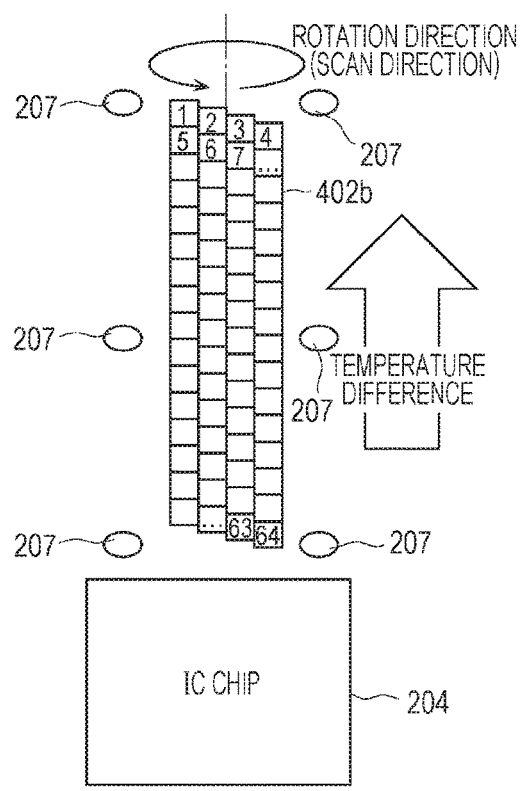

INFRARED DETECTING DEVICE

CROSS REFERENCE TO RELATED APPLICATION

This is a continuation application of U.S. patent application Ser. No. 15/004,024, filed on Jan. 22, 2016, which claims the benefit of Japanese Patent Application No. 2015-022504, filed on Feb. 6, 2015, and Japanese Patent Application No. 2015-171574, filed on Aug. 31, 2015. The disclosure of each of the above-identified applications, including the specification, drawings, and claims, is incorporated herein by reference in its entirety.

BACKGROUND

1. Technical Field

The present disclosure relates to an infrared detecting device that is capable of detecting infrared rays.

2. Description of the Related Art

There are proposed technologies in which an infrared sensor is attached to an air-conditioning apparatus, such as a room air conditioner, and two-dimensional thermal-image data obtained by the infrared sensor is used to perform air conditioning (see, for example, Japanese Patent No. 5111417, which is hereinafter referred to as "Patent Document 1").

Patent Document 1 discloses a technology in which air-conditioning equipment installed at a height of 1800 mm from the floor surface of a room is provided with an infrared sensor having light-receiving elements arranged in a vertical line.

SUMMARY

In one general aspect, the techniques disclosed here feature an infrared detecting device that includes: an infrared sensor that has one or more infrared detection elements arranged in one or more columns; and an IC chip that performs signal processing on a signal output from the infrared sensor. The infrared sensor and the IC chip are generally juxtaposed in a direction along a scan rotation axis of the infrared sensor.

According to the present disclosure, it is possible to provide an infrared detecting device that can increase a detection range in an area near and below the position where the infrared detecting device is disposed.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a schematic view illustrating a state in which the housing to which the infrared detecting device in the first embodiment is attached is installed;

FIG. 4 is a schematic view illustrating the physical configuration of the infrared detecting device in the first embodiment;

FIG. 5B is a schematic view for describing a dead angle area of the infrared detecting device in comparative example illustrated in FIG. 5A;

FIG. 16 is a table illustrating one example of infrared detection elements constituting the infrared sensor in the fifth modification of the second embodiment;

FIG. 20 is a diagram illustrating one example of an infrared sensor in an illustrative example of the fourth embodiment;

FIG. 41A is a schematic view illustrating an example of an arrangement of thermistors in the sixth embodiment;

FIG. 41B is a schematic view illustrating one example of an arrangement of thermistors in the sixth embodiment;

DETAILED DESCRIPTION (Knowledge Underlying Present Disclosure)

In the technology disclosed in Patent Document 1, since the infrared sensor is provided at a position above measurement objects, such as people and heat sources, there is a problem in that the area near and below the infrared sensor is not in a detection range.

In view of the foregoing problem, the present disclosure provides an infrared detecting device that can increase the detection range in the area near and below the position where the infrared detecting device is disposed.

An infrared detecting device and so on according to one aspect of the present disclosure will be described in detail with reference to the accompanying drawings. Embodiments described below all represent specific examples of the present disclosure. Numerical values, shapes, materials, constituent elements, the arrangement positions of constituent elements, and so on described in the embodiments below are merely examples and are not intended to limit the present disclosure. Of the constituent elements in the embodiments below, constituent elements not set forth in the independent claims that represent the broadest concept will be described as optional constituent elements.

(First Embodiment)

[Configuration of Infrared Detecting Device]

An infrared detecting device in a first embodiment will be described below with reference to the accompanying drawings.

Figure 1:
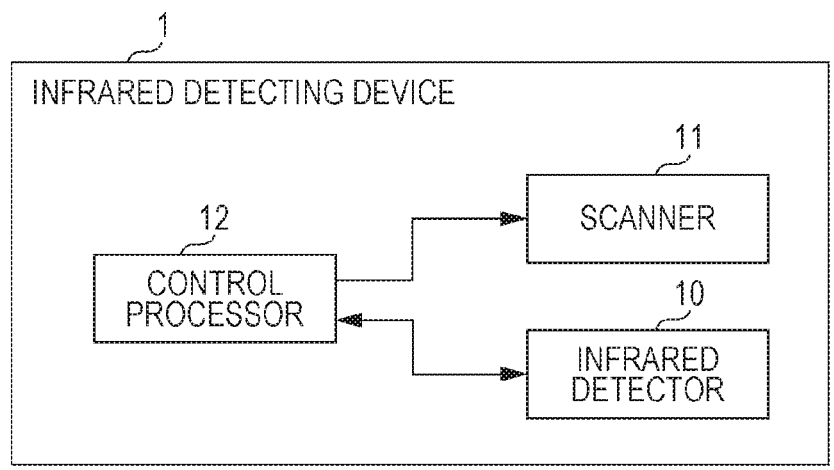
FIG. 1 is a diagram illustrating one example of the configuration of an infrared detecting device in a first embodiment.
Figure 2:
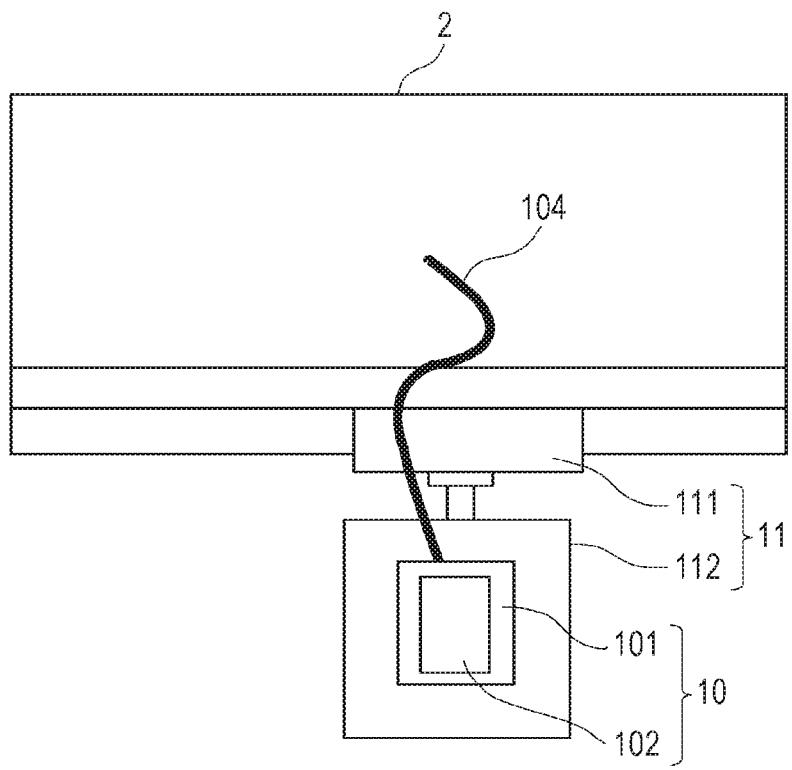
FIG. 2 is a schematic view of a physical configuration when the infrared detecting device in the first embodiment is attached to a housing.

FIG. 1 is a diagram illustrating one example of the configuration of an infrared detecting device in the first embodiment. FIG. 2 is a schematic view of a physical configuration when the infrared detecting device in the present embodiment is attached to a housing. FIG. 3 is a schematic view illustrating a state in which the housing to which the infrared detecting device in the present embodiment is attached is installed. FIG. 4 is a schematic view illustrating the physical configuration of the infrared detecting device in the present embodiment.

An infrared detecting device 1 is attached to a housing 2, which is installed on an installation surface 41 that is generally orthogonal to a bottom surface 42 of space 4 and that is located at a predetermined height from the bottom surface 42, as illustrated in FIG. 3, to acquire a thermal image of a detection range. The "thermal image" as used herein refers to an image constituted by a plurality of pixels indicating the distribution of temperatures in a temperature detection range. The "predetermined height" refers to, for example, a height that is larger than a temperature detection targets (measurement targets), such as people or heat sources, and is, for example, 1800 mm or more. The housing 2 is, for example, the housing of air-conditioning equipment, such as an air conditioner. The housing 2 analyzes states in a room, such as the positions of people, the positions of heat sources, and a thermal sensation, by using the thermal image acquired by the infrared detecting device 1 and controls any of a blowing direction, an air volume, a temperature, and a humidity on the basis of the analyzed states in the room. The space 4 is, for example, a room, the bottom surface 42 is, for example, the floor surface of the room, and the installation surface 41 is, for example, a wall surface of a room.

As illustrated in FIG. 1, the infrared detecting device 1 includes an infrared detector 10, a scanner 11, and a control processor 12.

The scanner 11 has a scan rotation axis S1 (illustrated in FIG. 3) and rotates an infrared sensor 102 about the scan rotation axis S1 to thereby cause the infrared sensor 102 to scan the space 4. The scan rotation axis S1 is generally parallel to the installation surface 41. In the present embodiment, the scanner 11 includes a motor 111 and a mount base 112, as illustrated in FIGS. 2 to 4.

Under the control of the control processor 12, the motor 111 rotates the mount base 112 about the scan rotation axis S1 to thereby cause the infrared sensor 102 to rotate about the scan rotation axis S1. The motor 111 is, for example, a stepping motor or a servo motor.

A sensor module 101, described below, is mounted on the mount base 112. The mount base 112 is disposed so as to have an inclination relative to the scan rotation axis S1. The inclination may be, for example, about 30°.

The scanner 11 rotates the infrared detector 10 about the scan rotation axis S1 to thereby cause the infrared detector 10 to scan a temperature detection range in the space 4. In the present embodiment, the infrared detector 10 includes the sensor module 101, which has the infrared sensor 102, and a cover 103, as illustrated in FIGS. 2 to 4.

The sensor module 101 is provided with a lens (not illustrated) in addition to the infrared sensor 102 and is electrically connected to the housing 2 through a wiring line 104 (illustrated in FIG. 2). The sensor module 101 is attached to the mount base 112 of the scanner 11.

The lens (not illustrated) is made of silicon or zinc sulfide (ZnS) having a high infrared transmittance. The lens is designed so that infrared rays (infrared light) that enter the lens from individual directions are incident on one or more infrared detection elements constituting the infrared sensor 102.

The infrared sensor 102 is rotated about the scan rotation axis S1, as illustrated in FIG. 4, to scan the temperature detection range in the space 4 and outputs thermal images (infrared terminal images) of the scanned temperature detection range to the control processor 12. More specifically, the infrared sensor 102 is constituted by one or more infrared detection elements arranged in one or more columns and detects infrared rays in the temperature detection range in the space 4 scanned by the one or more infrared detection elements.

The arrangement plane of the one or more infrared detection elements is arranged so as to have an inclination relative to the installation surface 41. In other words, the arrangement plane is arranged so as to have an inclination relative to the scan rotation axis S1. The center (a lens center) of the arrangement plane has a rotation center through which the scan rotation axis S1 passes, that is, a rotation center when the infrared sensor 102 is rotated about the scan rotation axis S1. In addition, the arrangement plane intersects the scan rotation axis S1. Thus, for example, as illustrated in FIG. 3, a central axis C1 of the field of view of the infrared sensor 102 is directed from the direction orthogonal to the installation surface 41 toward the bottom surface 42, that is, is directed downward.

Now, a comparative example will be described.

Figure 5A:
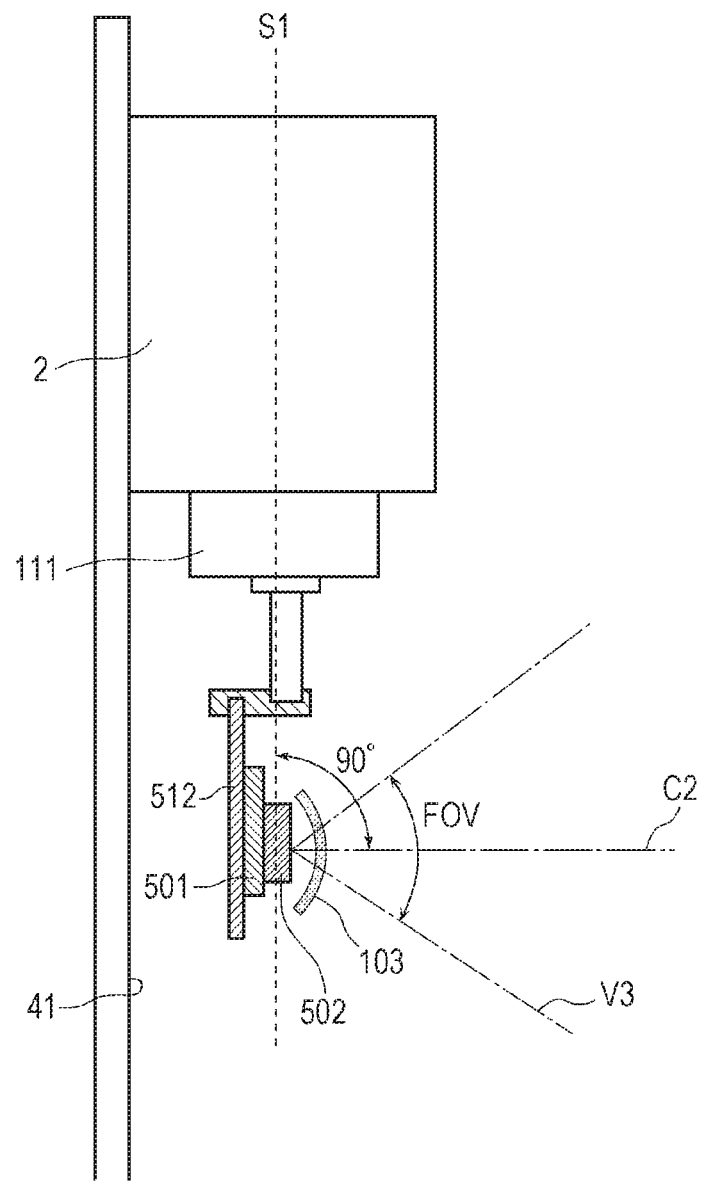
FIG. 5A is a schematic view of a physical configuration when an infrared detecting device in a comparative example is attached to the housing.

FIG. 5A is a schematic view of a physical configuration when an infrared detecting device in a comparative example is attached to the housing. FIG. 5B is a schematic view for describing a dead angle area of the infrared detecting device in the comparative example illustrated in FIG. 5A. Elements that are the same as or similar to those in FIG. 3 are denoted by the same reference numerals, and detailed descriptions thereof are not given hereinafter.

In the infrared detecting device in the comparative example illustrated in FIGS. 5A and 5B, a mount base 512, a sensor module 501 mounted on the mount base 512, and an infrared sensor 502 provided on the sensor module 501 are arranged along (parallel to) the scan rotation axis S1, unlike the infrared detecting device 1 in the present embodiment. The configuration of the mount base 512, the sensor module 501, and the infrared sensor 502 in the comparative example is substantially the same as that of the mount base 112, the sensor module 101, and the infrared sensor 102 in the present embodiment, except for the above-described arrangement, and thus detailed descriptions thereof are not given hereinafter.

As illustrated in FIG. 5B, a central axis C2 of the field of view of the infrared sensor 502 is parallel to the direction orthogonal to the installation surface 41 (i.e., is parallel to the bottom surface 42). As illustrated in FIGS. 5A and 5B, the scan rotation axis S1 passes along the arrangement plane of the infrared sensor 502, and the infrared sensor 502 is rotated about the scan rotation axis S1 that passes along the arrangement plane. Thus, an area A1 below a lowest-end main light ray V3, which is a main light ray at a lowest end that is included in the effective viewing angle (angle of view) of the infrared sensor 502 and that is the closest to the bottom surface 42 is in a dead angle, that is, is out of the range of detection.

On the other hand, as illustrated in FIGS. 3 and 4, the infrared sensor 102 in the present embodiment is arranged with an inclination relative to the scan rotation axis S1, the scan rotation axis S1 passes through the center of the infrared sensor 102, and the scan rotation axis S1 and the infrared sensor 102 intersect each other. Thus, the central axis C1 of the field of view of the infrared sensor 102 is inclined downward. That is, the central axis C1 of the field of view of the infrared sensor 102 is inclined more downward than the central axis C2 of the field of view of the infrared sensor 502. Thus, the infrared sensor 102 is rotated about the scan rotation axis S1, with the central axis C1 of the field of view being maintained at the same angle relative to the bottom surface 42.

Thus, the area near and below the position where the infrared sensor 102 is disposed is included in the effective viewing angle (angle of view). In other words, the area located in a dead angle and below a lowest-end main light ray V2, which is a main light ray at a lowest end that is included in the effective viewing angle (angle of view) of the infrared sensor 102 and that is the closest to the bottom surface 42, is reduced, compared with that in the infrared sensor 502 in the comparative example. Thus, the infrared sensor 102 in the present embodiment can increase the detection range in the area near and below the position where the infrared sensor 102 is disposed.

The cover 103 is made of infrared transmitting material, such as polyethylene or silicon, and covers the infrared sensor 102 (the lens).

The control processor 12 controls the scanner 11, processes thermal images (input images) acquired by the infrared detector 10, and outputs a resulting thermal image to a computing device included in the housing 2. The control processor 12 may be included in the computing device in the housing 2.

In this case, the control processor 12 performs distortion correction on the thermal images acquired by the infrared detector 10 and then performs processing for obtaining thermal-image data indicating the positions and the temperatures of heat sources in the temperature detection range on the basis of the thermal image on which distortion correction is performed. Examples of the positions and the temperatures of the heat sources include the positions of people, the temperatures of a user's hand and face, and the temperatures of walls. This is because, when the infrared sensor 102 is rotated about the scan rotation axis S1, the thermal image output from the infrared sensor 102 has distortion, since the rotational speeds (rotational pitches) of an upper end and a lower end of the infrared sensor 102, when viewed from the bottom surface 42, differ from each other.

The control processor 12 may generate a high-definition thermal image (an output image) by performing super resolution processing on the thermal images (input images) acquired by the infrared detector 10 and recombining the thermal images (the input images). In this case, the control processor 12 can output the generated high-definition thermal image, that is, the thermal image on which the super resolution processing is performed. The "super resolution processing" as used herein is one type of resolution-enhancement processing that can generate high-resolution information (an output image) that is not included in an input image. A processing method for acquiring a single high-resolution image from a plurality of images and a processing method using learning data are available as the super resolution processing. In the present embodiment, the scanner 11 causes the infrared detector 10 to perform scanning to thereby allow acquisition of a thermal image (with sub-pixel position displacement) of a temperature detection range, that is, thermal-image data of different sample points.

[Advantages, Etc. of First Embodiment]

As described above, the infrared detecting device in the present embodiment includes the infrared sensor whose central axis of the field of view is inclined relative to the scan rotation axis S1. This makes it possible to increase the detection range in the area near and below the position where the infrared detecting device in the present embodiment is disposed.

(Second Embodiment)

Although a case in which the control processor 12 performs distortion correction processing on the thermal image output from the infrared sensor 102 has been described above in the first embodiment, the present disclosure is not limited thereto. One or more infrared detection elements constituting the infrared sensor 102 may be formed considering the inclination relative to the scan rotation axis S1, to eliminate the need for the control processor 12 to perform the distortion correction processing. Such a case will be described below.

Figure 6:
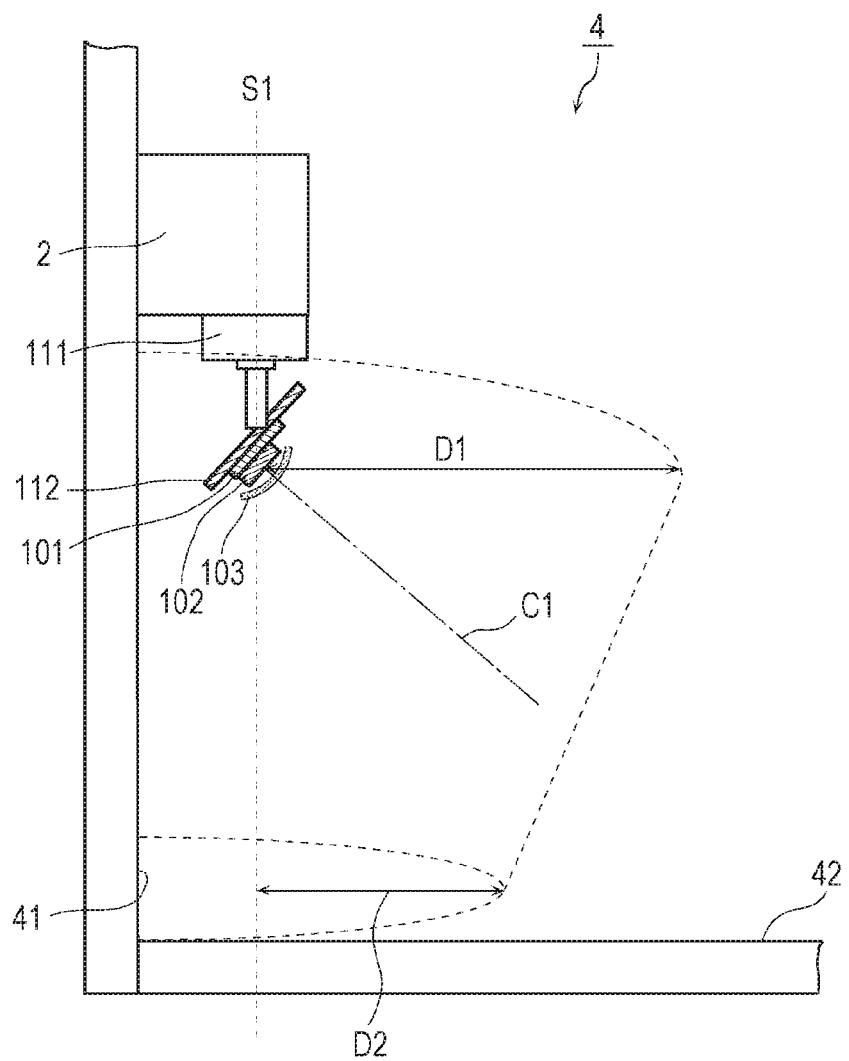
FIG. 6 is a schematic view for describing that distortion occurs in a thermal image acquired by scanning performed by the infrared sensor in the first embodiment.

FIG. 6 is a schematic view for describing that distortion occurs in a thermal image acquired through scanning performed by the infrared sensor in the first embodiment.

When the infrared sensor 102 is rotated about the scan rotation axis S1, the rotational speeds (rotational pitches) of an upper end and a lower end of the infrared sensor 102, when viewed from the bottom surface 42, differ from each other. For example, it is assumed that the infrared sensor 102 is constituted by infrared detection elements arranged in a matrix, and the sizes of the infrared detection elements are equal to each other. In this case, since the rotational speed of the infrared detection elements in the row at the upper end is higher than the rotational speed of the infrared detection elements in the row at the lower end, the scan density (resolution) at the upper end (indicated by D1 in FIG. 6) is lower than that at the lower end (indicated by D2 in FIG. 6). That is, the scan area covered by one infrared detection element at the upper end (indicated by D1 in FIG. 6) is larger than that covered by one infrared detection element at the lower end (indicated by D2 in FIG. 6). In this case, the control processor 12 corrects (performs distortion correction on) differences between the scan densities (resolutions) of the infrared detection elements at the upper end and the lower end, to thereby make the resolutions of thermal images acquired to become equal to each other.

In the present embodiment, the horizontal dimensions of the infrared detection elements (pixels) constituting the infrared sensor are changed so that the control processor 12 does not need to perform the distortion correction. A description will be given in detail.

[Configuration of Infrared Sensor]

Figure 7:
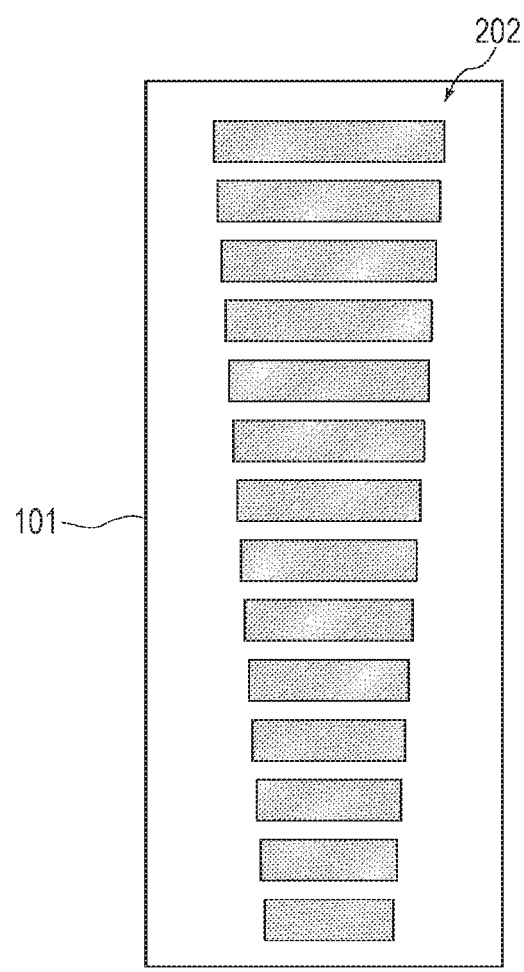
FIG. 7 is a diagram illustrating one example of the configuration of an infrared sensor in a second embodiment.

FIG. 7 is a diagram illustrating one example of the configuration of an infrared sensor in a second embodiment.

An infrared sensor 202 in the present embodiment has a plurality of infrared detection elements arranged in one or more columns and is formed such that a horizontal edge of each of the infrared detection elements in each column, the horizontal edge being generally parallel to the bottom surface 42, has a smaller dimension as the infrared detection element is located closer to the bottom surface 42. FIG. 7 illustrates one example of the infrared sensor 202 that is formed such that a plurality of infrared detection elements are arranged in one column, and the horizontal edge of each of the infrared detection elements, the horizontal edge being generally parallel to the bottom surface 42, has a smaller dimension as the infrared detection element is located closer to the bottom surface 42.

Now, a description will be given of a relationship of the dimensions of the horizontal edges of adjacent infrared detection elements.

Figure 8A:
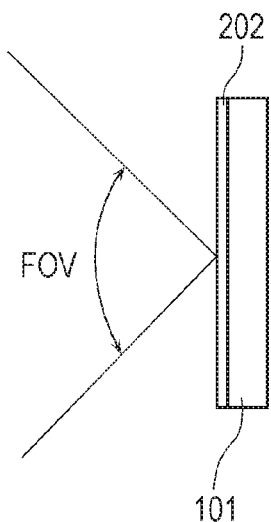
FIG. 8A is a diagram for describing a relationship of the dimensions of horizontal edges of adjacent infrared detection elements in the second embodiment.
Figure 8B:
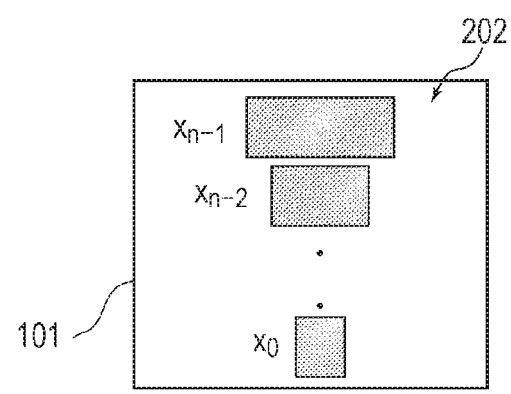
FIG. 8B is a diagram illustrating a relationship of the dimensions of the horizontal edges of the adjacent infrared detection elements in the second embodiment.

FIGS. 8A to 8D are diagrams for describing a relationship of the dimensions of the horizontal edges of adjacent infrared detection elements in the second embodiment. Elements that are the same as or similar to those in FIGS. 2 and 3 are denoted by the same reference numerals, and detailed descriptions thereof are not given hereinafter. FIG. 8A conceptually illustrates the field of view (FOV), that is, the effective viewing angle (angle of view), of the infrared sensor 202. FIG. 8B conceptually illustrates an example in which n infrared detection elements that constitute the infrared sensor 202 are arranged in one column.

Figure 8C:
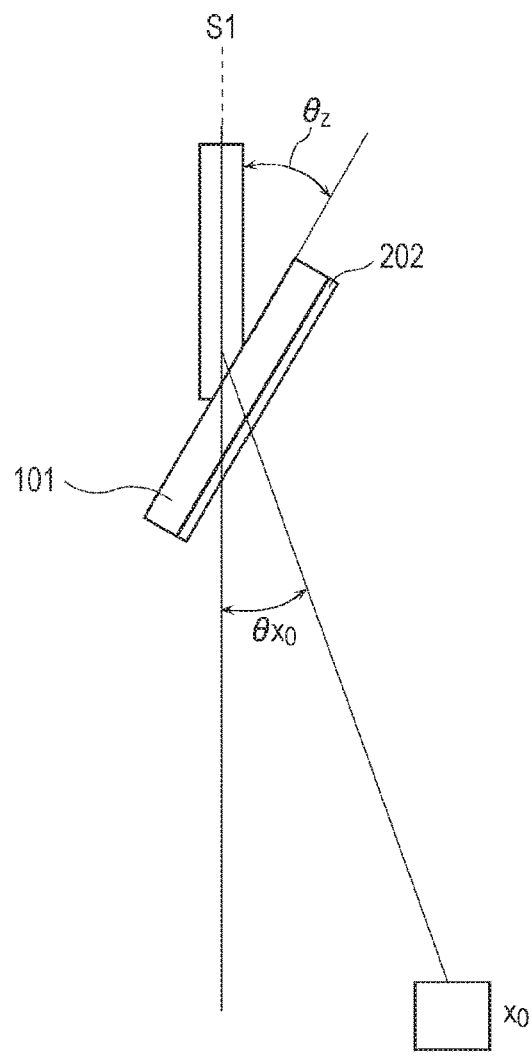
FIG. 8C is a diagram for describing a relationship of the dimensions of the horizontal edges of the adjacent infrared detection elements in the second embodiment.

As illustrated in FIG. 8C, the sensor module 101 having the infrared sensor 202 is inclined at an angle (vertex angle) of $\theta_z$ relative to the scan rotation axis S1. An infrared detection element $x_0$ illustrated in FIG. 8C represents, for example, the infrared detection element located at the lower end of the n infrared detection elements illustrated in FIG. 8B. A vertex angle between the scan rotation axis S1 and a main light ray at a lowest end that is included in the effective viewing angle (angle of view) of the infrared detection element $x_0$ and that is the closest to the bottom surface 42 is denoted as an angle $\theta_{x0}$. In this case, the relationship of angle $\theta_{x0}=90-FOV/2-\theta_z-(FOV/2n)$ holds.

Similarly, for example, an angle $\theta_{x1}$ between the scan rotation axis S1 and a main light ray at a lowest end that is included in the effective viewing angle (angle of view) of an infrared detection element $x_1$ adjacent (next) to the infrared detection element $x_0$ located at the bottom end of the n infrared detection elements and that is the closest to the bottom surface 42 has the following relationship. That is, the relationship of angle $\theta_{x1}=90-FOV/2-\theta_z-(FOV/2n)+1*(FOV/n)$ holds.

Similarly, an angle $\theta_{x2}$ between the scan rotation axis S1 and a main light ray at a lowest end that is included in the effective viewing angle (angle of view) of the infrared detection element $x_2$ adjacent (next) to the infrared detection element $x_1$ and that is the closest to the bottom surface 42 can be expressed as $90-FOV/2-\theta_z-(FOV/2n)+2*(FOV/n)$. An angle $\theta_{xm}$ between the scan rotation axis S1 and a main light ray at a lowest end that is included in the effective viewing angle (angle of view) of the mth infrared detection element $x_m$ from the infrared detection element $x_0$ and that is the closest to the bottom surface 42 can be expressed as $90-FOV/2-\theta_z-(FOV/2n)+m*(FOV/n)$.

Figure 8D:
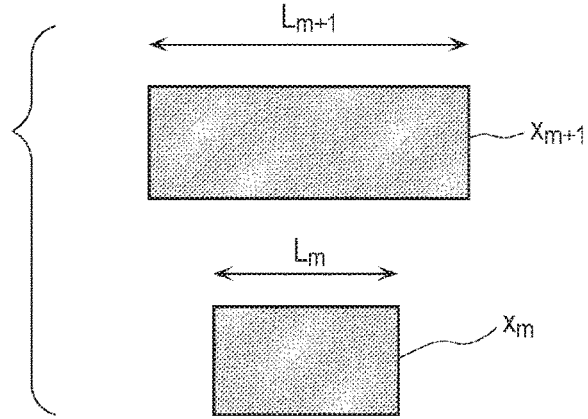
FIG. 8D is a diagram illustrating a relationship of the dimensions of the horizontal edges of the adjacent infrared detection elements in the second embodiment.

FIG. 8D conceptually illustrates adjacent infrared detection elements.

The horizontal dimensions of the infrared detection elements satisfy the relationship given by:

$$L_{m+1}/L_{m+2}=\sin(\theta_m)/\operatorname{Sin}(\theta_{m+1}) \quad \text{(equation 1)}$$

where $L_m$ represents the horizontal dimension of the mth infrared detection element $x_m$ from the infrared detection element at the bottom end of the n infrared detection elements, and $L_{m+1}$ represents the horizontal dimension of the infrared detection element $x_{m+1}$ that is adjacent to the infrared detection element $x_m$ at a side away from the bottom surface 42.

When this is generalized, the dimensions of the horizontal edges of the infrared detection elements satisfy the relationship given by:

$$L_x/L_y=\sin(\theta_x)/\sin(\theta_y),$$

where $L_x$ represents the dimension of the horizontal edge of a particular one of the infrared detection elements in each column, $L_y$ represents the dimension of the horizontal edge of the infrared detection element that is adjacent to the particular infrared detection element at the bottom surface 42 side, $\theta_x$ represents the angle between the scan rotation axis S1 and a main light ray at a lowest end that is included in the angle of view of the particular infrared detection element and that is the closest to the bottom surface 42, and $\theta_y$ represents the angle between the scan rotation axis S1 and a main light ray at a lowest end that is included in the angle of view of the adjacent infrared detection element.

Forming a plurality of infrared detection elements constituting the infrared sensor 202 that satisfies the above-noted relationship allows the scan densities (resolutions) from the upper end to the lower end to be equal to each other even when the infrared detection elements in each row have a difference in the rotational speeds.

This can eliminate the need for the control processor 12 to perform the distortion correction as described above in the first embodiment. That is, since the control processor 12 does not need to perform the distortion correction, there are advantages in that the amount of memory used and the amount of computational load become zero.

Figure 9:
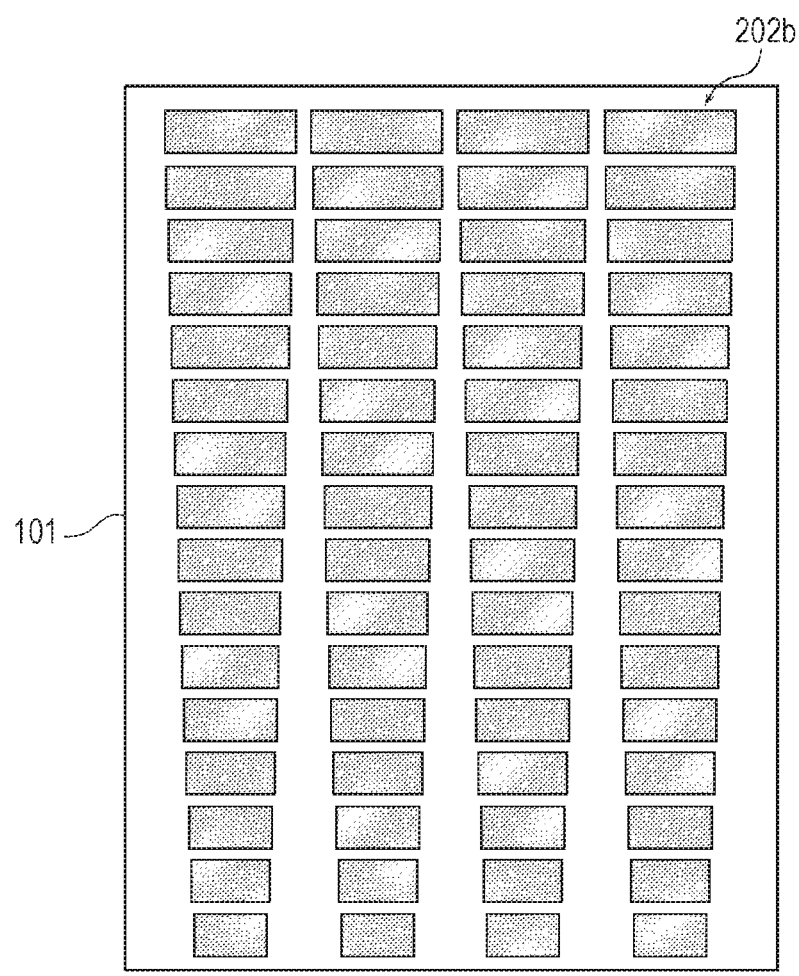
FIG. 9 is a diagram illustrating another example of the configuration of the infrared sensor in the second embodiment.

The infrared detection elements constituting the infrared sensor 202 are not limited to those illustrated in FIG. 7 and may be infrared detection elements as illustrated in FIG. 9.

FIG. 9 is a diagram illustrating another example of the configuration of the infrared sensor in the second embodiment.

An infrared sensor 202b illustrated in FIG. 9 has a plurality of infrared detection elements arranged in a plurality of columns is formed such that the horizontal edge of each of the infrared detection elements in each column, the horizontal edge being generally parallel to the bottom surface 42, has a smaller dimension as the infrared detection element is located closer to the bottom surface 42. More specifically, in the infrared sensor 202b illustrated in FIG. 9, infrared detection elements are arranged in three or more columns; the horizontal edge of each of the infrared detection elements in each column, the horizontal edge being generally parallel to the bottom surface 42, has a smaller dimension as the infrared detection element is located closer to the bottom surface 42; and the distance between the central positions of the infrared detection elements at corresponding positions in the adjacent columns of the three or more columns is constant. Since the relationship of the dimensions of the horizontal edges of the adjacent infrared detection elements in each column is substantially the same as that described above, a descriptions thereof is not given hereinafter.

[Advantages, Etc. of Second Embodiment]

As described above, the infrared detecting device in the present embodiment includes the infrared sensor 202 whose central axis of the field of view is inclined relative to the scan rotation axis S1. This can increase the detection range in the area near and below the position where the infrared detecting device is disposed.

Also, the infrared detecting device in the present embodiment has the infrared sensor 202 formed such that, the closer to the bottom surface 42, the smaller the dimension of the horizontal edges of the infrared detection elements in each column. Thus, even when the rotational speeds of the infrared detection elements in each row in the infrared sensor 202 whose central axis of the field of view is inclined relative to the scan rotation axis S1 are different from each other, the scan densities (resolutions) from the upper end to the lower end can be made equal to each other, there is an advantage in that the distortion correction on the thermal image is not necessary.

The infrared detection elements constituting the infrared sensor in the present embodiment are not limited to the cases illustrated in FIGS. 7 and 9, and other examples are described below as modifications.

(First Modification)

Figure 10:
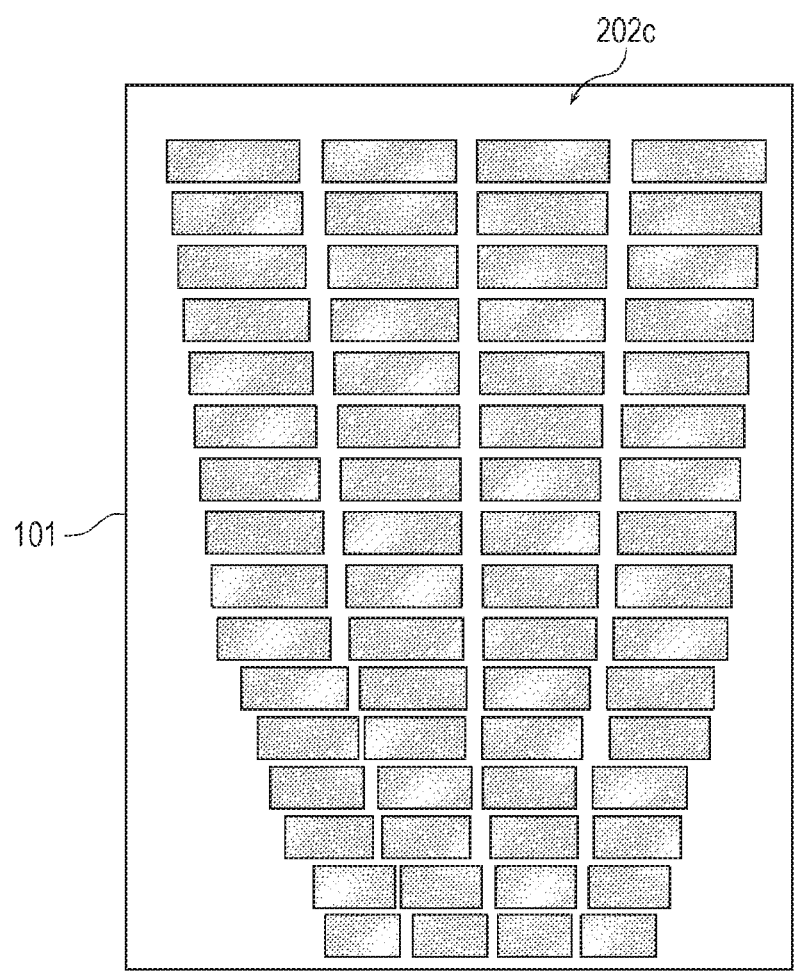
FIG. 10 is a diagram illustrating one example of the configuration of an infrared sensor in a first modification of the second embodiment.

FIG. 10 is a diagram illustrating one example of the configuration of an infrared sensor in a first modification of the second embodiment.

Although a case in which the spacing of the adjacent columns, that is, the gap between the centers of the infrared detection elements in the adjacent columns, is constant has been described above in the infrared sensor 202b illustrated in FIG. 9, the present disclosure is not limited thereto. As in an infrared sensor 202c illustrated in FIG. 10, the corresponding infrared detection elements in the adjacent columns may be formed such that, the closer to the bottom surface 42 the infrared detection elements are, the smaller the gap between the centers of the infrared detection elements is. That is, in the infrared sensor 202c illustrated in FIG. 10, the infrared detection elements may be arranged in three or more columns; the horizontal edge of each of the infrared detection elements in each of the column, the horizontal edge being generally parallel to the bottom surface 42, may have a smaller dimension as the infrared detection element is located closer to the bottom surface 42; and each of the infrared detection elements in each of the three or more columns may be located closer to a center of the three or more columns in a column direction (i.e., in a direction parallel to the scan axis) as the infrared detection element is located closer to the bottom surface 42. Since the relationship of the dimensions of the horizontal edges of the adjacent infrared detection elements in each column is substantially the same as that illustrated in FIG. 7, a description thereof is not given hereinafter.

With the arrangement described above, since the infrared sensor 202c in FIG. 10 allows the spacing of the adjacent columns (i.e., the gap between the corresponding infrared detection elements in the adjacent columns) to be reduced compared with the infrared sensor 202b illustrated in FIG. 9, it is possible to increase the scan density. That is, the infrared sensor 202c in FIG. 10 offers an advantage in that the scanning can be performed with high sensitivity, compared with the infrared sensor 202b illustrated in FIG. 9.

(Second Modification)

Figure 11A:
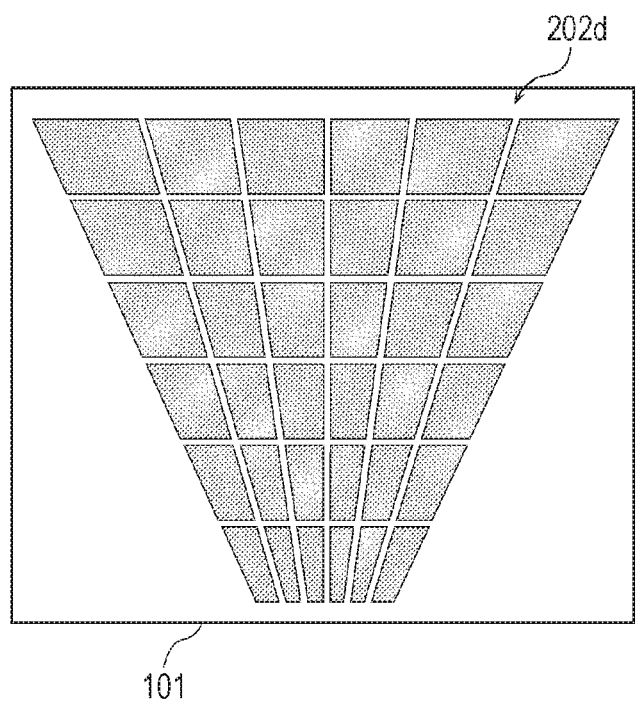
FIG. 11A is a diagram illustrating one example of the configuration of an infrared sensor in a second modification of the second embodiment.
Figure 11B:
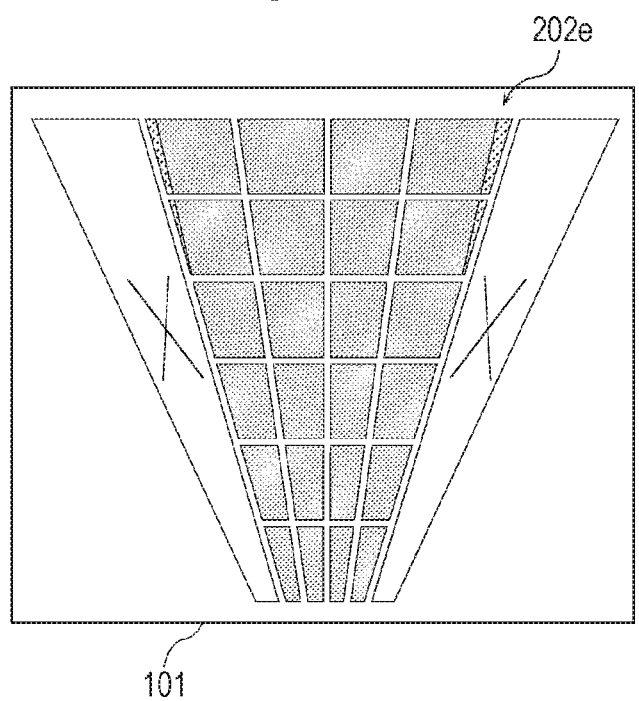
FIG. 11B is a diagram illustrating another example of the configuration of the infrared sensor in the second modification of the second embodiment.

FIG. 11A is a diagram illustrating one example of the configuration of an infrared sensor in a second modification of the second embodiment. FIG. 11B is a diagram illustrating another example of the configuration of the infrared sensor in the second modification of the second embodiment.

Although a case in which each of the infrared detection elements constituting the infrared sensor 202b illustrated in FIG. 9 has a rectangle shape has been described above, the infrared sensor 202b is not limited thereto. That is, as in an infrared sensor 202d as illustrated in FIG. 11A, each of the infrared detection elements constituting it may have a parallelogram shape. In addition, although the gap between the corresponding infrared detection elements in the adjacent columns in the infrared sensor 202d is constant, it may be formed such that, the closer to the bottom surface 42 the infrared detection elements are, the smaller the gap between the centers of the infrared detection elements in the adjacent columns is, as illustrated in FIG. 11A.

Thus, since the infrared sensor 202d in FIG. 11A allows the spacing of the adjacent columns (the gaps between the corresponding infrared detection elements in the adjacent columns) to be reduced compared with the infrared sensor 202c illustrated in FIG. 10, it is possible to increase the scan density. That is, the infrared sensor 202d in FIG. 11A offers an advantage in that the scanning can be performed with high sensitivity, compared with the infrared sensor 202c illustrated in FIG. 10.

Two opposite ends (in FIGS. 11A and 11B, left and right ends) in the rotation direction of the infrared detection elements constituting the infrared sensor 202d illustrated in FIG. 11A may be disabled, as in an infrared sensor 202e illustrated in FIG. 11B. This can suppress influences of comatic aberration and spherical aberration of a lens used for focusing infrared rays on the infrared sensor. The "spherical aberration" as used herein refers to aberration resulting from the lens surface being spherical, that is, resulting from differences in how light travels between the center portion and peripheral portions of the lens, the differences being caused by the lens surface being spherical. The "comatic aberration" refers to a phenomenon in which a point image has a tail at a portion away from the optical axis, that is, a phenomenon in which light that goes out from one point at portion away from the optical axis does not concentrate at one point on an image plane, an image like a comet having a tail is formed, and the point image extends.

(Third Modification)

Figure 12A:
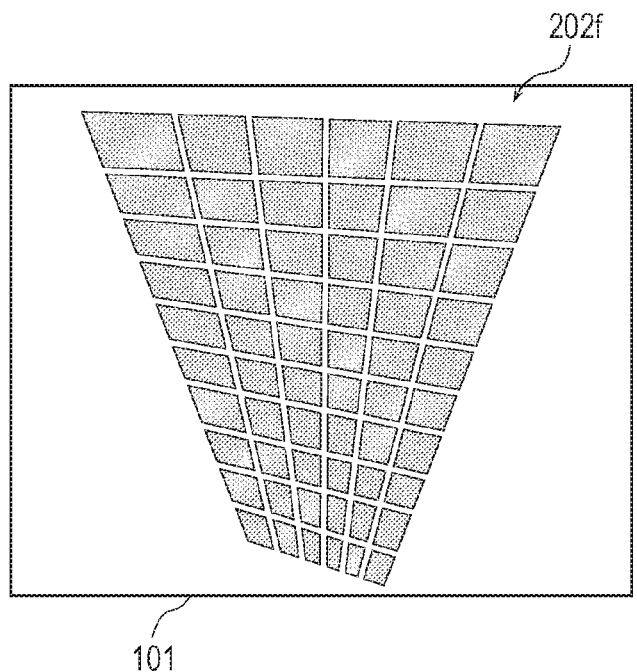
FIG. 12A is a diagram illustrating one example of the configuration of an infrared sensor in a third modification of the second embodiment.
Figure 12B:
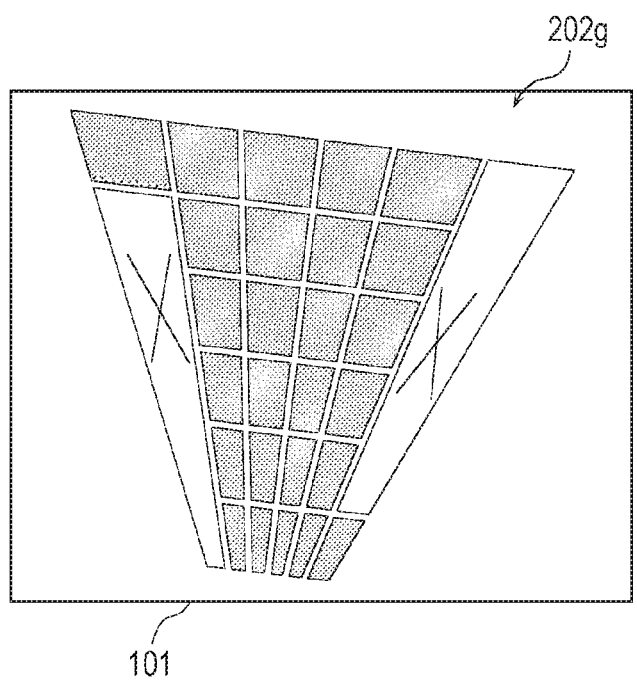
FIG. 12B is a diagram illustrating another example of the configuration of the infrared sensor in the third modification of the second embodiment.

FIG. 12A is a diagram illustrating one example of the configuration of an infrared sensor in a third modification of the second embodiment. FIG. 12B is a diagram illustrating another example of the configuration of the infrared sensor in the third modification of the second embodiment.

Although the description of the infrared sensor 202d illustrated in FIG. 11A has been given of a case in which the infrared detection elements in each column are formed generally parallel to the scan rotation axis S1, and the infrared detection elements in each row are formed generally orthogonal to the scan rotation axis S1, the present disclosure is not limited thereto.

As illustrated in FIG. 12A, infrared detection elements constituting an infrared sensor 202f and arranged in a matrix may be inclined at a predetermined angle relative to the scan rotation axis S1. The predetermined angle in this case is an angle adjusted such that all of the respective central positions of the infrared detection elements constituting the infrared sensor 202 differ from one another, when viewed from the direction orthogonal to the scan rotation axis S1.

Thus, when the infrared sensor 202f is rotated about the scan rotation axis S1, the number of infrared detection elements in the direction orthogonal to the scan rotation axis S1 increases, compared with a case in which the predetermined angle is not given relative to the scan rotation axis S1. That is, the infrared sensor 202f in which the infrared detection elements are inclined at the predetermined angle relative to the scan rotation axis S1 makes it possible to substantially increase the number of pixels in the direction orthogonal to the scan rotation axis S1. This makes it possible to enhance the resolution in the direction orthogonal to the scan rotation axis S1.

Two opposite ends (in FIG. 12A, left and right ends) in the rotation direction of the infrared detection elements constituting the infrared sensor 202f may be disabled, as in the infrared sensor 202e illustrated in FIG. 11B. This makes it possible to suppress influences of the comatic aberration and the spherical aberration of the lens used for focusing infrared rays on the infrared sensor.

In addition, as in an infrared sensor 202g illustrated in FIG. 12B, particular infrared detection elements (that is, the lower end at a leading end in the rotation direction and the upper end at a trailing end in the rotation direction) of the infrared detection elements in the disabled columns at the left and right ends may be enabled. This is because the particular infrared detection elements are located at positions where the influences of lens distortion can also be reduced. When the particular infrared detection elements (that is, the lower end at the leading end in the rotation direction and the upper end at the trailing end in the rotation direction) are enabled to increase the number of infrared detection elements in the direction (vertical axis) orthogonal to the scan rotation axis S1, the number of pixels of a thermal image in the direction orthogonal to the scan rotation axis S1 can be increased, compared with a case in which all of the columns at the two opposite ends are disabled.

(Fourth Modification)

Figure 13:
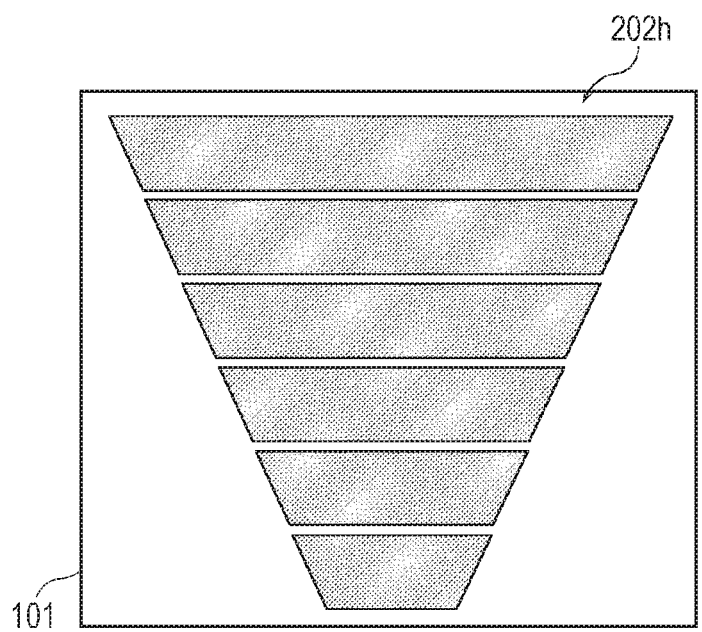
FIG. 13 is a diagram illustrating one example of the configuration of an infrared sensor in a fourth modification of the second embodiment.

FIG. 13 is a diagram illustrating one example of the configuration of an infrared sensor 202h in a fourth modification of the second embodiment.

Although the infrared sensor 202 illustrated in FIG. 7 has been described above in conjunction with a case in which each of the infrared detection elements constituting the infrared sensor 202 has a rectangular shape, the present disclosure is not limited thereto. Each of the infrared detection elements constituting the infrared sensor 202 may be formed to have a trapezoidal shape, as in the infrared sensor 202h illustrated in FIG. 13. In this case, the dimensions of the vertical edges of the infrared detection elements in the infrared sensor 202h are equal to each other.

Since the relationship of the dimensions of the horizontal edges of the infrared detection elements in the columns constituting the infrared sensor 202h is substantially the same as that illustrated in FIG. 7, a description thereof is not given hereinafter.

(Fifth Modification)

Figure 14:
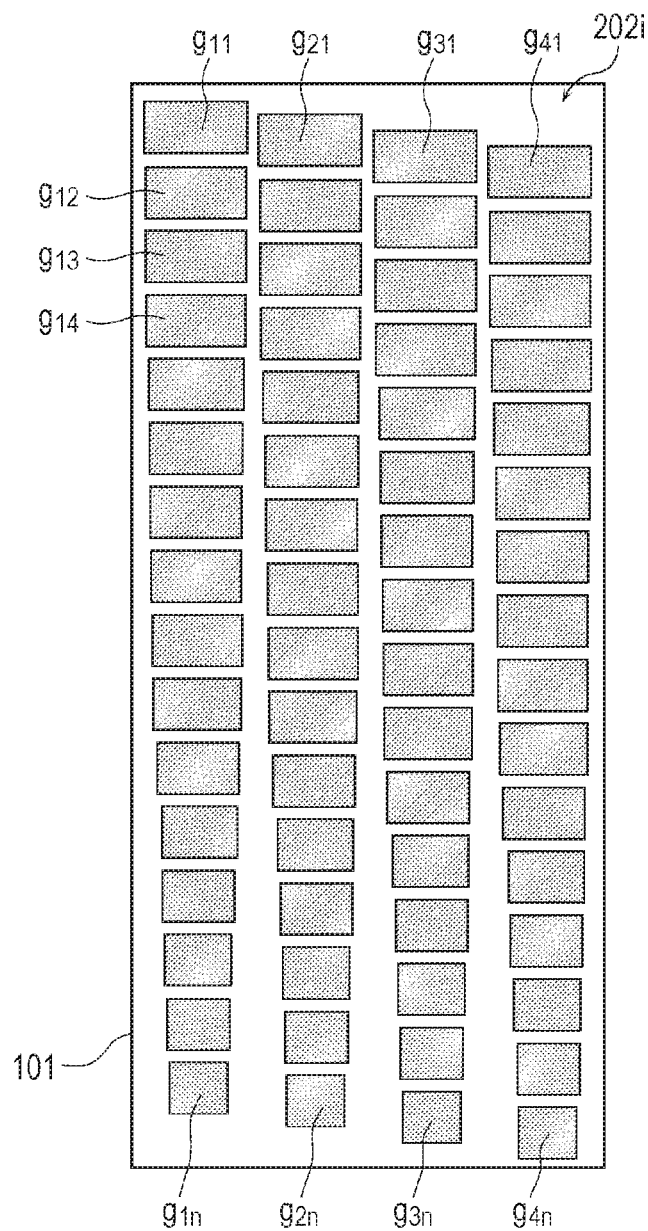
FIG. 14 is a diagram illustrating one example of the configuration of an infrared sensor in a fifth modification of the second embodiment.
Figure 15:
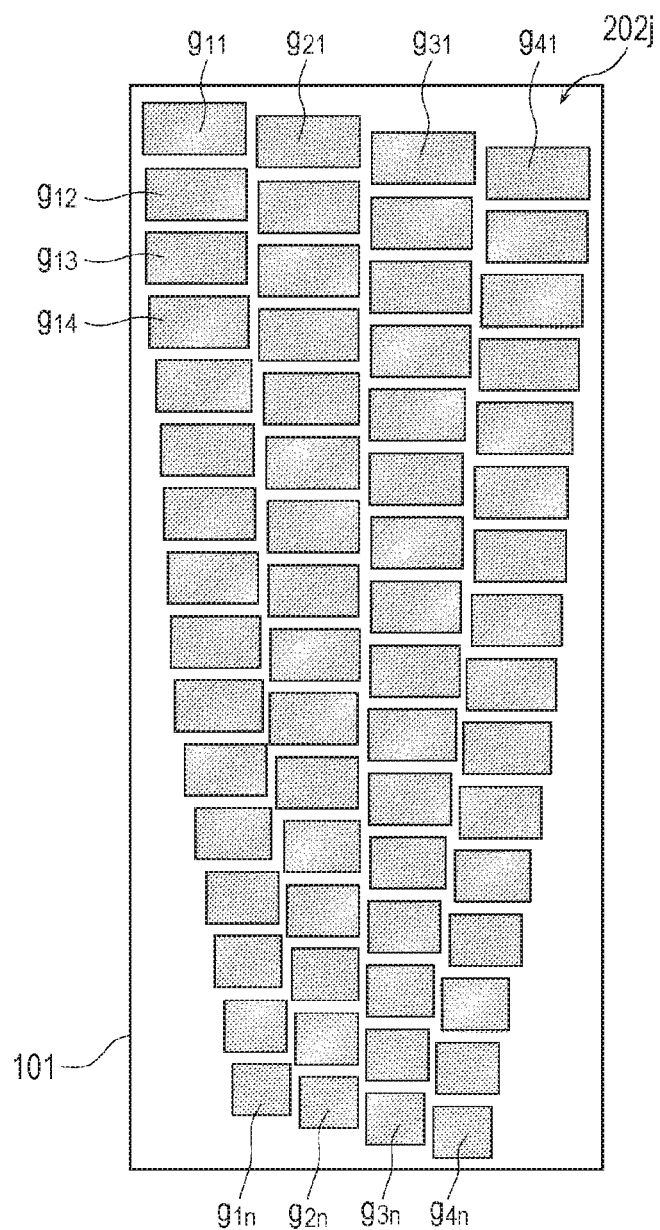
FIG. 15 is a diagram illustrating another example of the configuration of the infrared sensor in the fifth modification of the second embodiment.

FIG. 14 is a diagram illustrating one example of the configuration of an infrared sensor in a fifth modification of the second embodiment. FIG. 15 is a diagram illustrating another example of the configuration of the infrared sensor in the fifth modification of the second embodiment. FIG. 16 is a table illustrating one example of the size of infrared detection elements constituting the infrared sensor in the fifth modification of the second embodiment.

A case in which the spacing of the adjacent columns, that is, the gap between the centers of the infrared detection elements in the adjacent columns, is constant and the positions of the corresponding infrared detection elements in the adjacent columns are the same has been described above in the infrared sensor 202b illustrated in FIG. 9, the present disclosure is not limited thereto. In addition, the positions of the corresponding infrared detection elements in the adjacent ones of the columns may be offset, as in an infrared sensor 202i illustrated in FIG. 14.

FIG. 14 illustrates an example in which an infrared detection element $g_{11}$ at the upper end in a first column and an infrared detection element $g_{21}$ at the upper end in a second column are offset by a ¼ pixel, an infrared detection element $g_{21}$ at the upper end in the second column and an infrared detection element $g_{31}$ at the upper end in a third column are offset by a quarter pixel, and the infrared detection element $g_{31}$ at the upper end in third column and an infrared detection element $g_{41}$ at the upper end in a fourth column are offset by a quarter pixel. Similarly, the positions of the corresponding infrared detection elements in the adjacent columns in each row other than the upper end are offset by a ¼ pixel.

In other words, in the infrared sensor 202i illustrated in FIG. 14, the positions of topmost infrared detection elements in three or more columns, viewed from the bottom surface 42, are sequentially offset toward the bottom surface 42. For example, the position of the topmost infrared detection element in one column may be offset from the topmost infrared detection element in the column adjacent thereto by one-fourth of the dimension of the vertical edge of the topmost infrared detection element in the adjacent column, the vertical edge being generally orthogonal to the bottom surface 42. Since the relationship of the dimensions of the horizontal edges of the adjacent infrared detection elements in each column is substantially the same as that illustrated in FIG. 7, a description thereof is not given hereinafter.

With the configuration described above, when the infrared sensor 202i is rotated about the scan rotation axis S1, the number of infrared detection elements in the direction orthogonal to the scan rotation axis S1 increases, compared with the infrared sensor 202b illustrated in FIG. 9. That is, the infrared sensor 202i makes it possible to substantially increase the number of pixels in the direction orthogonal to the scan rotation axis S1. This makes it possible to enhance the resolution in the direction orthogonal to the scan rotation axis S1.

Although a case in which the spacing of the adjacent columns, that is, the gap between the centers of the infrared detection elements in the adjacent columns, is constant has been described above in the infrared sensor 202i illustrated in FIG. 14, the present disclosure is not limited thereto. In addition, the infrared sensor may be formed such that, the closer to the bottom surface 42 the corresponding infrared detection elements in the adjacent ones of the columns are, the smaller the distance between the centers of the infrared detection elements is, as in an infrared sensor 202j illustrated in FIG. 15.

FIG. 16 illustrates the dimensions (horizontal dimensions) of the horizontal edges of the infrared detection elements in each row which satisfy equation 1 noted above, when the infrared detection elements constituting the infrared sensor in FIGS. 14 and 15 are arranged in 16 rows and 4 columns, and a vertex angle $\theta_z$ relative to the scan rotation axis S1 is 30°.

The dimension (vertical dimension) of a vertical edge may be such that the ratio of the dimension of the vertical edge to the dimension of the horizontal edge of the bottom-end infrared detection element at the lowest end is 2/1, as illustrated in vertical dimension example 1 illustrated in FIG. 16. However, when there is a constraint in a process, the ratio of the vertical edge to the horizontal edge of the infrared detection element at the lowest end may be 3/2 (0.75/0.5), as in vertical dimension example 2 illustrated in FIG. 16.

(Third Embodiment)

Although the infrared detecting device having the infrared sensor whose central axis of the field of view is inclined relative to the scan rotation axis parallel to the installation surface 41 has been described above in each of the first and second embodiments, the present disclosure is not limited thereto. An example of such a case will be described below.

[Configuration of Infrared Detecting Device]

An infrared detecting device in a third embodiment will be described below with reference to the accompanying drawings.

Figure 17:
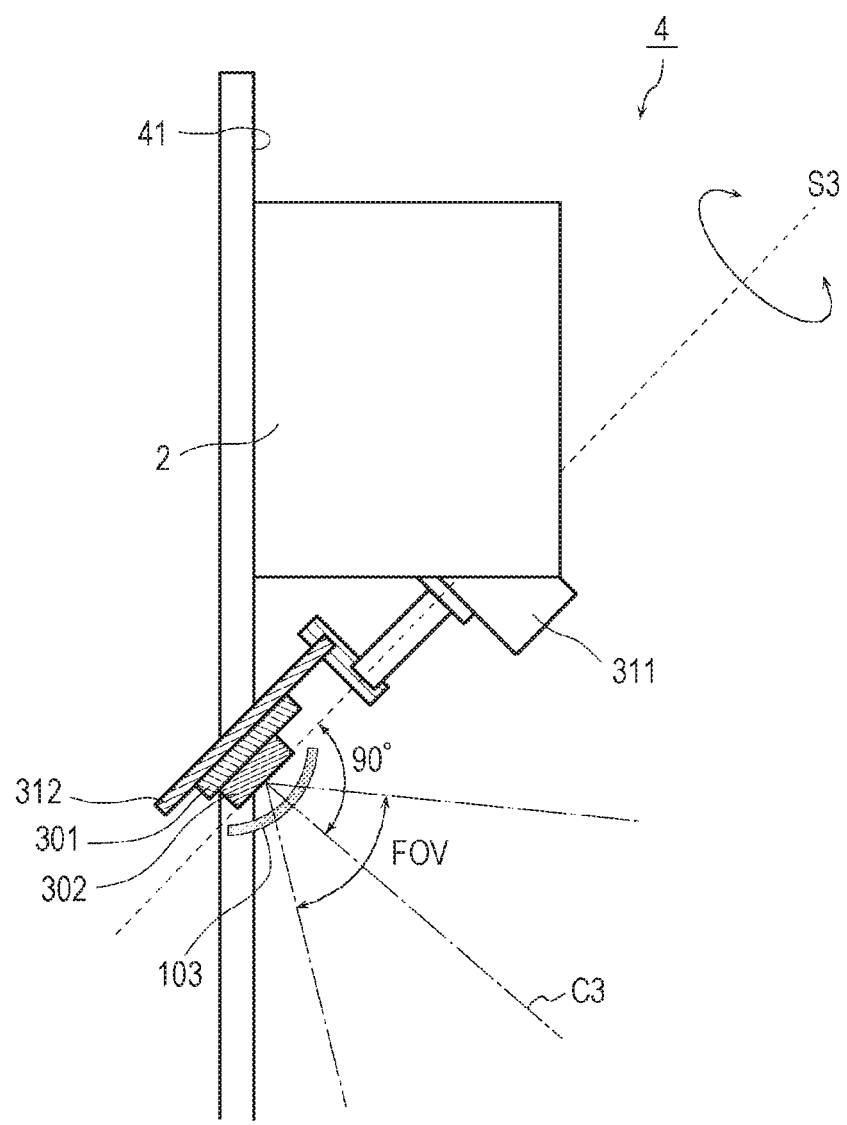
FIG. 17 is a schematic view of a physical configuration when an infrared detecting device in a third embodiment is attached to the housing.

FIG. 17 is a schematic view of a physical configuration when an infrared detecting device in the third embodiment is attached to the housing. Elements that are the same as or similar to those in FIGS. 1 to 4 are denoted by the same reference numerals, and detailed descriptions thereof are not given hereinafter.

The infrared detecting device in the present embodiment is attached to the housing 2 installed on the installation surface 41 that is generally orthogonal to the bottom surface 42 of the space 4 and that is located at a predetermined height from the bottom surface 42, as illustrated in FIG. 17, to acquire a thermal image in a detection range. The predetermined height in this case refers to, for example, a height that is larger than temperature detection targets (measurement targets), such as people or heat sources, as in the first and second embodiments, and is, for example, 1800 mm.

In the infrared detecting device in the present embodiment illustrated in FIG. 17, a scan rotation axis S3 of a scanner (a motor 311), a mount base 312, a sensor module 301, and an infrared sensor 302 are arranged so as to have an inclination relative to the installation surface 41, unlike the infrared detecting device 1 in the first embodiment. Except for the arrangement, the configuration of the mount base 312, the sensor module 301, and the infrared sensor 302 is substantially the same as the configuration of the mount base 112, the sensor module 101, and the infrared sensor 102 in the first embodiment, and thus descriptions thereof are not given hereinafter.

In the present embodiment, the scan rotation axis S3 and the arrangement plane of the infrared sensor 302 are disposed so as to have an inclination relative to the installation surface 41. Thus, a central axis C3 of the field of view of the infrared sensor 302 is not parallel to the direction orthogonal to the installation surface 41 (i.e., is not parallel to the bottom surface 42), as illustrated in FIG. 17. The scan rotation axis S3 passes along the arrangement plane of the infrared sensor 302, as illustrated in FIG. 17, and the infrared sensor 302 is rotated about the scan rotation axis S3 that passes along the arrangement plane.

Thus, in the present embodiment, the scan rotation axis S3 is inclined relative to the installation surface 41, and the central axis C3 of the field of view of the infrared sensor 302 is generally orthogonal to the scan rotation axis S3.

[Advantages, Etc. of Third Embodiment]

With this arrangement, when the infrared sensor 302 is rotated about the scan rotation axis S3, the rotational speed (rotational pitch) of an upper end and a lower end of the infrared sensor 302, when viewed from the bottom surface 42, become equal to each other, and thus it is not necessary for the control processor 12 to perform distortion correction as described in the first embodiment. That is, since the control processor 12 does not need to perform distortion correction, there is an advantage in that the amount of memory used and the amount of computational load become zero.

The infrared detecting device in the present embodiment includes the infrared sensor 302 whose central axis C3 of the field of view is inclined from the direction generally orthogonal to the installation surface 41 toward the bottom surface 42. This offers an advantage in that it is possible to increase a detection range in an area near and below the position where the infrared detecting device is disposed.

(Modifications of First to Third Embodiments)

In the second embodiment, the infrared sensor has a plurality of infrared detection elements in one or more columns and is formed such that the horizontal edge of each of the infrared detection elements in each column, the horizontal edge being generally parallel to the bottom surface 42, has a smaller dimension as the infrared detection element is located closer to the bottom surface 42. The dimensions of the horizontal edges of the adjacent infrared detection elements in each column are described above as being defined by equation 1 noted above. However, the dimensions of the horizontal edges are not limited to a case in which they are defined by equation 1.

That is, for example, the dimensions of the horizontal edges are not limited to a case that satisfies a relationship $L_x/L_y = \sin(\theta_x)/\sin(\theta_y)$ in equation 1 noted above and may satisfy a relationship $L_x/L_y > \sin(\theta_x)/\sin(\theta_y)$ or a relationship $L_x/L_y < \sin(\theta_x)/\sin(\theta_y)$.

More specifically, the relationship given by $L_x/L_y > \sin(\theta_x)/\sin(\theta_y)$ may be satisfied, where $L_x$ represents the dimension of the horizontal edge of a particular one of the infrared detection elements in each column, $L_y$ represents the dimension of the horizontal edge of the infrared detection element that is adjacent to the particular infrared detection element at the bottom surface 42 side, $\theta_x$ represents the angle between the scan rotation axis S1 and a main light ray at a lowest end that is included in the angle of view of the particular infrared detection element and that is the closest to the bottom surface 42, and $\theta_y$ represents the angle between the scan rotation axis S1 and a main light ray at a lowest end that is included in the angle of view of the adjacent infrared detection element.

In this case, there is an advantage in that, of the infrared detection elements constituting the infrared sensor, the infrared detection elements whose effective viewing angles are horizontal (i.e., parallel to the bottom surface 42) can perform scanning with higher sensitivity. This is suitable for a case in which it is desired to scan, with high sensitivity, a measurement target that is horizontally far from the position where the infrared detecting device is disposed.

Also, the relationship given by $L_x/L_y < \sin(\theta_x)/\sin(\theta_y)$ may be satisfied, where $L_x$ represents the dimension of the horizontal edge of a particular one of the infrared detection elements in each column, $L_y$ represents the dimension of the horizontal edge of the infrared detection element that is adjacent to the particular infrared detection element at the bottom surface 42 side, $\theta_x$ represents the angle between the scan rotation axis S1 and a main light ray at a lowest end that is included in the angle of view of the particular infrared detection element and that is the closest to the bottom surface 42, and $\theta_y$ represents the angle between the scan rotation axis S1 and a main light ray at a lowest end that is included in the angle of view of the adjacent infrared detection element.

In this case, there is an advantage in that scanning can be performed with a higher scan density (with higher sensitivity) relative to a distance for the infrared detection element that is closer to the position directly below the position where the infrared detecting device is disposed. This is suitable for a case in which it is desired to scan, with high sensitivity, the area directly below the position where the infrared detecting device is disposed.

The housing to which the infrared detecting device described above in each of the first to third embodiments is attached is not limited to the housing of air-conditioning equipment. The infrared detecting device may be attached to a security camera or a microwave oven.

[Advantages, Etc. of First to Third Embodiments]

An infrared detecting device according to one aspect of the present disclosure is directed to an infrared detecting device attached to a housing installed on an installation surface that is generally orthogonal to a bottom surface of space and that is located at a predetermined height from the bottom surface. The infrared detecting device includes an infrared sensor having one or more infrared detection elements arranged in one or more columns and a scanner that has a scan rotation axis and that rotates the infrared sensor about the scan rotation axis to cause the infrared sensor to scan the space. An arrangement plane of the one or more infrared detection elements is arranged so as to have an inclination relative to the installation surface.

With this configuration, it is possible to realize an infrared detecting device that can increase a detection range in an area near and below the position where the infrared detecting device is disposed.

In this case, for example, the center of the arrangement plane may have a rotation center through which the scan rotation axis passes, that is, a rotation center when the infrared sensor is rotated about the scan rotation axis.

In addition, for example, the scan rotation axis and the arrangement plane may be arranged so as to have the inclination relative to the installation surface, the scan rotation axis may pass along the arrangement plane, and the infrared sensor may be rotated about the scan rotation axis that passes along the arrangement plane.

For example, the scan rotation axis may be generally parallel to the installation surface, and the arrangement plane may intersect the scan rotation axis.

In this case, for example, the infrared detection elements in the infrared sensor are arranged in one or more columns; and a horizontal edge of each of the infrared detection elements in each column, the horizontal edge being generally parallel to the bottom surface, has a smaller dimension, as the infrared detection element is located closer to the bottom surface.

In addition, for example, the relationship given by $L_x/L_y=\sin(\theta_x)/\sin(\theta_y)$ may be satisfied, where $L_x$ represents the dimension of the horizontal edge of a particular one of the infrared detection elements in each column, $L_y$ represents the dimension of the horizontal edge of the infrared detection element that is adjacent to the particular infrared detection element at the bottom surface 42 side, $\theta_x$ represents the angle between the scan rotation axis S1 and a main light ray at a lowest end that is included in the angle of view of the particular infrared detection element and that is the closest to the bottom surface 42, and $\theta_y$ represents the angle between the scan rotation axis S1 and a main light ray at a lowest end that is included in the angle of view of the adjacent infrared detection element.

Also, for example, the relationship given by $L_x/L_y>\sin(\theta_x)/\sin(\theta_y)$ may be satisfied, where $L_x$ represents the dimension of the horizontal edge of a particular one of the infrared detection elements in each column, $L_y$ represents the dimension of the horizontal edge of the infrared detection element that is adjacent to the particular infrared detection element at the bottom surface 42 side, $\theta_x$ represents the angle between the scan rotation axis S1 and a main light ray at a lowest end that is included in the angle of view of the particular infrared detection element and that is the closest to the bottom surface 42, and $\theta_y$ represents the angle between the scan rotation axis S1 and a main light ray at a lowest end that is included in the angle of view of the adjacent infrared detection element.

Also, for example, the relationship given by $L_x/L_y<\sin(\theta_x)/\sin(\theta_y)$ may be satisfied, where $L_x$ represents the dimension of the horizontal edge of a particular one of the infrared detection elements in each column, $L_y$ represents the dimension of the horizontal edge of the infrared detection element that is adjacent to the particular infrared detection element at the bottom surface 42 side, $\theta_x$ represents the angle between the scan rotation axis S1 and a main light ray at a lowest end that is included in the angle of view of the particular infrared detection element and that is the closest to the bottom surface 42, and $\theta_y$ represents the angle between the scan rotation axis S1 and a main light ray at a lowest end that is included in the angle of view of the adjacent infrared detection element.

For example, the infrared detection elements in the infrared sensor may be arranged in three or more columns; a horizontal edge of each of the infrared detection elements in each column, the horizontal edge being generally parallel to the bottom surface, may have a smaller dimension, as the infrared detection element is located closer to the bottom surface; and a distance between central positions of the infrared detection elements at corresponding portions in the adjacent columns of the three or more columns may be constant.

For example, the infrared detection elements in the infrared sensor may be arranged in three or more columns; the horizontal edge of each of the infrared detection elements in each of the column, the horizontal edge being generally parallel to the bottom surface, may have a smaller dimension, as the infrared detection element is located closer to the bottom surface; and each of the infrared detection elements in each of the three or more columns may be located closer to a center of the three or more columns in a column direction, as the infrared detection element is located closer to the bottom surface.

For example, positions of the topmost infrared detection elements in the three or more columns, viewed from the bottom surface, may be sequentially offset toward the bottom surface.

For example, the position of the topmost infrared detection element in one column may be offset from the topmost infrared detection element in the column adjacent thereto by one-fourth of a dimension of a vertical edge of the topmost infrared detection element in the adjacent column, the vertical edge being generally orthogonal to the bottom surface.

For example, in the infrared sensor, the one or more columns may be arranged so as to have an inclination at a predetermined angle relative to the scan rotation axis.

For example, the predetermined angle may be an angle adjusted such that all of the respective central positions of the infrared detection elements constituting the infrared sensor differ from one another, when viewed from a direction orthogonal to the scan rotation axis.

General or specific aspects may be implemented as a system, a method, an integrated circuit, a computer program, a storage medium such as a computer-readable compact disc read-only memory (CD-ROM), or any selective combination thereof.

(Fourth Embodiment)

In a fourth embodiment, a description will be given of a specific aspect of an infrared detecting device that can enhance the resolution of a thermal image without increasing the number of infrared detection elements.

[Configuration of Infrared Detecting Device]

The infrared detecting device in the fourth embodiment will be described below with reference to the accompanying drawings.

Figure 18:
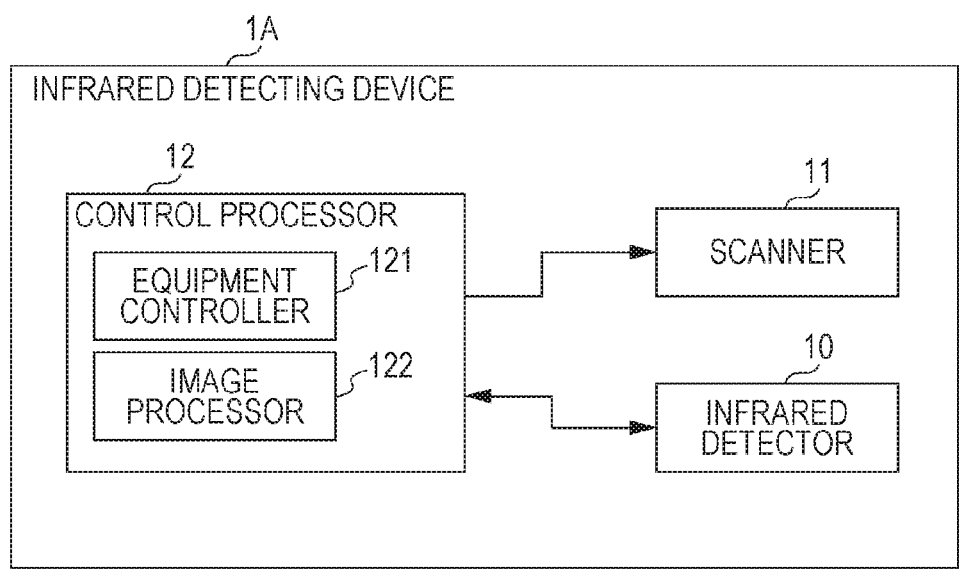
FIG. 18 is a diagram illustrating one example of the configuration of an infrared detecting device in a fourth embodiment.
Figure 19A:
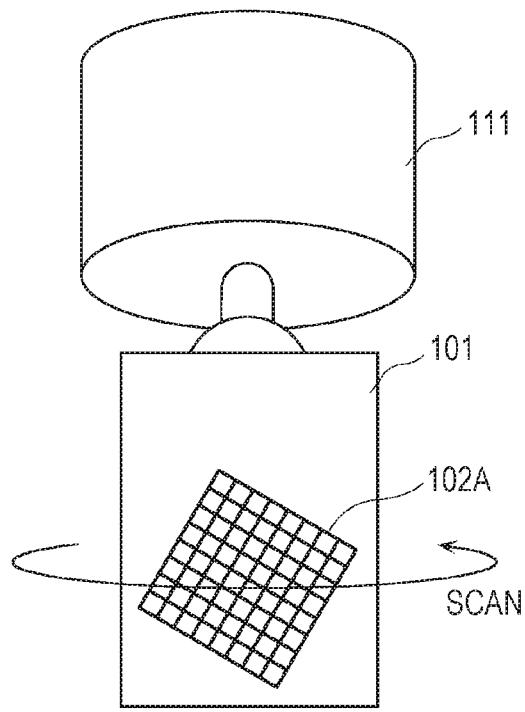
FIG. 19A is a diagram illustrating one example of the configuration an infrared detector and a scanner in the fourth embodiment.
Figure 19B:
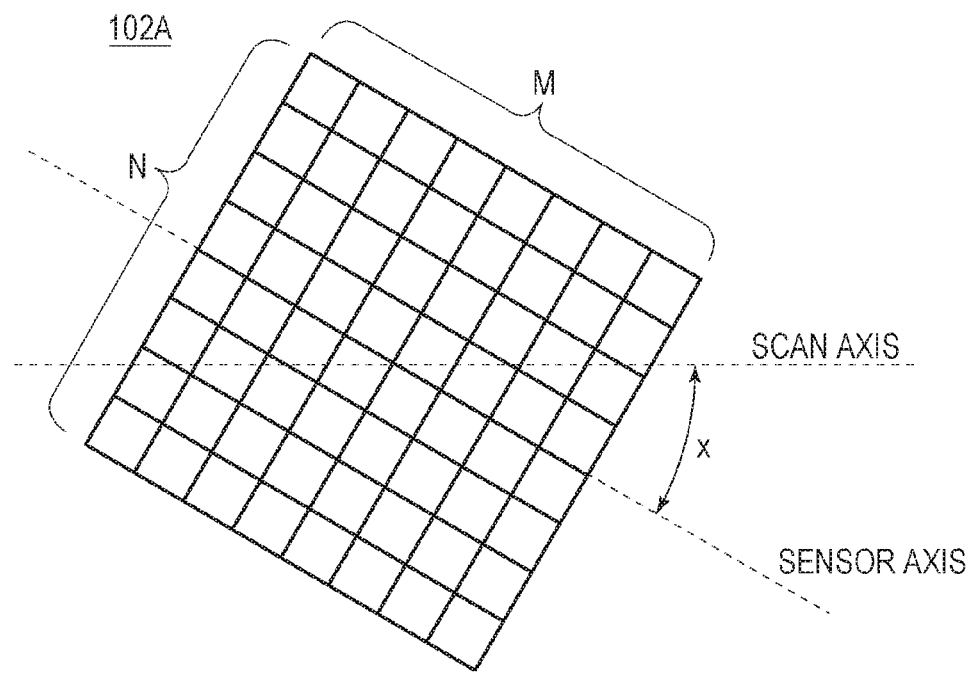
FIG. 19B is a diagram illustrating one example of the configuration of an infrared sensor in the fourth embodiment.

FIG. 18 is a diagram illustrating one example of the configuration of an infrared detecting device 1A in the fourth embodiment. FIG. 19A is a diagram illustrating one example of the configuration of an infrared detector 10 and a scanner 11 in the present embodiment. FIG. 19B is a diagram illustrating one example of the configuration of an infrared sensor 102A in the present embodiment.

As illustrated in FIG. 18, the infrared detecting device 1A includes an infrared detector 10, a scanner 11, and a control processor 12.

The scanner 11 causes the infrared detector 10 to perform scanning in a predetermined direction. More specifically, by moving the infrared sensor 102A in a predetermined direction, the scanner 11 causes the infrared sensor 102A to scan a detection range. In the present embodiment, the scanner 11 has a motor 111 illustrated in FIG. 19A. Under the control of the control processor 12, the motor 111 causes the infrared sensor 102A of a sensor module 101 to rotate or move in a predetermined direction. The motor 111 is, for example, a stepping motor or a servo motor. The predetermined direction is a horizontal direction in FIG. 19A and corresponds to the direction (scan direction) of a scan axis illustrated in FIG. 19B.

The control processor 12 controls the scanner 11 to process thermal images (input images) acquired by the infrared detector 10. As illustrated in FIG. 18, the control processor 12 includes an equipment controller 121 and an image processor 122.

The equipment controller 121 determines control information for controlling scanning of the scanner 11 on the basis of information detected by the infrared detector 10 and controls the scanner 11 in accordance with the determined control information. The image processor 122 generates a high-definition thermal image (an output image) by performing super resolution processing on the thermal images (the input images) acquired by the infrared detector 10 and recombining the thermal images (the input images). The image processor 122 outputs the generated high-definition thermal image, that is, the thermal image on which the super resolution processing is performed.

The "thermal image" as used herein refers to an image constituted by a plurality of pixels indicating the distribution of temperatures in a temperature detection range. The "super resolution processing" as used herein is one type of resolution-enhancement processing that can generate high-resolution information (an output image) that is not included in an input image. A processing method for acquiring a single high-resolution image from a plurality of images and a processing method using learning data are available as the super resolution processing. In the present embodiment, the scanner 11 causes the infrared detector 10 to perform scanning to thereby allow acquisition of a thermal image (with sub-pixel position displacement) of a temperature detection range, that is, thermal-image data of different sample points. Thus, the following description will be given assuming that a processing method for obtaining one high-resolution thermal image from a plurality of thermal images.

In addition, the image processor 122 may obtain thermal-image data indicating the positions and the temperatures of heat sources in the temperature detection range on the basis of the thermal image on which the super resolution processing is performed, and then may output the thermal-image data. Examples of the positions and the temperatures of the heat sources include the positions of people, the temperatures of a user's hand and face, and the temperatures of walls.

The scanner 11 causes the infrared detector 10 to perform scanning in a predetermined direction to thereby allow the infrared detector 10 to acquire a thermal image of a temperature detection range. More specifically, the infrared detector 10 has the infrared sensor 102A in which a plurality of infrared detection elements are arranged in a matrix, and detects infrared rays in a temperature detection range scanned by the infrared sensor 102A. The infrared sensor 102A is disposed so that the matrix of the infrared detection elements has an inclination at a predetermined angle relative to the predetermined direction. The "predetermined angle" in this case refers to an angle adjusted such that all of the respective central positions of the infrared detection elements constituting the infrared sensor 102A differ from one another, when viewed from the predetermined direction.

In the present embodiment, the infrared detector 10 includes, for example, the sensor module 101 illustrated in FIG. 19A. The sensor module 101 has the infrared sensor 102A and a lens (not illustrated).

The lens is made of silicon, zinc sulfide (ZnS), or the like having a high infrared transmittance. The lens is designed so that infrared rays (infrared light) that enter the lens from individual directions are incident on the different infrared detection elements constituting the infrared sensor 102A.

The infrared detection elements constituting the infrared sensor 102A are arranged, for example, in a matrix with N rows and M columns (N and M are natural numbers greater than or equal to 2), as illustrated in FIG. 19B. Also, upon being rotated (moved) in the horizontal direction, that is, along the direction of the scan axis illustrated in FIG. 19B, the infrared sensor 102A can scan a temperature detection range. When the scanning is performed in the predetermined direction (the horizontal direction), the infrared detector 10 acquires a thermal image (an infrared thermal image) of the temperature detection range and outputs the thermal image to the image processor 122.

More specifically, the motor 111 rotates (moves) the infrared sensor 102A for each sub-pixel position in the horizontal direction, that is, in the direction of the scan axis illustrated in FIG. 19B. As a result, the infrared sensor 102A acquires a thermal image (an infrared thermal image) of the temperature detection range, the thermal image having sub-pixel position displacement, and outputs the thermal image to the image processor 122.

The infrared sensor 102A is inclined at a predetermined angle (X in FIG. 19B) relative to the horizontal direction, that is, the direction of the scan axis illustrated in FIG. 19B. In other words, the infrared sensor 102A is constituted by a plurality of infrared detection elements arranged in a matrix with N rows and M columns, and the infrared detection elements in the matrix are arranged so as to be parallel and orthogonal to a sensor axis having an inclination at a predetermined angle (X) relative to the scan axis. That is, the predetermined angle (X) is an angle adjusted such that all of the respective central positions of the infrared detection elements constituting the infrared sensor 102A differ from one another, when viewed from the direction of the scan axis. In addition, in other words, the predetermined angle (X) is an angle adjusted such that, when the infrared detection elements are rotated (moved) along the direction of the scan axis, the infrared detection elements in the M columns in one row parallel to the sensor axis and the infrared detection elements in the row adjacent thereto do not overlap each other in the direction of the scan axis.

Since the infrared sensor 102A is inclined at the predetermined angle (X in FIG. 19B) relative to the direction of the scan axis, the infrared detection elements constituting the infrared sensor 102A have the following relationships. That is, the distances (e.g., first distances) in the direction orthogonal to the scan axis (in FIG. 19B, in the vertical direction) between the respective central positions of the infrared detection elements that are adjacent in the same row (e.g., in a first arrangement) are equal to each other. Also, the distance (e.g., a second distance) in the direction orthogonal to the scan axis (i.e., in the vertical direction) between the central position of the infrared detection element (e.g., a first element) that is located at one end of that row (the first arrangement), the end corresponding to a leading end in the scan direction, and the central position of the infrared detection element (e.g., a second element) that is included in the row (e.g., a second arrangement) adjacent to that row (the first arrangement) and that is adjacent to the infrared detection element at another end of that row (the first arrangement) is equal to the first distance.

With this arrangement, when the infrared detection elements are rotated (moved) along the direction of the scan axis, the number of infrared detection elements in the direction orthogonal to the scan axis becomes larger than N when the scan axis and the sensor axis are parallel to each other. That is, the infrared sensor 102A whose sensor axis is inclined at the predetermined angle (X) relative to the scan axis can substantially increase the number of pixels of a thermal image in the direction (the vertical axis direction) orthogonal to the scan axis, compared with a case in which the sensor axis is parallel to the scan axis. This makes it possible to enhance the resolution in the direction (the vertical axis direction) orthogonal to the scan axis.

One example of the predetermined angle will be described below in conjunction with an illustrative example.

(Illustrative Example)

Next, one example of the configuration of the infrared sensor 102A in an illustrative example will be described with reference to FIGS. 20 and 21.

FIG. 20 is a diagram illustrating an infrared sensor in an illustrative example of the fourth embodiment.

An infrared sensor 102a illustrated in FIG. 20 is one example of the infrared sensor 102A and is constituted by a plurality of infrared detection elements arranged in 8 rows and 8 columns. Detection points are depicted at the respective centers of the infrared detection elements illustrated in FIG. 20. The infrared detecting sensitivity of the detection points of the infrared detection elements may be high, and the detection points may detect infrared rays. While the entire area of the infrared detection element detects infrared rays, the detection point of each infrared detection element may dominantly detect infrared rays. The detection point may also represent the area of the corresponding infrared detection element. In this case, the detection point may represent the average of infrared rays detected by the corresponding infrared detection element.

The sensor axis of infrared detection elements in the 8 rows and 8 columns constituting the infrared sensor 102a is inclined at a predetermined angle a relative to a horizontal direction, that is, the direction of a scan axis illustrated in FIG. 20. The predetermined angle a is one example of the above-described predetermined angle x, and is adjusted such that all of the central positions of the infrared detection elements in the 8 rows and 8 columns differ from one another, when viewed from the direction of the scan axis. In other words, the predetermined angle a is adjusted such that, when the infrared detection elements constituting the infrared sensor 102a and arranged in the 8×8 matrix are rotated (moved) along the direction of the scan axis, the infrared detection elements in 8 columns in one row parallel to the sensor axis and the infrared detection elements in 8 columns in the row adjacent thereto do not overlap each other in the direction of the scan axis.

Figure 21:
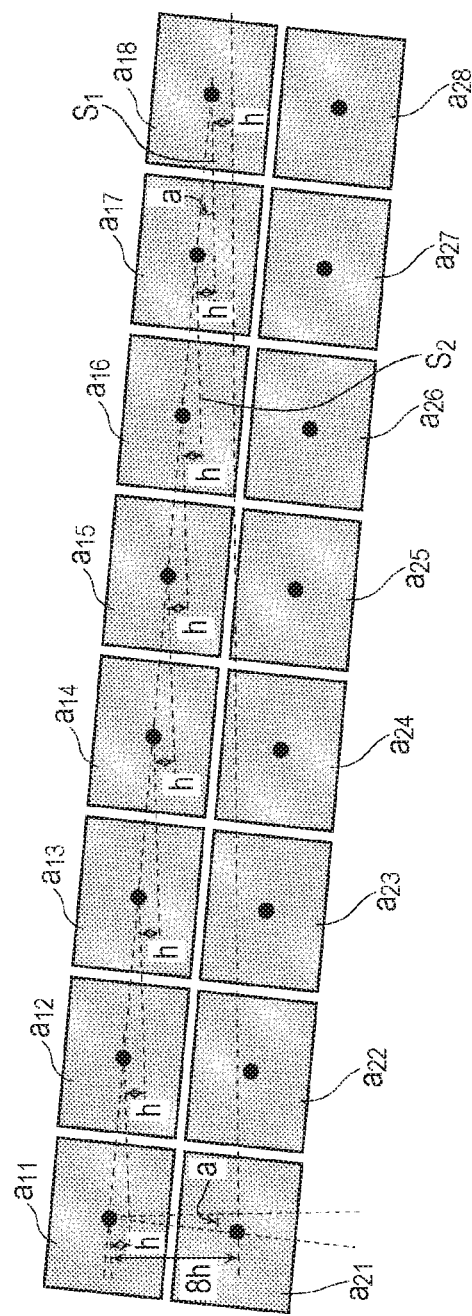
FIG. 21 is a diagram for describing an inclination of the infrared sensor illustrated in FIG. 20.

FIG. 21 is a diagram for describing the inclination of the infrared sensor 102a illustrated in FIG. 20. For convenience of description, FIG. 21 illustrates infrared detection elements in two rows of the infrared detection elements arranged in the 8 rows and 8 columns illustrated in FIG. 20. In FIG. 21, dotted lines S1 and S2 are parallel to the scan axis.

In FIG. 21, the predetermined angle a is an angle adjusted such that infrared detection elements $a_{11}$ to $a_{18}$ and infrared detection elements $a_{21}$ to $a_{28}$ do not overlap each other in the direction of the scan axis when they are rotated (moved) along the direction of the scan axis.

For example, a distance h in a vertical direction between the respective central positions of the infrared detection elements $a_{11}$ and $a_{12}$, a distance h in the vertical direction between the respective central positions of the infrared detection elements $a_{12}$ and $a_{13}$, a distance h in the vertical direction between the respective central positions of the infrared detection elements $a_{13}$ and $a_{14}$, a distance h in the vertical direction between the respective central positions of the infrared detection elements $a_{14}$ and $a_{15}$, a distance h in the vertical direction between the respective central positions of the infrared detection elements $a_{15}$ and $a_{16}$, a distance h in the vertical direction between the respective central positions of the infrared detection elements $a_{16}$ and $a_{17}$, and a distance h in the vertical direction between the respective central positions of the infrared detection elements $a_{17}$ and $a_{18}$ are all equal to the first distance. This is also true for the case of the infrared detection elements $a_{21}$ to $a_{28}$.

The second distance, that is, a distance h in the vertical direction between the respective central positions of the infrared detection element $a_{18}$ (a first element) and the infrared detection element $a_{21}$ (a second element) is equal to the first distance. The distance in the vertical direction between the respective central positions of the infrared detection elements $a_{11}$ and $a_{18}$ is 8 h.

Thus, the predetermined angle a that satisfies the above-described relationship is an angle that satisfies $\tan^{-1}(\frac{1}{8})$ and can be determined to be 7.125°.

That is, the infrared sensor 102a is constituted by the 8×8 infrared detection elements that are parallel and orthogonal to the sensor axis, and the sensor axis has an inclination (the predetermined angle a) of 7.125° relative to the scan axis. Thus, all of the central positions of the infrared detection elements constituting the infrared sensor 102a and arranged in the 8 rows and 8 columns differ from one another, when viewed from the direction of the scan axis. As described above, since all of the infrared detection elements constituting the infrared sensor 102a and arranged in the 8 columns can be arranged so as not to overlap each other in the direction of the scan axis, it is possible to substantially increase the number of pixels of a thermal image in the direction (the vertical axis direction) orthogonal to the scan axis.

Although the infrared detection elements in the 8 rows and 8 columns have been described in the illustrative example as one example of the infrared detection elements constituting the infrared sensor 102A and arranged in the N rows and M columns, the present disclosure is not limited thereto.

For example, the infrared detection elements may be infrared detection elements in 4 rows and 4 columns, infrared detection elements in 32 rows and 32 columns, or infrared detection elements in 16 rows and 16 columns. This is because infrared detection elements in N rows and N columns (N is a natural number greater than or equal to 2) are available as off-the-shelf products, and thus it is possible to reduce the cost of employing the infrared sensor.

Figure 22A:
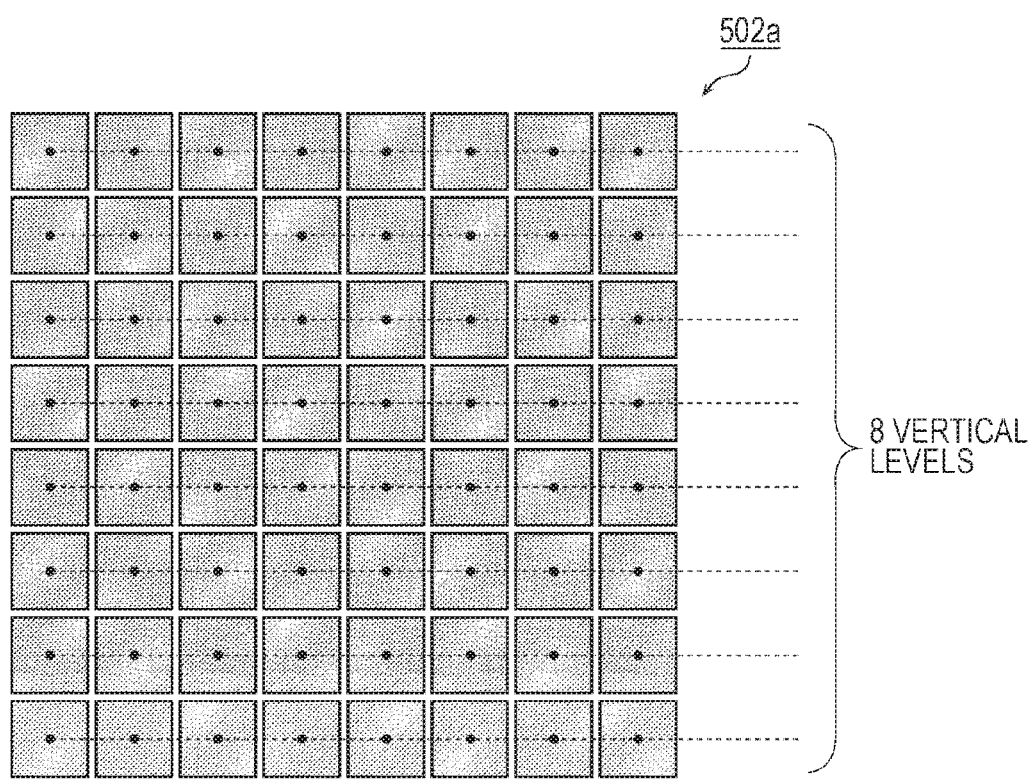
FIG. 22A is a diagram for describing an advantage of the infrared detecting device when an infrared sensor in a comparative example is used.
Figure 22B:
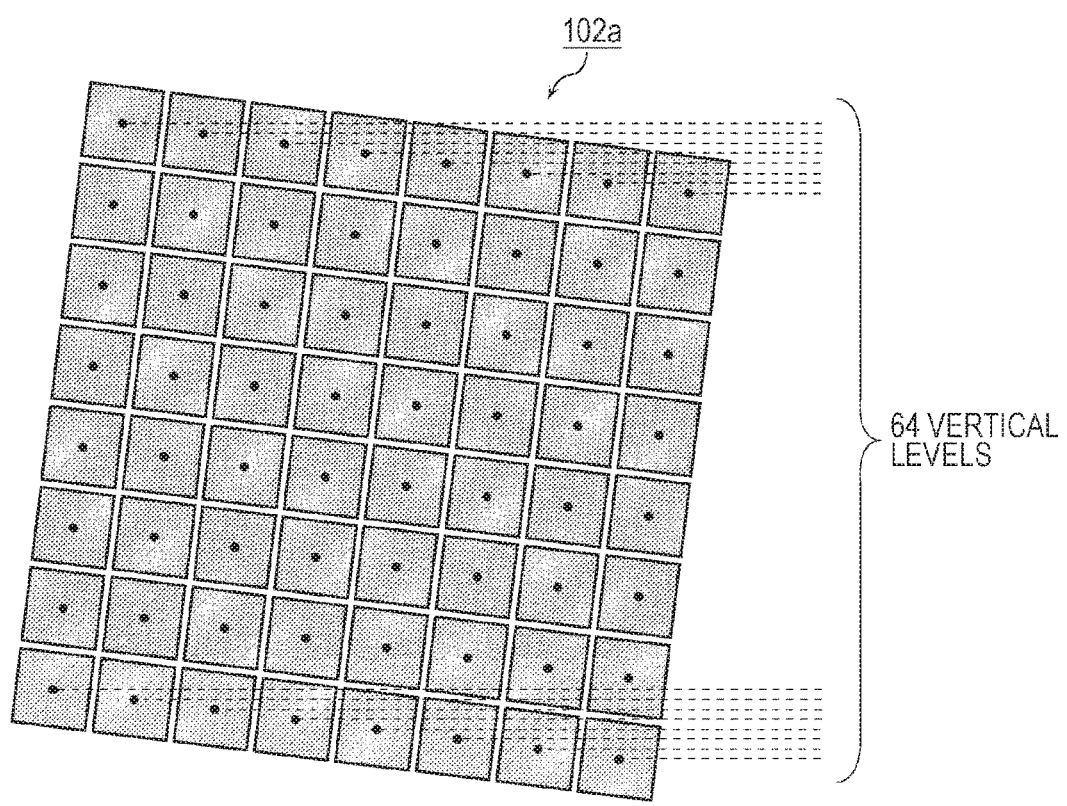
FIG. 22B is a diagram for describing an advantage of the infrared detecting device when the infrared sensor illustrated in FIG. 20 is used.

FIG. 22A is a diagram for describing an advantage of the infrared detecting device when an infrared sensor 502a in a comparative example is used. FIG. 22B is a diagram for describing an advantage of the infrared detecting device when the infrared sensor 102a illustrated in FIG. 20 is used.

The infrared sensor 502a in the comparative example illustrated in FIG. 22A is not inclined relative to the direction of the scan axis (i.e., relative to the horizontal direction). That is, the sensor axis of the infrared sensor 502a matches the scan axis. In this case, when 8×8 infrared detection elements constituting the infrared sensor 502a are rotated (moved) along the direction of the scan axis, the infrared detection elements in the direction (column direction) parallel to the scan axis overlap each other. Thus, the number of infrared detection elements in the direction orthogonal to the scan axis remains to be eight.

On the other hand, the infrared sensor 102a illustrated in FIG. 22B is inclined at 7.125° relative to the direction of the scan axis (i.e., relative to the horizontal direction). That is, the sensor axis of the infrared sensor 102a is inclined at 7.125° relative to the scan axis. In this case, when the 8×8 infrared detection elements constituting the infrared sensor 102a are rotated (moved) along the direction of the scan axis, the infrared detection elements in the direction (column direction) parallel to the scan axis do not match each other.

As a result, the number of infrared detection elements in the direction orthogonal to the scan axis increases to 64 (64 vertical levels), which is larger than eight (8 vertical levels), which is the number of infrared detection elements in a row direction of the infrared sensor 102a.

Thus, since the infrared detecting device 1A has the infrared sensor 102a constituted by the infrared detection elements whose sensor axis is inclined at an angle of 7.125° relative to the scan axis, it is possible to acquire a thermal image having a resolution that is eight times as high as that in the comparative example, without increasing the number of infrared detection elements in the infrared sensor 102a. In addition, when the control processor 12 performs super resolution processing on the thermal image, the infrared detecting device 1A can acquire a thermal image having a more enhanced resolution.

[Operation of Infrared Detecting Device]

Next, a description will be given of an operation of the infrared detecting device 1A configured as described above.

Figure 23:
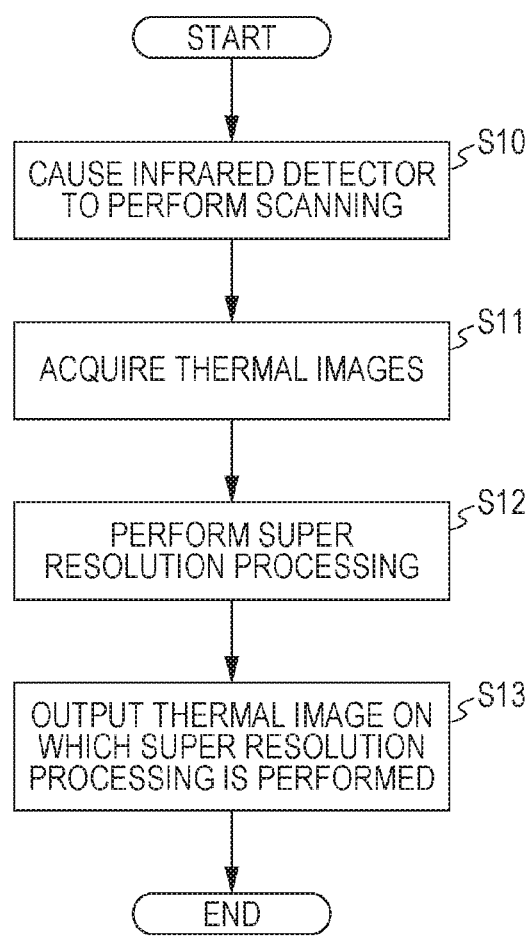
FIG. 23 is a flowchart illustrating an operation of the infrared detecting device in the fourth embodiment.

FIG. 23 is a flowchart illustrating an operation of the infrared detecting device 1A in the fourth embodiment.

First, the infrared detecting device 1A causes the infrared detector 10 to perform scanning (S10) to acquire thermal images of a temperature detection range (S11). More specifically, by moving (rotating) the infrared sensor 102a of the infrared detector 10 along the scan axis, the infrared detecting device 1A causes the infrared sensor 102a to scan a temperature detection range to acquire thermal images of the temperature detection range. The scanner 11 moves (rotates) the infrared sensor 102a for each sub pixel to perform scanning to obtain thermal images moved for each sub pixel.

Next, the infrared detecting device 1A performs super resolution processing on the acquired thermal images (S12). More specifically, the infrared detecting device 1 performs processing on the acquired thermal images and recombines the resulting thermal images to generate a single high-definition thermal image.

Next, the infrared detecting device 1A outputs the generated high-definition thermal image, that is, the thermal image on which the super resolution processing is performed (S13).

As described above, the infrared detecting device 1A can acquire, with a high resolution, thermal images of a temperature detection range.

[Advantages, Etc. of Fourth Embodiment]

As described above, the infrared detecting device in the present embodiment includes the infrared sensor constituted by the infrared detection elements whose sensor axis is inclined at a predetermined angle relative to the scan axis. This makes it possible to enhance the resolution of the thermal image, without increasing the number of infrared detection elements constituting the infrared sensor. The "predetermined angle" in this case is an angle adjusted such that all of the respective central positions of the infrared detection elements constituting the infrared sensor are different from one another, when viewed from a predetermined direction that is the scan direction. For example, when the infrared sensor is constituted by infrared detection elements in 8 rows and 8 columns, the predetermined angle is 7.125°.

Since the infrared detecting device in the present embodiment can acquire a high-resolution thermal image without an increase in the number of infrared detection elements constituting the infrared sensor, it is not necessary to additionally install a motor for moving the infrared sensor (i.e., for causing it scan) in the direction orthogonal to the scan axis. Also, since the infrared detecting device in the present embodiment can acquire a high-resolution thermal image without an increase in the number of infrared detection elements constituting the infrared sensor, it is not necessary to employ a high-cost infrared sensor having a larger number of infrared detection element. That is, the infrared detecting device in the present embodiment offers an advantage in that it is possible to reduce not only the cost for a motor for acquiring a high-resolution thermal image but also the cost for employing an infrared sensor having a larger number of infrared detection elements.

Also, with the infrared detecting device in the comparative example which can acquire a high-resolution thermal image by additionally installing a motor to increase the number of scan directions of the infrared sensor, the size of the infrared detecting device increases mechanically by an amount corresponding to the installed motor. This makes it difficult to attach the infrared detecting device in the comparative example, for example, to other equipment, such as air-conditioning equipment, as a module. On the other hand, since the infrared detecting device in the present embodiment does not require additional installation of a motor for increasing the number of scan directions (scan in the direction orthogonal to the above-described scan axis), the size does not increase. Accordingly, the infrared detecting device in the present embodiment also offers an advantage in that it can be easily attached, for example, to other equipment, such as air-conditioning equipment, as a module.

In addition, compared with a case in which a motor is additionally installed in order to move the infrared sensor (i.e., to cause it to perform scanning) in the direction orthogonal to the scan axis, the infrared detecting device in the present embodiment also does not require a time for additionally performing scanning in the direction orthogonal to the scan axis after performing scanning in the direction of the scan axis. That is, the infrared detecting device in the present embodiment also has an advantage in that it is possible to enhance the resolution of thermal images without increasing the infrared detection time.

This advantage will be described in detail. Since the infrared detecting device in the comparative example can acquire a high-resolution thermal image by additionally installing a motor to increase the number of scan directions of the infrared sensor, the scanning time (the infrared detection time) for acquiring a thermal image increases by an amount corresponding to the increased number of scan directions. That is, since the infrared detecting device in the comparative example requires a time for acquiring a thermal image of a temperature detection range, a time difference between the start of scan and acquisition of the thermal image is large, and thus there is a problem in that the resolution of the acquired thermal images becomes lower than an expected resolution. On the other hand, since the infrared detecting device in the present embodiment does not require additional installation of a motor for increasing the number of scan directions (the number of scans in the orthogonal direction), it is possible to enhance the resolution of a thermal image without increasing the infrared detection time.

(Modification)

Although a case in which all of the infrared detection elements constituting the infrared sensor are enabled (i.e., all of the infrared detection elements constituting the infrared sensor are used) has been described in the fourth embodiment, the present disclosure is not limited thereto. Considering influences of the comatic aberration and the spherical aberration of the lens used for focusing infrared rays on the infrared sensor, the arrangement may be such that particular ones of the infrared detection elements constituting the infrared sensor are enabled and the infrared detection elements other than the particular infrared detection elements are disabled.

An example of such a case will be described below as a modification.

The "spherical aberration" as used herein refers to aberration resulting from the lens surface being spherical, that is, resulting from differences in how light travels between the center portion and peripheral portions of the lens, the differences being caused by the lens surface being spherical. The "comatic aberration" refers to a phenomenon in which a point image has a tail at a portion away from the optical axis, that is, a phenomenon in which light that goes out from one point at portion away from the optical axis does not concentrate at one point on an image plane, an image like a comet having a tail is formed, and the point image extends.
[Configuration of Infrared Sensor]

Figure 24:
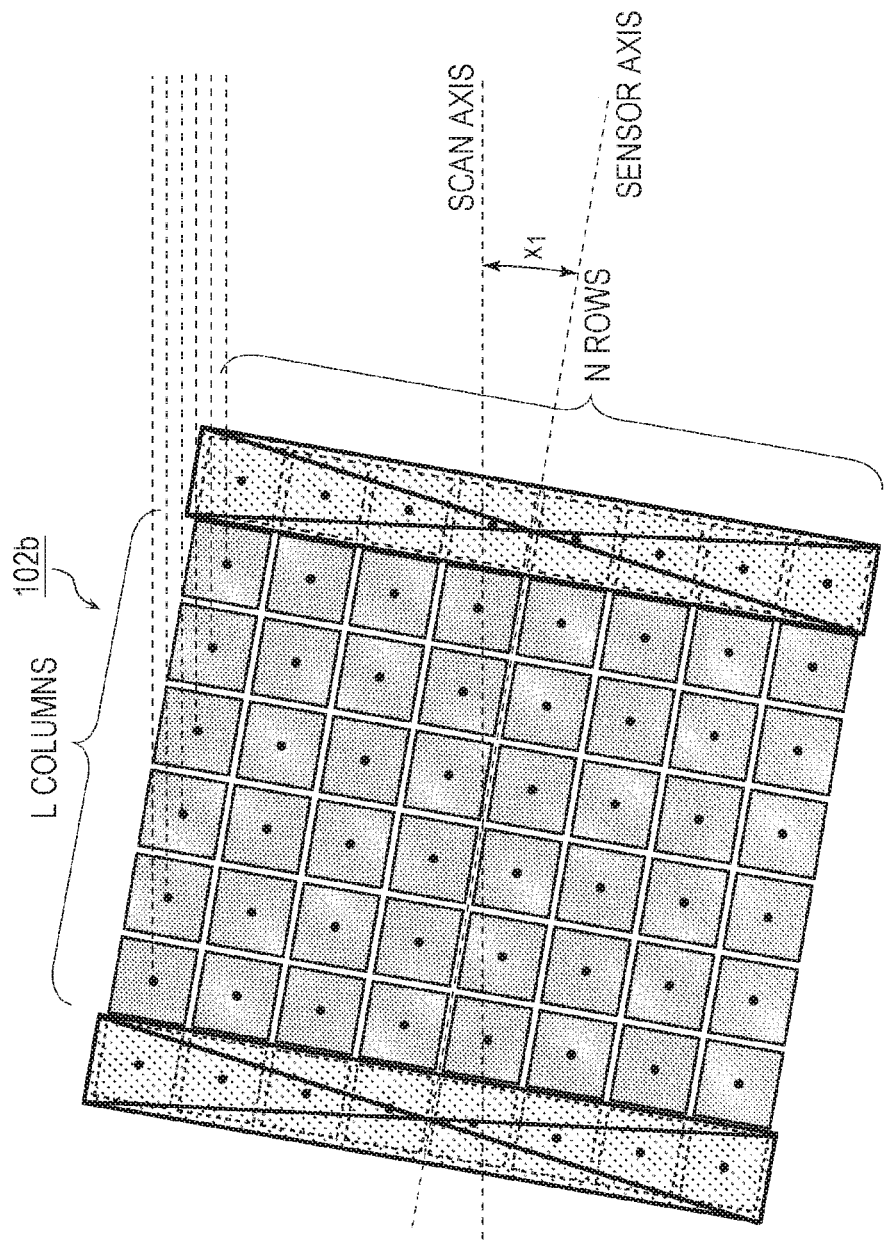
FIG. 24 is a diagram illustrating one example of the configuration of an infrared sensor in a modification of the fourth embodiment.

FIG. 24 is a diagram illustrating one example of the configuration of an infrared sensor 102b in a modification of the fourth embodiment.

The infrared sensor 102b is one example of the infrared sensor 102A. Infrared detection elements constituting the infrared sensor 102b are arranged in N rows and N columns (N is a natural number greater than or equal to 2), and the infrared detection elements in the columns at two opposite ends of the N columns are disabled. That is, the infrared sensor 102b uses particular infrared detection elements that are the infrared detection elements in N rows and L columns, except the columns at two opposite ends of the N columns (L is smaller than N and is a natural number greater than or equal to 2). The reason why the columns at the two opposite ends of the N columns are excluded is that, the farther the infrared detection element of the infrared sensor 102b is from the center, the larger the influences of the comatic aberration and the spherical aberration of the lens used for the infrared sensor 102b become.

The infrared sensor 102b is also inclined at a predetermined angle (X, in FIG. 24) relative to the direction of the scan axis, as in the fourth embodiment. The predetermined angle $X_1$ is an angle adjusted such that all of the respective central positions of the infrared detection elements constituting the infrared sensor 102b and arranged in the N rows and N columns differ from one another, when viewed from the direction of the scan axis. For example, when the infrared sensor 102b is constituted by infrared detection elements in 8 rows and 8 columns, and the particular infrared detection elements are the infrared detection elements in 8 rows and 6 columns, the predetermined angle $X_1$ is 9.462°.

The predetermined angle may be an angle adjusted such that all of the respective central positions of the infrared detection elements in some (N rows and L columns) of the N rows and N columns, not all of the respective central positions of the infrared detection elements constituting the infrared sensor 102b and arranged in the N rows and N columns, differ from one another, when viewed from the direction of the scan axis. In this case, the central positions of the infrared detecting elements in the N rows and L columns may be spaced at equal intervals when viewed from the direction of the scan axis.

In addition, it is desirable that the predetermined angle have a value that satisfies the equation:

$$X_1 = \arctan(1/C_{\mathit{eff}}),$$

where $X_1$ represents the predetermined angle, and $C_{\mathit{eff}}$ represents the number of columns in which the pixels are used.

In this equation, $C_{\mathit{eff}}$ is 6 in the case of FIG. 24. In a case described below and illustrated in FIG. 25, $C_{\mathit{eff}}$ is also 6.
[Advantages, Etc. of Modification]

As described above, according to the infrared detecting device in this modification, it is possible to enhance the resolution of a thermal image without increasing the number of infrared detection elements constituting the infrared sensor. In addition, in this modification, some (particular infrared detection elements) of the infrared detection elements constituting the infrared sensor are used rather than using all of the infrared detection elements. This offers an advantage in that it is possible to reduce the influences of the comatic aberration or the spherical aberration of a lens used for focusing infrared rays on the infrared sensor.

Although, in this modification, a case in which the infrared detection elements except some of the infrared detection elements in the columns at two opposite ends in the direction of the scan axis are enabled and used has been described above as an example in which some of the infrared detection elements constituting the infrared sensor are used, the present disclosure is not limited thereto. For example, some of the infrared detection elements in the columns at the two opposite ends in the direction of the scan axis may also be enabled, as illustrated in FIG. 25.

Figure 25:
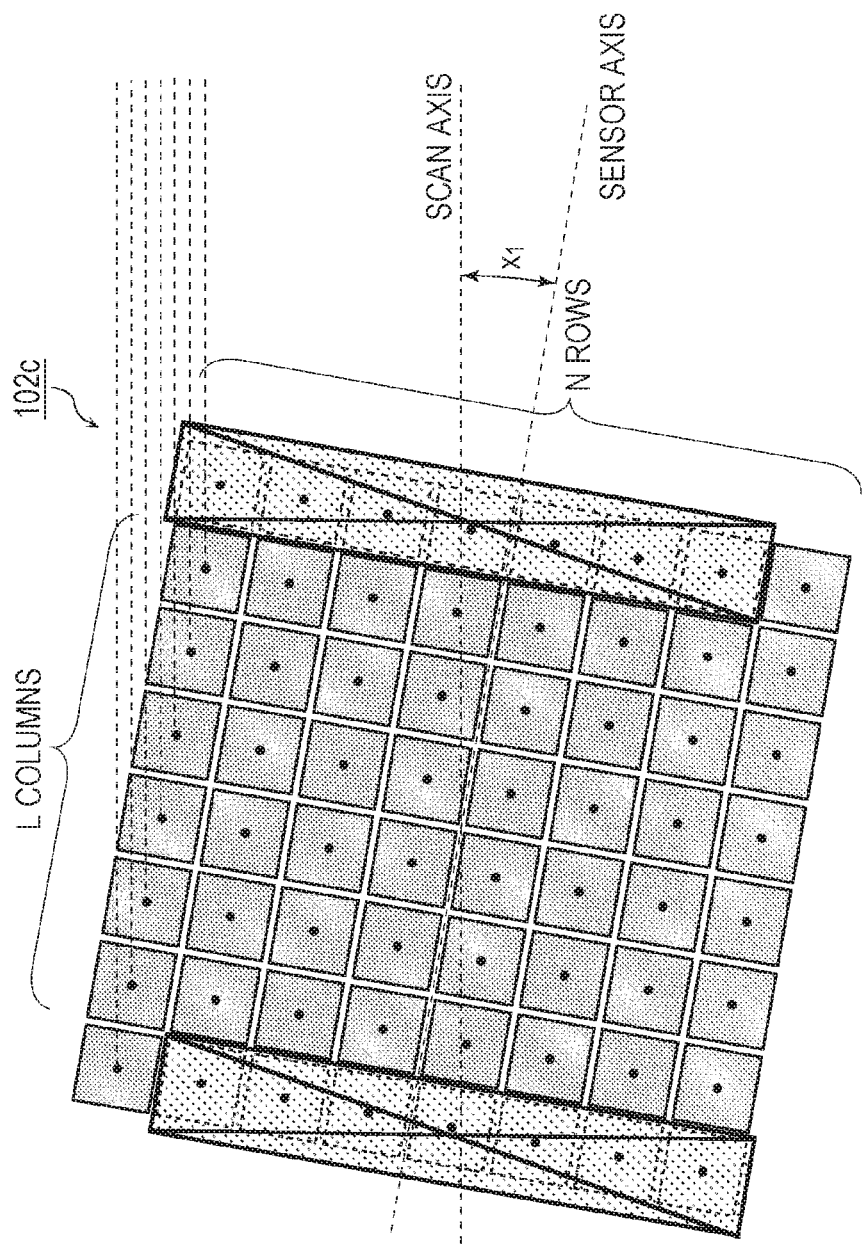
FIG. 25 is a diagram illustrating one example of the configuration of an infrared sensor in another example of the modification of the fourth embodiment.

FIG. 25 is a diagram illustrating one example of the configuration of an infrared sensor in another example of the modification of the fourth embodiment. Elements that are the same as or similar to those in FIG. 24 are denoted by the same reference numerals, and detailed descriptions thereof are not given hereinafter.

An infrared sensor 102c illustrated in FIG. 25 is one example of the infrared sensor 102A and is constituted by infrared detection elements arranged in N rows and N columns (N is a natural number greater than or equal to 2).

In the infrared sensor 102c, the infrared detection elements except some of the infrared detection elements in the columns at two opposite ends of the N column are enabled. More specifically, as illustrated in FIG. 25, the infrared sensor 102c uses the infrared detection elements in N rows and L columns (L is smaller than N and is a natural number greater than or equal to 2) except the columns at two opposite ends of the N columns, the infrared detection element at the lower end at the right end (i.e., of the two opposite ends of the N columns, the end corresponding to the leading end during scanning) in FIG. 25, and the infrared detection element at the upper end at the left end (of the two opposite ends of the N columns, the end corresponding to the trailing end during scanning) in FIG. 25. The reason why the columns at the two opposite ends of the N columns are excluded is that the influences of the comatic aberration and the spherical aberration increase, as described above. The reason why some (particular) infrared detection elements in the columns at the two opposite ends of the N columns are enabled is to increase the number of infrared detection elements in the direction (vertical axis) orthogonal to the scan axis to thereby increase the field of view along the vertical axis, in order to increase the number of pixels of a thermal image in the direction (vertical axis) orthogonal to the scan axis, and also the reason is that the particular infrared detection elements are located at positions where influences of lens distortion can be reduced.
(Fifth Embodiment)

An example of a case in which some of all the infrared detection elements constituting the infrared sensor are enabled is not limited to the above-described examples. In a fifth embodiment, a description will be given of another configuration example of the particular infrared detection elements. Differences from the fourth embodiment will be mainly described below.
[Configuration of Infrared Sensor]

Figure 26:
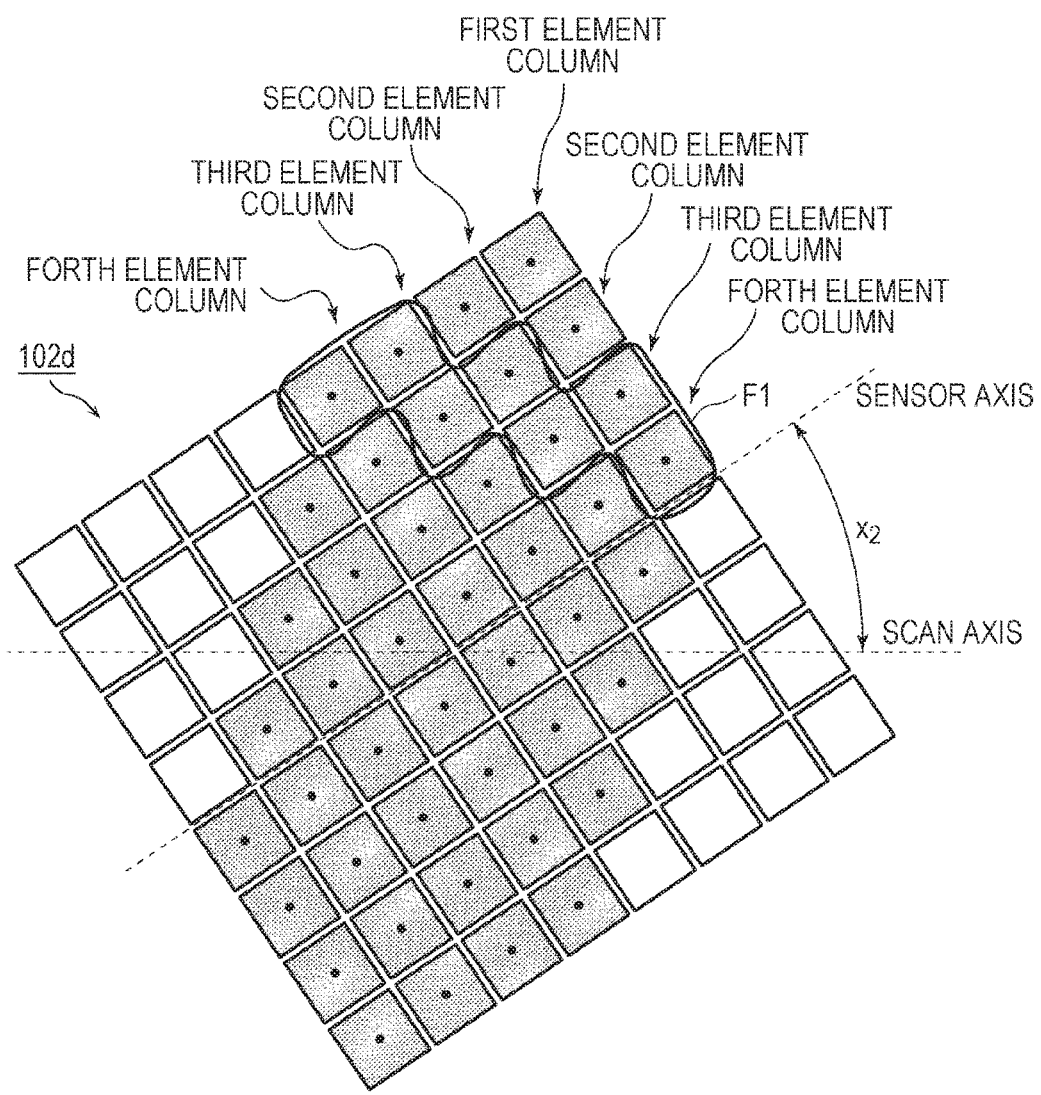
FIG. 26 is a diagram illustrating a configuration example of one example of an infrared sensor in a fifth embodiment.
Figure 27:
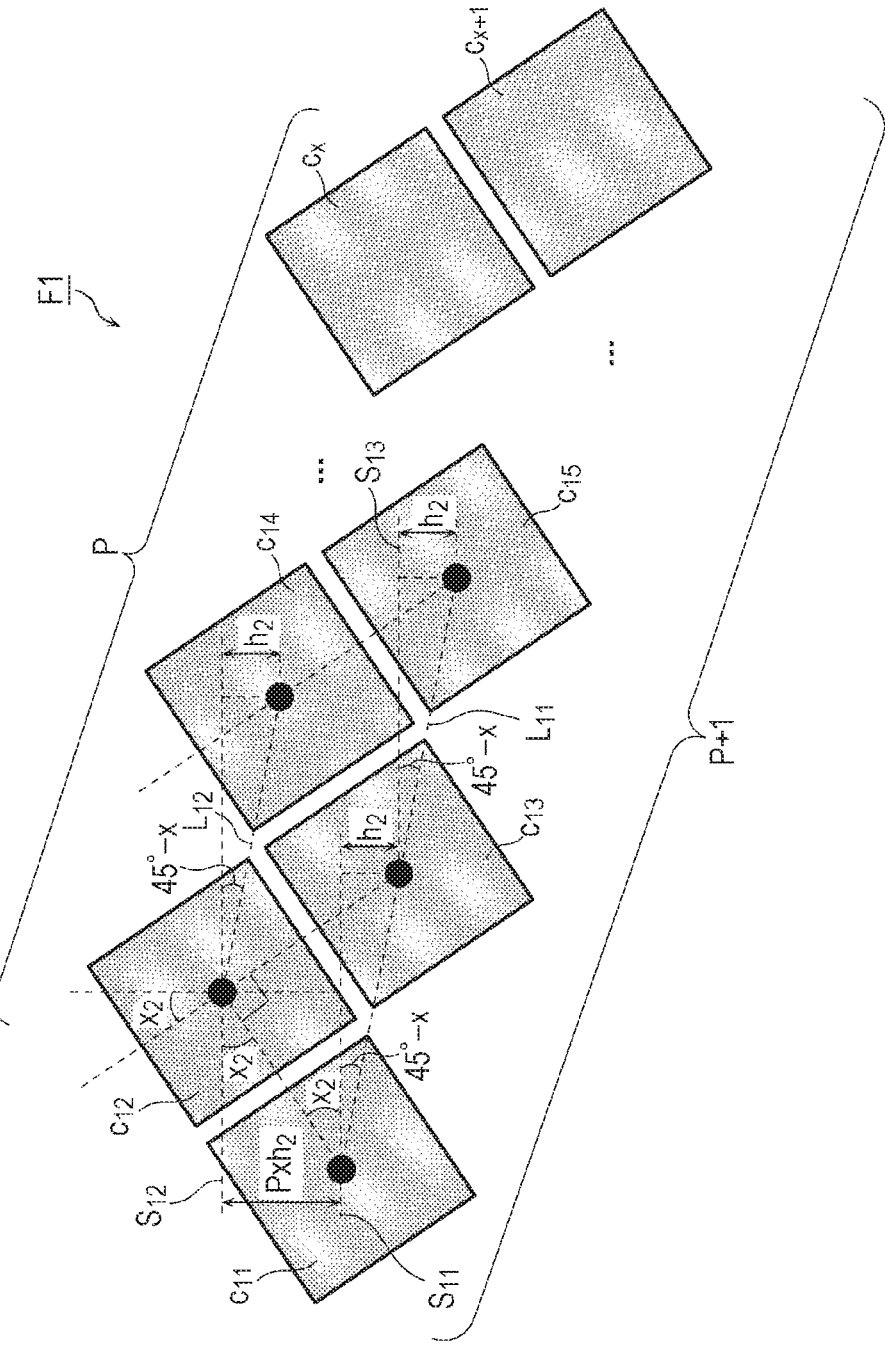
FIG. 27 is a diagram for describing an inclination of the infrared sensor illustrated in FIG. 25.

FIG. 26 is a diagram illustrating a configuration example of one example of an infrared sensor in the fifth embodiment. FIG. 27 is a diagram for describing the inclination of the infrared sensor illustrated in FIG. 26.

An infrared sensor 102d is one example of the infrared sensor 102A. Particular ones of the infrared detection elements constituting the infrared sensor 102d are enabled, and the infrared detection elements other than the particular infrared detection elements are disabled.

In the present embodiment, the infrared detection elements constituting the infrared sensor 102d are arranged in N rows and N columns (N is a natural number greater than or equal to 2), and the particular infrared detection elements are the infrared detection elements other than the infrared detection elements at, of the N rows and N columns, two opposite ends in the direction of the scan axis.

More specifically, the particular infrared detection elements illustrated in FIG. 26 have a first element column, which includes the infrared detection elements arranged along a first diagonal line having the larger angle relative to the direction of the scan axis of two diagonal lines of the N rows and N columns, second element columns, which include the infrared detection elements arranged adjacent to the first element column and along the first diagonal line, third element columns, which include the infrared detection elements arranged adjacent to the second element columns and along the first diagonal line, and fourth element columns, which include the infrared detection elements arranged adjacent to the third element columns and along the first diagonal line. That is, of the infrared detection elements constituting the infrared sensor 102d, the infrared detection elements in the first to fourth element columns are enabled as the particular infrared detection elements, and the other infrared detection elements are disabled.

The infrared sensor 102d is also inclined at a predetermined angle ($x_2$ in FIG. 26) relative to the direction of the scan axis, as in the fourth embodiment. The predetermined angle $x_2$ is an angle adjusted such that all of the respective central positions of the particular infrared detection elements differ from one another, when viewed from the direction of the scan axis.

Now, a method for calculating the predetermined angle $x_2$ will be described with reference to FIG. 27, which is a partial diagram of an area F1 illustrated in FIG. 26, by way of example. In FIG. 27, dotted lines $S_{11}$, $S_{12}$, and $S_{13}$ are parallel to the scan axis. A dotted line $L_1$, connects infrared detection elements $c_{11}$, $c_{13}$, and $c_{15}$ and is parallel to the sensor axis. Similarly, a dotted line $L_{12}$ connects infrared detection elements $c_{12}$ and $c_{14}$ and is parallel to the sensor axis. Also, each of the dashed lines $L_{11}$, and $L_{12}$ is orthogonal to the first diagonal line. That is, each of the dashed lines $L_{11}$ and $L_{12}$ is parallel to a second diagonal line, which is one of the two diagonal lines of the matrix with N rows and N columns and forms a smaller angle with respect to the direction of the scan axis. The infrared detecting elements $c_{11}$, $c_{13}$, and $c_{15}$ are aligned along a direction parallel to the second diagonal line. The infrared detecting elements $c_{12}$ and $c_{14}$ are aligned along the direction parallel to the second diagonal line.

For example, a distance $h_2$ in a direction (in FIG. 27, the vertical direction) orthogonal to the scan axis between the respective central positions of the infrared detection elements $c_1$, and $c_{13}$, a distance $h_2$ in the direction (in FIG. 27, the vertical direction) orthogonal to the scan axis between the respective central positions of the infrared detection elements $c_{13}$ and $c_{15}$, and a distance $h_2$ in the direction (in FIG. 27, the vertical direction) orthogonal to the scan axis between the respective central positions of the infrared detection elements $c_{12}$ and $c_{14}$ are all equal to each other. The distance in the direction (in FIG. 27, the vertical direction) orthogonal to the scan axis between the respective central positions of the infrared detection elements $c_{11}$ and $c_{12}$ is $h_2$ times of P (i.e., $P \times h_2$), where P is "the number of element columns"$-1$.

By calculating an angle $x_2$ that satisfies such a relationship, it is possible to calculate the predetermined angle $x_2$. Specifically, such a relationship can be represented as relational expressions:

$$\sin(x_2) = Ph_2/D_1$$

$$\sin(45-x_2) = h_2/(\sqrt{2} \cdot D_1)$$

where $D_1$ represents the distance between the infrared detection elements and is, for example, the distance (the distance on the sensor axis) between the central positions of the infrared detection elements $c_{11}$ and $c_{12}$.

By solving the relational expressions, it is possible to calculate the predetermined angle $x_2$. That is, the above-noted relational expressions are solved to obtain $\sin(x_2) = P\sqrt{2} \cdot \sin(45-x_2)$, that is, $\sin(x_2) = P\cos(x_2) - P\sin(x_2)$, which is then transformed into $\tan(x_2) = P/(P+1)$, to thereby make it possible to calculate the predetermined angle $x_2 = \tan^{-1}(P/P+1)$.

One example of the predetermined angle will be described below in conjunction with an illustrative example.
(Illustrative Example)

One example of the configuration of an infrared sensor 102e in an illustrative example will be described below with reference to FIGS. 28 and 29.

Figure 28:
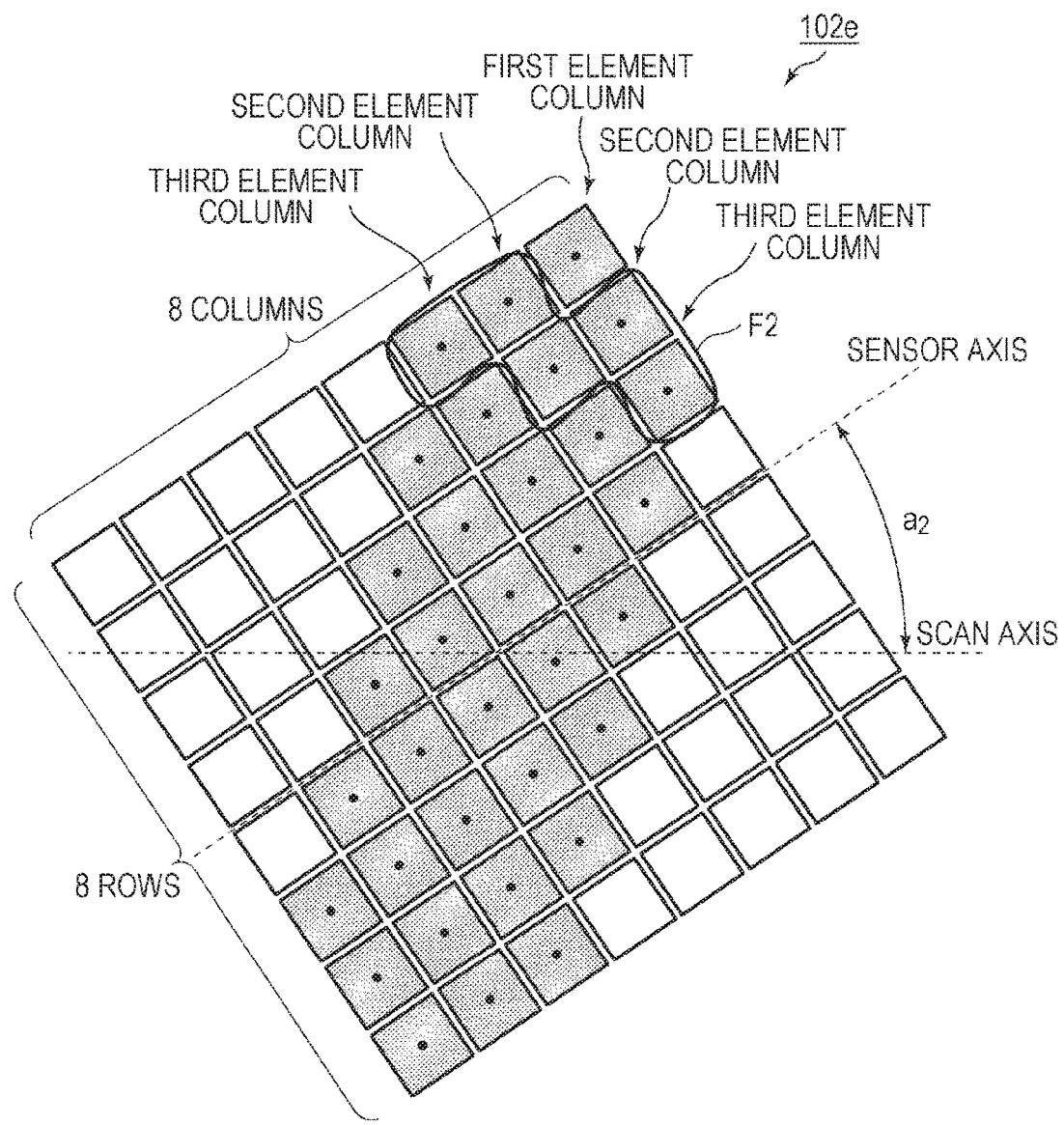
FIG. 28 is a diagram illustrating one example of the configuration of an infrared sensor in an illustrative example of the fifth embodiment.

FIG. 28 is a diagram illustrating one example of the configuration of an infrared sensor in an illustrative example of the fifth embodiment. FIG. 29 is a diagram for describing an inclination of the infrared sensor illustrated in FIG. 28.

The infrared sensor 102e illustrated in FIG. 27 is one example of the infrared sensor 102A and is constituted by infrared detection elements arranged in 8 rows and 8 columns. In the infrared sensor 102e, some (particular infrared detection elements) of the infrared detection elements are enabled, and the infrared detection element other than some of the infrared detection elements are disabled.

In this illustrative example, the infrared detection elements constituting the infrared sensor 102e are arranged in 8 rows and 8 columns, and the particular infrared detection elements are the infrared detection elements other than the infrared detection elements at, of the 8 rows and 8 columns, two opposite ends in the direction of the scan axis.

More specifically, the particular infrared detection elements illustrated in FIG. 28 has a first element column, which includes the infrared detection elements arranged along a first diagonal line having the larger angle relative to the direction of the scan axis of two diagonal lines of the 8 rows and 8 columns, second element columns, which include the infrared detection elements arranged adjacent to the first element column and along the first diagonal line, and third element columns, which include the infrared detection elements arranged adjacent to the second element columns and along the first diagonal line. That is, of the infrared detection elements constituting the infrared sensor 102e, the infrared detection elements in the first to third element columns are enabled as the particular infrared detection elements, and the other infrared detection elements are disabled.

The infrared sensor 102e is also inclined at a predetermined angle ($a_2$ in FIG. 28) relative to the direction of the scan axis. The predetermined angle $a_2$ is an angle adjusted such that all of the respective central positions of the particular infrared detection elements described above differ from one another, when viewed from the direction of the scan axis.

Now, a method for calculating the predetermined angle $a_2$ will be described with reference to FIG. 29, which is a partial diagram of an area F2 illustrated in FIG. 28, by way of example. In FIG. 29, dotted lines $S_{21}$, $S_{22}$, and $S_{23}$ are parallel to the scan axis. A dotted line $L_{21}$ connects infrared detection elements $c_{21}$, $c_{23}$, and $c_{25}$ and is parallel to the sensor axis. Similarly, a dotted line $L_{22}$ connects infrared detection elements $c22$ and $c_{24}$ and is parallel to the sensor axis.

In this case, first distances $h_3$ that are the distances in the direction orthogonal to the direction of the scan axis between the central position of a first element (the infrared detection element $c_{23}$), which is the infrared detection element belonging to the first element column, and the central positions of third and second elements (the infrared detection elements $c_{21}$ and $c_{25}$), which are the infrared detection elements that are included in the infrared detection elements adjacent to the infrared detection elements arranged in a row direction having a predetermined angle relative to the direction of the scan axis and including the first element (the infrared detection element $c_{23}$), that are adjacent to the first element (the infrared detection element $c_{23}$), and that belong to the third element column, are equal to each other. In addition, a second distance that is the distance in the direction orthogonal to the direction of the scan axis between the central position of the second element (the infrared detection element $c_{21}$), which is included in the third and second elements (the infrared detection element $c_{21}$ and $c_{25}$) and corresponds to the tail end in the scan direction, and the central position of a fourth element (the infrared detection element $c_{24}$), which is the infrared detection element that is included in the infrared detection elements arranged in the row direction and including the first element (the infrared detection element $c_{23}$), that is adjacent to the first element (the infrared detection element $c_{23}$), that is not adjacent to the third element (the infrared detection element $c_{21}$), and that belongs to the second element column, is equal to the first distance. Additionally, a third distance that is the distance in the direction orthogonal to the direction of the scan axis between the central position of the fourth element (the infrared detection element $c_{24}$) and the central position of a fifth element (the infrared detection element $c_{22}$), which is the infrared detection element that is included in the infrared detection elements arranged in the row direction and including the third element (the infrared detection element $c_{21}$), that is adjacent to the third element (the infrared detection element $c_{21}$), and that belongs to the second element column, is equal to the first distance.

Figure 29:
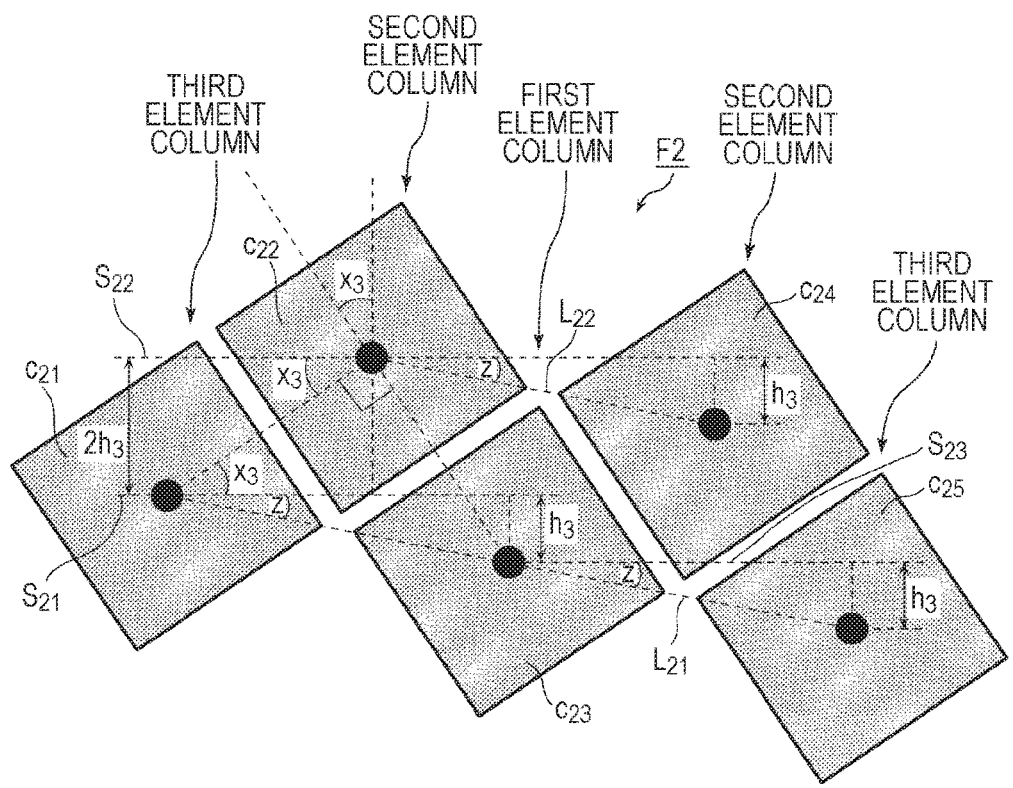
FIG. 29 is a diagram for describing an inclination of the infrared sensor illustrated in FIG. 28.

More specifically, as illustrated in FIG. 29, for example, a distance $h_3$ in the direction (in FIG. 29, the vertical direction) orthogonal to the scan axis between the respective central positions of the infrared detection elements $c_{21}$ and $c_{23}$, a distance $h_3$ in the direction (in FIG. 29, the vertical direction) orthogonal to the scan axis between the respective central positions of the infrared detection elements $c_{23}$ and $c_{25}$, and a distance $h_3$ in the direction (in FIG. 29, the vertical direction) orthogonal to the scan axis between the respective central positions of the infrared detection elements $c_{22}$ and $c_{24}$ are all equal to each other. For example, the distance in the direction (in FIG. 29, the vertical direction) orthogonal to the scan axis between the respective central positions of the infrared detection elements $c_{21}$ and $c_{22}$ is 2 $h_3$ (("the number of element column"−1)×$h_3$).

By calculating an angle $x_3$ that satisfies such a relationship, it is possible to calculate the predetermined angle $a_2$. Specifically, such a relationship can be represented as relational expressions:

$$\sin(x_3)=2h_3/D_2$$

$$\sin(z)=h_3/(\sqrt{2}\cdot D_2)$$

$$z=45-x_3$$

where $D_2$ represents the distance between the infrared detection elements and is, for example, the distance (the distance on the sensor axis) between the respective central positions of the infrared detection elements $c_{21}$ and $c_{22}$.

By solving the relational expressions, it is possible to calculate the predetermined angle $a_2$. That is, the above-noted relational expressions are solved to obtain $\sin(x_3)=2\sqrt{2}\cdot\sin(z)$, that is, $\sin(x_3)=2\cos(x_3)-2\sin(x_3)$, which is then converted into $\tan(x_3)=2/3$, to thereby make it possible to determine $x_3=33.69°$. Thus, the predetermined angle $a_2$ is calculated to be 33.69°.

Accordingly, the infrared sensor 102e is constituted by 8×8 infrared detection elements that are parallel and orthogonal to the sensor axis, which has an inclination of 33.69° (the predetermined angle $a_2$) relative to the scan axis. With this arrangement, of the infrared detection elements constituting the infrared sensor 102e and arranged in the 8 rows and 8 columns, the respective central positions of the infrared detection elements in the first to third element columns which are enabled as particular infrared detection elements differ from one another, when viewed from the direction of the scan axis, and do not overlap one another in the direction of the scan axis. Thus, since the number of infrared detection elements in the direction orthogonal to the scan axis can be increased in the infrared sensor 102e, it is possible to substantially increase the number of pixels of a thermal image in the direction (the vertical axis) orthogonal to the scan axis.

Although, in the illustrative example, the infrared sensor 102e has been described as being constituted by infrared detection elements in 8 rows and 8 columns, the present disclosure is not limited thereto. For example, the infrared detection elements may be infrared detection elements in 4 rows and 4 columns, infrared detection elements in 32 rows and 32 columns, or infrared detection elements in 16 rows and 16 columns. This is because infrared detection elements in N rows and N columns (N is a natural number greater than or equal to 2) are available as off-the-shelf products, and thus it is possible to reduce the cost of employing the infrared sensor.

Figure 30:
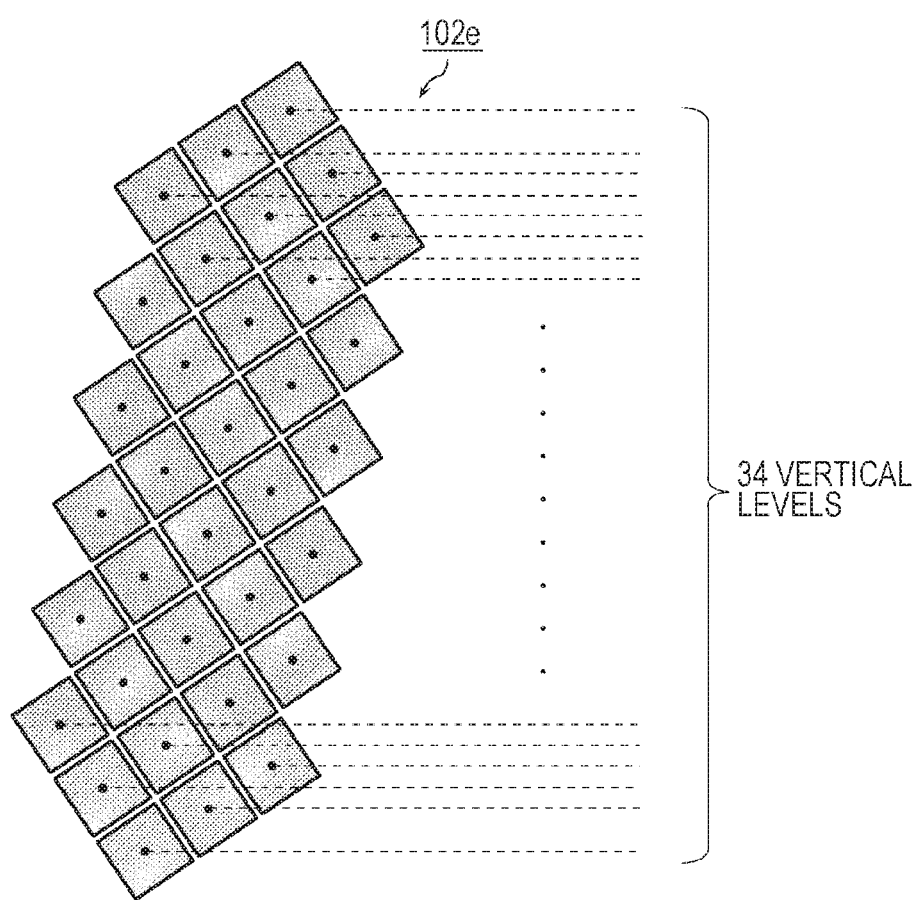
FIG. 30 is a diagram for describing an advantage of the infrared detecting device when the infrared sensor illustrated in FIG. 27 is used.

FIG. 30 is a diagram for describing an advantage of the infrared detecting device when the infrared sensor 102e illustrated in FIG. 27 is used.

The infrared sensor 102e illustrated in FIG. 30 is inclined at 33.69° relative to the direction of the scan axis (i.e., relative to the horizontal direction). That is, the sensor axis of the infrared sensor 102e is inclined at 33.69° relative to the scan axis. In this case, when the infrared sensor 102e is rotated (moved) in the direction of the scan axis, the particular infrared detection elements in the direction (the column direction) parallel to the scan axis do not overlap one another. As a result, the number of particular infrared detection elements in the direction orthogonal to the scan axis increases to 34 (34 vertical levels), which is larger than 8 (8 vertical levels), which is the number of infrared detection elements in the row direction of the infrared sensor 102e.

Since the infrared detecting device 1A has the infrared sensor 102e constituted by the infrared detection elements whose sensor axis is inclined at an angle of 33.69° relative to the scan axis, as described above, it is possible to acquire a thermal image having a resolution that is 4.25 times as high as that in the comparative example, without increasing the number of infrared detection elements in the infrared sensor 102e. In addition, when the control processor 12 performs super resolution processing on the thermal image, the infrared detecting device 1A can acquire a thermal image having a more enhanced resolution.

[Advantages, Etc. of Fifth Embodiment]

As described above, according to the infrared detecting device in the present embodiment, it is possible to enhance the resolution of thermal images without increasing the number of infrared detection elements constituting the infrared sensor. In addition, in the present embodiment, since some, not all, of the infrared detection elements constituting the infrared sensor are used, there is an advantage in that it is possible to reduce influences of the comatic aberration and the spherical aberration of the lens used for focusing infrared rays on the infrared sensor.

The predetermined angle in this case is an angle adjusted such that all of the respective central positions of particular ones of the infrared detection elements constituting the infrared sensor differ from one another, when viewed from a predetermined direction that is the scan direction. For example, when the infrared sensor is constituted by infrared detection elements in 8 rows and 8 columns, and the infrared detection elements in the first to third element columns are enabled as the particular infrared detection elements, the predetermined angle is 33.69°.

In this case, when compared with a case in which infrared detection elements in 8 rows and 8 columns are used, the infrared detection elements in the three element columns offer an advantage in that the scanning time, that is, the time (the infrared detection time) for scanning the temperature detection range, can be reduced, since the number of infrared detection elements that are arranged generally parallel to the scan axis is small. This also offers an advantage in that the resolution can be enhanced.

The infrared detecting device in the present embodiment can not only reduce the cost of the motor for acquiring a high-resolution thermal image, as in the fourth embodiment, but also reduce the cost for employing an infrared sensor having a larger number of infrared detection elements. The infrared detecting device in the present embodiment can also offer an advantage in that it is easy to install the infrared detecting device on other equipment, such as air-conditioning equipment, as a module, as in the fourth embodiment.

Although, in the fourth and fifth embodiments, a case in which the infrared detection elements are arranged in a matrix with 8 rows and 8 columns (8×8) has been described as one example of the infrared sensor 102A, the present disclosure is not limited thereto. The infrared sensor 102A may be constituted by infrared detection elements arranged in a matrix with 16 rows and 16 columns or with 32 rows and 32 columns or may be constituted by infrared detection elements arranged in a matrix with N rows and M columns (N and M are natural numbers greater than or equal to 2).

(Sixth Embodiment)
[Findings Underlying Sixth Embodiment]

Although each of the sensor modules in the first embodiment and so on has been described above as including the infrared sensor and the lens, the present disclosure is not limited thereto. The sensor module may be a package that accommodates an infrared sensor and an integrated circuit (IC) chip (or an IC element) for performing signal processing on a signal output from the infrared sensor.

In this case, since the IC chip generates heat upon driving, it is necessary to suppress influences on detection results of the infrared sensor which, the influences being caused by the heat generated in the IC chip.

Accordingly, for example, Japanese Unexamined Patent Application Publication No. 2011-174762 (hereinafter referred to as "Patent Document 2") discloses a configuration in which a wall portion is provided between an IC chip and an infrared sensor so as to prevent heat generated in the IC chip from being transmitted to the infrared sensor.

However, a sensor module (package) having an infrared sensor is rotated about the scan rotation axis to scan a detection range. Thus, depending on the arrangement of the IC chip and the infrared sensor, there are cases in which heat generated in the IC chip during scanning reaches the infrared sensor through the atmosphere in the package to thereby adversely affect the detection results of the infrared sensor. That is, in the sensor module (package) disclosed in Patent Document 2, since the arrangement direction (juxtaposition direction) of the IC chip and the infrared sensor has not taken into account, influences on the detection results of the infrared sensor, the influences being caused by heat generated in the IC chip, cannot be suppressed during scanning. Consequently, a detection temperature in a detection range scanned by the infrared sensor may increase owing to the influences of the heat from the IC chip, and sensor characteristics of the infrared sensor may decline.

Accordingly, in a sixth embodiment, a description will be given of an infrared detecting device that can suppress the influences of heat from the IC chip during scanning.

[Configuration of Infrared Detecting Device]

An infrared detecting device in the sixth embodiment will be described below with reference to the accompanying drawings.

Figure 31:
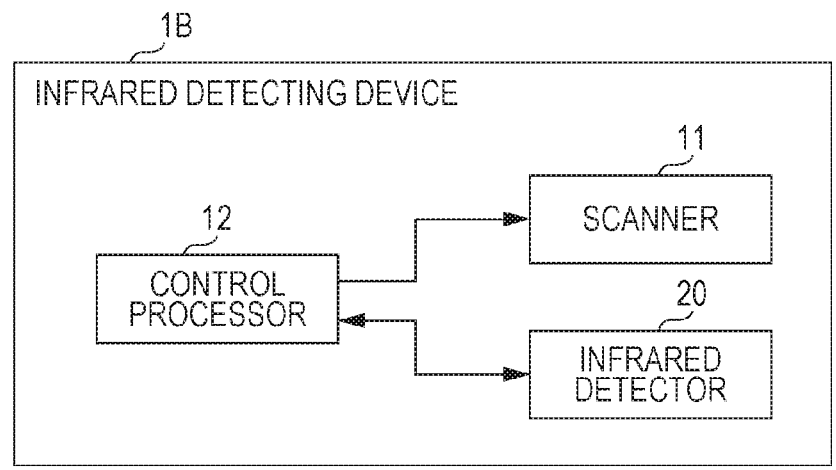
FIG. 31 is a diagram illustrating one example of the configuration of an infrared detecting device in a sixth embodiment.
Figure 32:
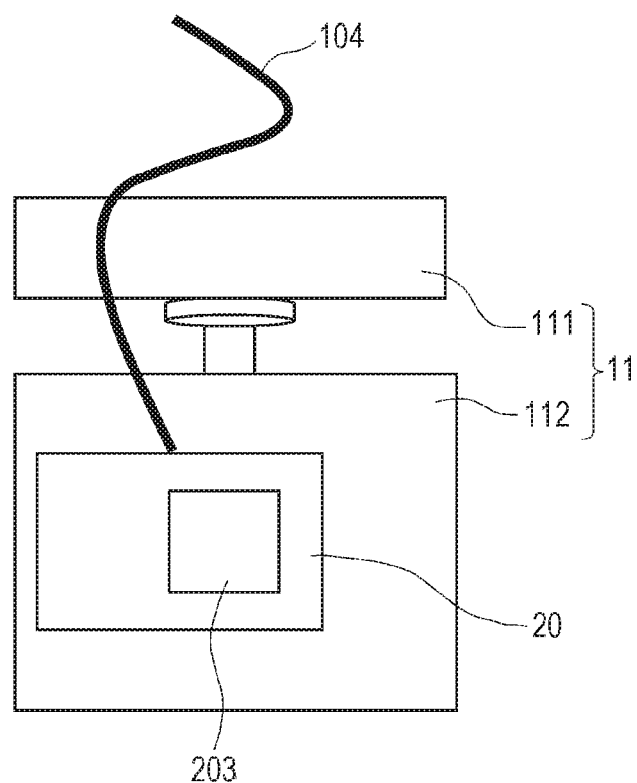
FIG. 32 is a partial schematic view of a physical configuration when the infrared detecting device in the sixth embodiment is attached to the housing.
Figure 33A:
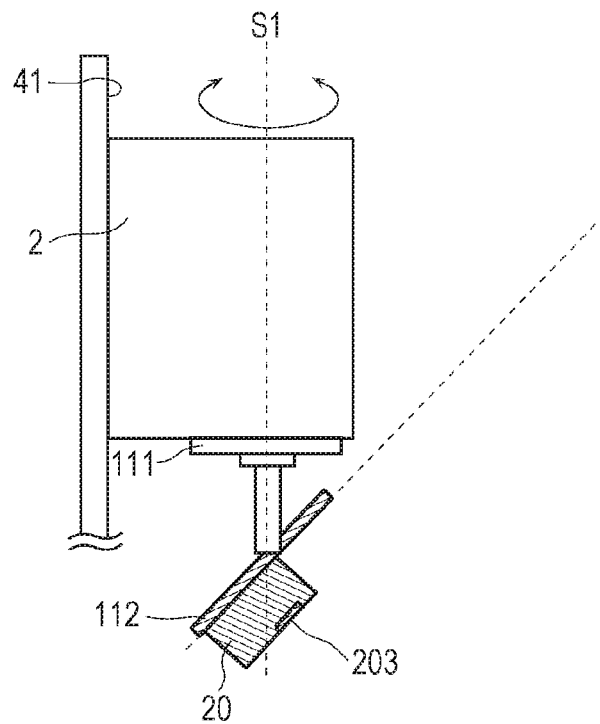
FIG. 33A is a schematic view illustrating a physical configuration of the infrared detecting device in the sixth embodiment.
Figure 33B:
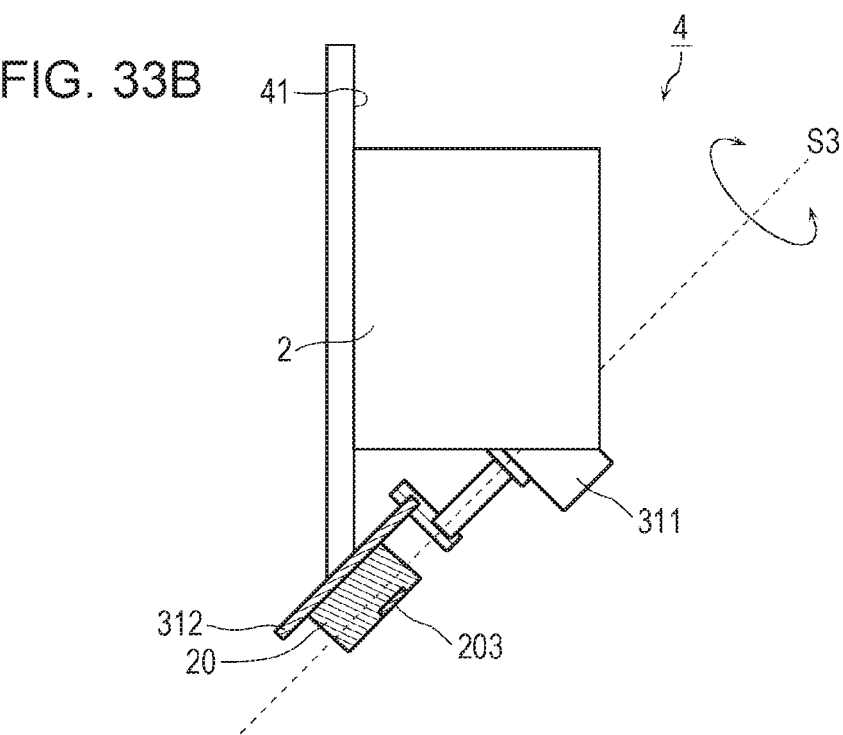
FIG. 33B is a schematic view illustrating another physical configuration of the infrared detecting device in the sixth embodiment.

FIG. 31 is a diagram illustrating one example of the configuration of an infrared detecting device 1B in the present embodiment. FIG. 32 is a partial schematic view of a physical configuration when the infrared detecting device 1B in the present embodiment is attached to the housing. FIG. 33A is a schematic view illustrating a physical configuration of the infrared detecting device 1B in the present embodiment. FIG. 33B is a schematic view illustrating another physical configuration of the infrared detecting device in the present embodiment. Elements that are the same as or similar to those in FIGS. 1 to 4 are denoted by the same reference numerals, and detailed descriptions thereof are not given hereinafter.

Similarly to the case described above and illustrated in FIG. 3, the infrared detecting device 1B in the present embodiment is attached to a housing 2 installed on an installation surface 41 that is generally orthogonal to the bottom surface of space 4 and that is located at a predetermined height from the bottom surface, and acquires thermal images of a detection range in the space 4.

As illustrated in FIG. 31, the infrared detecting device 1B includes an infrared detector 20, a scanner 11, and a control processor 12. The configuration of the infrared detector 20 in the infrared detecting device 1B illustrated in FIG. 31 differs from that in the infrared detecting device 1 according to the first embodiment.

[Scanner]

First, a description will be given of the configuration and so on of the scanner 11 in the present embodiment.

The scanner 11 has a scan rotation axis and rotates the infrared detector 20 about the scan rotation axis to cause an infrared sensor 102, which is included in the infrared detector 20, to scan the space 4.

For example, as illustrated in FIG. 33A, the scanner 11 includes a motor 111 and a mount base 112 and has a scan rotation axis S1 that is generally parallel to the installation surface 41. Under the control of the control processor 12, the motor 111 rotates the mount base 112 about the scan rotation axis S1 to thereby rotate the infrared detector 20 about the scan rotation axis S1. The infrared detector 20 is mounted on the mount base 112. As illustrated in FIG. 33A, the mount base 112 is disposed so as to have an inclination relative to the scan rotation axis S1 and intersects the scan rotation axis S1.

For example, as illustrated in FIG. 33B, the scanner 11 may include a motor 311 and a mount base 312 and have a scan rotation axis S3 having an inclination relative to the installation surface 41. In this case, under the control of the control processor 12, the motor 311 rotates the mount base 312 about the scan rotation axis S3 to thereby rotate the infrared detector 20 about the scan rotation axis S3. The infrared detector 20 is mounted on the mount base 312. The mount base 312 is disposed generally parallel to the scan rotation axis S3.

[Control Processor]

Next, a description will be given of the configuration of the control processor 12 and so on in the present embodiment.

The control processor 12 controls the scanner 11 to process thermal images (input images) acquired by the infrared detector 20 (the infrared sensor 102) and outputs a resulting thermal image to a computing device included in the housing 2. The control processor 12 may be included in the computing device in the housing 2. Since details of processing, such as distortion correction processing and super resolution processing, performed by the control processor 12 are substantially the same as those described above in the first embodiment, descriptions thereof are not given hereinafter. An IC chip 204 (described below) in the infrared detector 20 may perform the distortion correction processing and the super resolution processing.

[Infrared Detector]

Next, a description will be given of the configuration of the infrared detector 20 and so on in the present embodiment.

Figure 34:
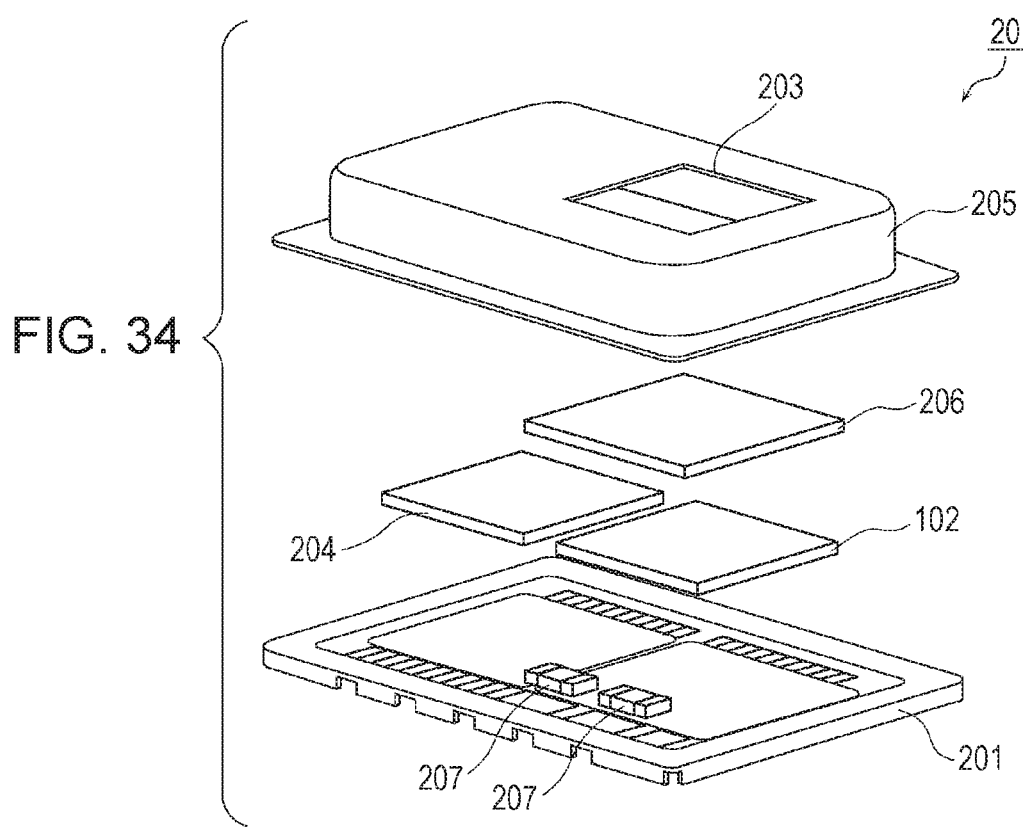
FIG. 34 is an exploded perspective view of an infrared detector in the sixth embodiment.
Figure 35:
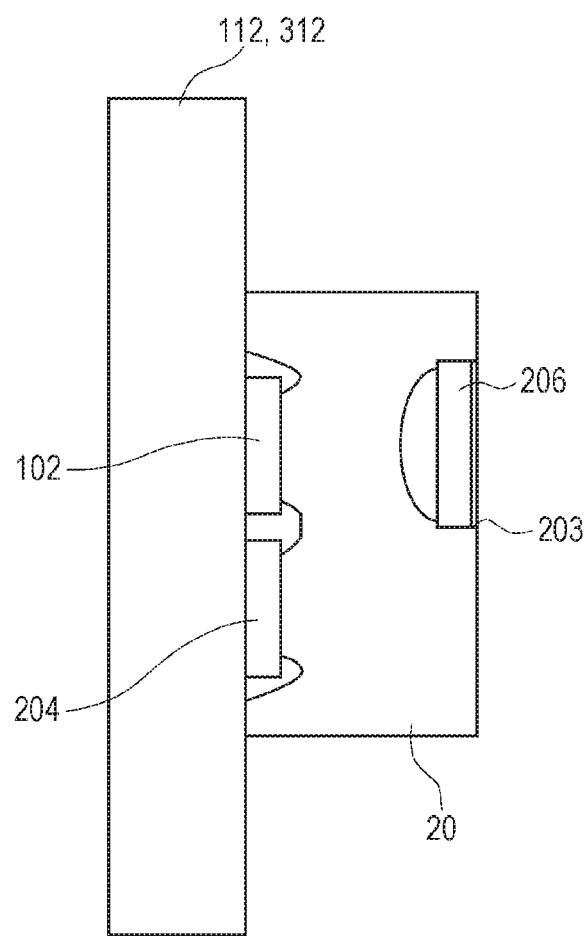
FIG. 35 is a schematic sectional view of the infrared detector in the sixth embodiment.

FIG. 34 is an exploded perspective view of the infrared detector 20 in the present embodiment. FIG. 35 is a schematic sectional view of the infrared detector 20 in the present embodiment.

As illustrated in FIG. 33A or 33B, the scanner 11 rotates the infrared detector 20 about the scan rotation axis S1 or S3 to thereby cause the infrared detector 20 to scan a temperature detection range in the space 4. In the present embodiment, the infrared detector 20 is a package that accommodates the infrared sensor 102 and the IC chip 204 such that they are generally juxtaposed in the direction along the scan rotation axis of the infrared sensor 102. The package corresponds to one aspect of the sensor module in the first embodiment and so on. More specifically, as illustrated in FIG. 34, the infrared detector 20 includes a package main portion 201, the infrared sensor 102, the IC chip 204, a package lid 205 having a window hole 203 therein, and thermistors 207.

The package main portion 201 is formed to have a plate shape, and the infrared sensor 102 and the IC chip 204 are mounted on one surface of the package main portion 201 so as to be generally juxtaposed in the direction along the scan rotation axis S1 or S3 of the infrared sensor 102. The package main portion 201 has two or more thermistors 207 that are arranged in proximity to the infrared sensor 102 along the scan rotation axis S1 or S3. The package lid 205 that surrounds the infrared sensor 102 and the IC chip 204 is joined to the aforementioned surface of the package main portion 201.

For example, an electrically insulating material, such as ceramic or a resin, may be used as a substrate material of the package main portion 201. When ceramic is used as the electrically insulating material of the package main portion 201, the moisture resistance and the heat thermal resistance of the package main portion 201 can be improved, compared with a case in which an organic material, such as an epoxy resin, is used. In addition, the package main portion 201 has a wiring pattern (not illustrated) to which the infrared sensor 102, the IC chip 204, and so on are electrically connected. The package main portion 201 also has electrodes (not illustrated) for external connection, which are appropriately connected to the wiring pattern. The package main portion 201 can be configured with, for example, a ceramic substrate or a printed wiring board.

As described above, the package lid 205 surrounds the infrared sensor 102 and the IC chip 204 and is joined to the aforementioned surface of the package main portion 201. The window hole 203 in the package lid 205 is located at a position that faces the infrared sensor 102, and infrared rays travel to the infrared sensor 102 through the window hole 203. The window hole 203 is provided with a lens 206 which guides infrared light (infrared rays) to the infrared sensor 102.

As described above, the lens 206 is made of silicon, ZnS, or the like having a high infrared transmittance. The lens 206 is designed so that infrared rays (infrared light) that enter the lens 206 from individual directions are incident on one or more infrared detection elements constituting the infrared sensor 102.

In the present embodiment, the lens 206 has an optical center through which the scan rotation axis S1 or S3 passes. Thus, the infrared detector 20 (the infrared sensor 102) and the lens 206 are rotated and driven about the scan rotation axis S1 or S3 that passes through the optical center of the lens 206.

The present disclosure is not limited to a case in which the scan rotation axis S1 or S3 passes through the optical center of the lens 206. The center (lens center) of the arrangement plane of the infrared sensor 102 may have a rotation center through which the scan rotation axis S1 passes, that is, a rotation center when the infrared sensor 102 is rotated about the scan rotation axis S1.

The thermistors 207 are arranged in close proximity to the infrared sensor 102 in the package main portion 201 to detect temperatures on the infrared sensor 102 and generate analog output voltages corresponding to the temperatures on the infrared sensor 102. In the present embodiment, the number of thermistors 207 is two or more, and the thermistors 207 are arranged in proximity to the infrared sensor 102 along the scan rotation axis S1 or S3. The thermistors 207 output the generated output voltages to the IC chip 204.

Thermocouples may be used instead of the thermistors 207, as long as they can detect temperatures on the infrared sensor 102.

[IC Chip]

Next, a description will be given of the configuration of the IC chip 204 and so on in the present embodiment.

The IC chip 204 is, for example, an application-specific integrated circuit (ASIC) and performs signal processing on a signal output from the infrared sensor 102. The IC chip 204 is not limited to an ASIC and may be an element into which a desired signal processing circuit is integrated. The IC chip 204 may be formed using, for example, a silicon substrate or may be formed using, for example, a compound semiconductor substrate, such as a gallium arsenide (GaAs) substrate or an indium phosphide (InP) substrate.

In the present embodiment, the IC chip 204 is a bare chip. This is because use of a bare chip makes it possible to miniaturize the infrared detector 20, compared with a case in which a bare chip of the IC chip 204 is packaged.

As described above, the IC chip 204 is mounted on the package main portion 201 in conjunction with the infrared sensor 102. The IC chip 204 and the infrared sensor 102 are generally juxtaposed in the direction along the scan rotation axis of the infrared sensor 102.

In this case, on the basis of output results of two or more thermistors 207, the IC chip 204 may perform correction processing on an output signal of the infrared sensor 102 and perform signal processing on the output signal on which the correction processing was performed. Thus, since the IC chip 204 can perform temperature correction on a thermal image by using the thermistors 207, the infrared detector 20 can acquire a clearer thermal image having less noise. The IC chip 204 may also incorporate some of the functions of the control processor 12 to perform super resolution processing, as described above.

The IC chip 204 cooperates with the infrared sensor 102. The circuit configuration of the IC chip 204 may be appropriately designed according to the types of infrared sensor 102 and so on, and may be implemented using, for example, a signal processing circuit that performs signal processing on an output signal of the infrared sensor 102. The following description will be given of one example of the circuit configuration of the IC chip 204.

Figure 36:
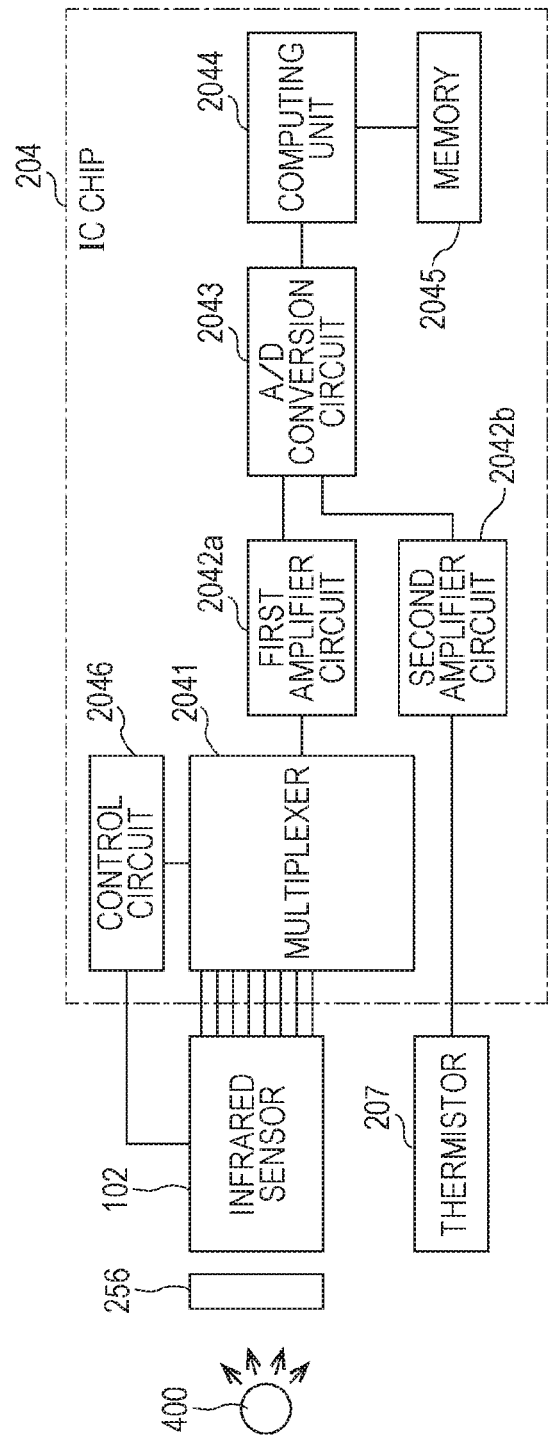
FIG. 36 is a circuit block diagram of an IC chip in the sixth embodiment.

FIG. 36 is a circuit block diagram of the IC chip 204 in the present embodiment.

As illustrated in FIG. 36, the IC chip 204 includes a first amplifier circuit 2042a that amplifies an output voltage of the infrared sensor 102, a second amplifier circuit 2042b that amplifies output voltages of the thermistors 207, and a multiplexer 2041 that selectively inputs one of output voltages of the infrared sensor 102 to the first amplifier circuit 2042a. The IC chip 204 further includes an analog-to-digital (A/D) conversion circuit 2043, which converts the voltage, output from the infrared sensor 102 and amplified by the first amplifier circuit 2042a, and the voltages, output from the thermistors 207 and amplified by the second amplifier circuit 2042b, into digital values. The IC chip 204 further includes a computing unit 2044. By using digital values that are output from the A/D conversion circuit 2043 in accordance with the voltages output from the infrared sensor 102 and the thermistors 207, the computing unit 2044 computes the temperature of an object 400. The IC chip 204 further includes a memory 2045, which is a storage unit for storing data and so on used in computation performed by the computing unit 2044. The IC chip 204 further includes a control circuit 2046 that controls the infrared sensor 102.

[Configuration of Infrared Sensor]

Next, a description will be given of the configuration of the infrared sensor 102.

The infrared sensor 102 is rotated about the scan rotation axis S1, as illustrated in FIG. 33A, to scan the temperature detection range in the space 4 and outputs an output signal representing a thermal image (an infrared thermal image) of the scanned temperature detection range to the IC chip 204. Specifically, the infrared sensor 102 has one or more infrared detection elements arranged in one or more columns and detects infrared rays in a temperature detection range in the space 4 scanned by the one or more infrared detection elements.

The arrangement plane of the one or more infrared detection elements is arranged so as to have an inclination relative to the installation surface 41. In other words, the arrangement plane is provided so as to have an inclination relative to the scan rotation axis S1. The arrangement plane intersects the scan rotation axis S1. Thus, the central axis of the field of view of the infrared sensor 102 is directed from the direction orthogonal to the installation surface 41 toward the bottom surface, that is, is directed downward, for example, as described above and illustrated in FIG. 3.

Thus, the area near and below the position where the infrared sensor 102 is disposed is included in the effective viewing angle (angle of view). With the arrangement described above, the infrared sensor 102 in the present embodiment can increase the detection range in the area near and below the position where the infrared sensor 102 is disposed.

Although a case in which the scan rotation axis S1 or S3 passes through the optical center of the lens 206 has been described in the present embodiment, the rotation center through which the scan rotation axis S1 passes, the rotation center being used when the infrared sensor 102 is rotated about the scan rotation axis S1 or S1, may be provided at the center (the lens center) of the arrangement plane of the infrared sensor 102, not at the optical center of the lens 206.

Also, the arrangement described above in each of the second to fifth embodiments may be employed as an arrangement of the infrared detection elements constituting the infrared sensor 102. Examples of the arrangement of infrared detection elements constituting the infrared sensor 102 will be described below with reference to the accompanying drawings.

FIGS. 37, 38, 39A, and 39B are schematic views illustrating examples of the arrangement of infrared detection elements included in the infrared sensor in the present embodiment. Elements that are the same as or similar to those in FIGS. 2, 19A, 20, and so on are denoted by the same reference numerals, and detailed descriptions thereof are not given hereinafter.

(First Arrangement Example)

Figure 37:
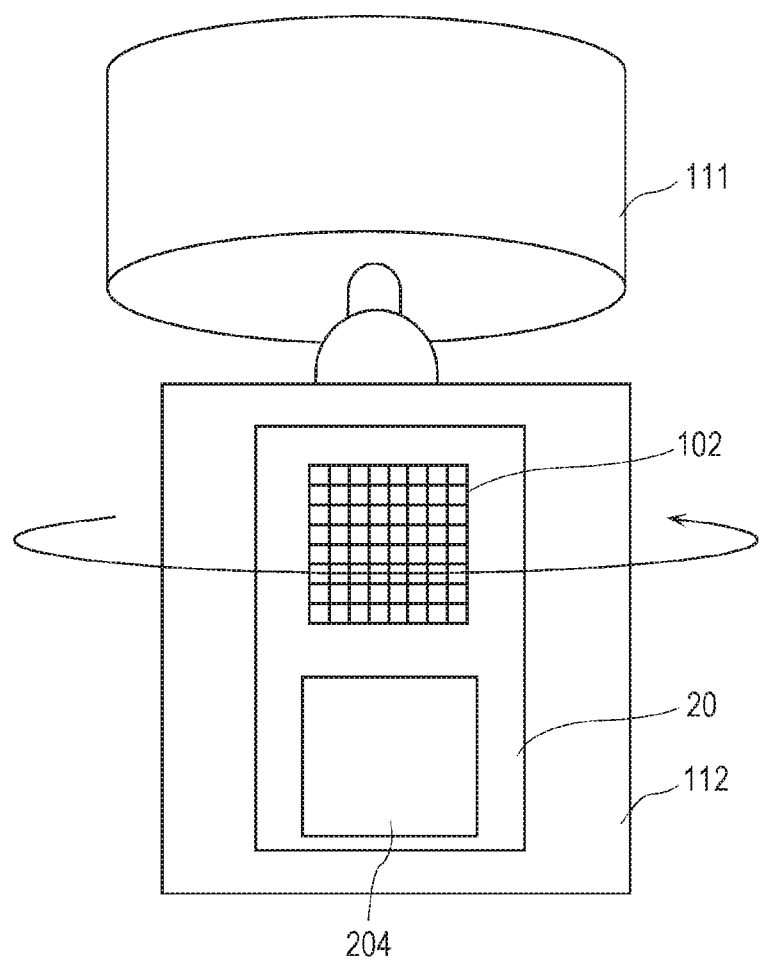
FIG. 37 is a schematic view illustrating one example of an arrangement of infrared detection elements constituting an infrared sensor in the sixth embodiment.

For example, the infrared sensor 102 and the IC chip 204 may be juxtaposed (or generally juxtaposed) in the direction along the scan rotation axis S1 (or the scan rotation axis S3) of the infrared sensor 102, as illustrated in FIG. 37, and the columns of the infrared detection elements constituting the infrared sensor 102 may be arranged along the direction of rotation about the scan rotation axis S1.

(Second Arrangement Example)

Figure 38:
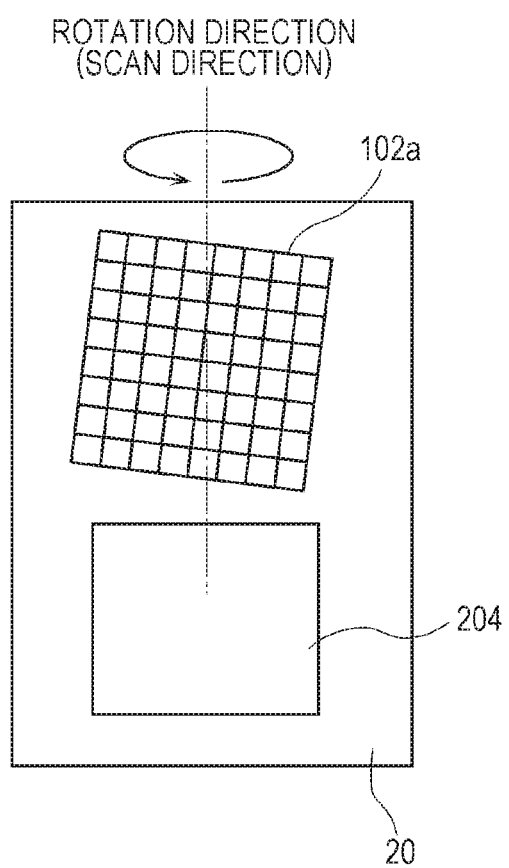
FIG. 38 is a schematic view illustrating one example of the arrangement of the infrared detection elements constituting the infrared sensor in the sixth embodiment.

For example, the infrared sensor 102 may also be an infrared sensor 102a illustrated in FIG. 38. That is, as illustrated in FIG. 38, the infrared sensor 102a and the IC chip 204 may be juxtaposed (or generally juxtaposed) in the direction along the scan rotation axis S1 (or the scan rotation axis S3) of the infrared sensor 102a, and the columns of the infrared detection elements constituting the infrared sensor 102*a* may be arranged so as to have an inclination at a predetermined angle relative to the direction of rotation about the scan rotation axis S1 (or the scan rotation axis S3). The "predetermined angle" in this case refers to an angle adjusted such that all of the respective central positions of the infrared detection elements constituting the infrared sensor 102*a* are different from one another, when viewed from the direction of rotation about the scan rotation axis S1 (or the scan rotation axis S3). Since the predetermined angle and details of the infrared sensor 102*a* are substantially the same as those described above in the fourth and fifth embodiments, descriptions thereof are not given hereinafter.

The infrared sensor 102*a* configured as described above makes it possible to substantially increase the number of pixels in the direction orthogonal to the scan rotation axis S1, as described above in the fourth embodiment and so on. That is, the infrared sensor 102*a* makes it possible to enhance the resolution in the direction orthogonal to the scan rotation axis S1, without increasing the actual number of infrared detection elements constituting the infrared sensor.

(Third Arrangement Example)

Figure 39A:
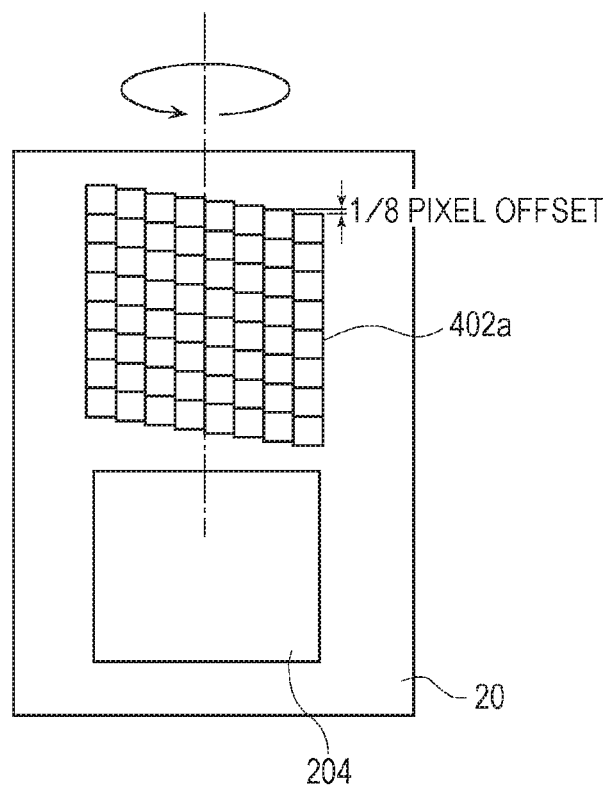
FIG. 39A is a schematic diagram illustrating one example of the arrangement of the infrared detection elements constituting the infrared sensor in the sixth embodiment.

For example, the infrared sensor 102 may be an infrared sensor 402*a* illustrated in FIG. 39A. That is, as illustrated in FIG. 39A, the infrared sensor 402*a* may be such that infrared detection elements are arranged in two or more columns in the arrangement direction of the infrared sensor 402*a* and the IC chip 204, and the two or more columns are offset from each other in the arrangement direction. In the example illustrated in FIG. 39A, the two or more columns in the infrared sensor 402*a* are offset from each other such that the column that is closer to a leading end in the direction of rotation about the scan rotation axis S1 (or the scan rotation axis S3) is closer to the IC chip 204. Alternatively, the two or more columns in the infrared sensor 402*a* may be offset from each other such that the column that is closer to the leading end in the direction of rotation about the scan rotation axis S1 (or the scan rotation axis S3) is farther from the IC chip 204. In the example illustrated in FIG. 39A, the infrared detection elements in 8 rows and 8 columns are arranged, and the infrared detection elements in the adjacent columns are offset by a 1/8 pixel.

Figure 39B:
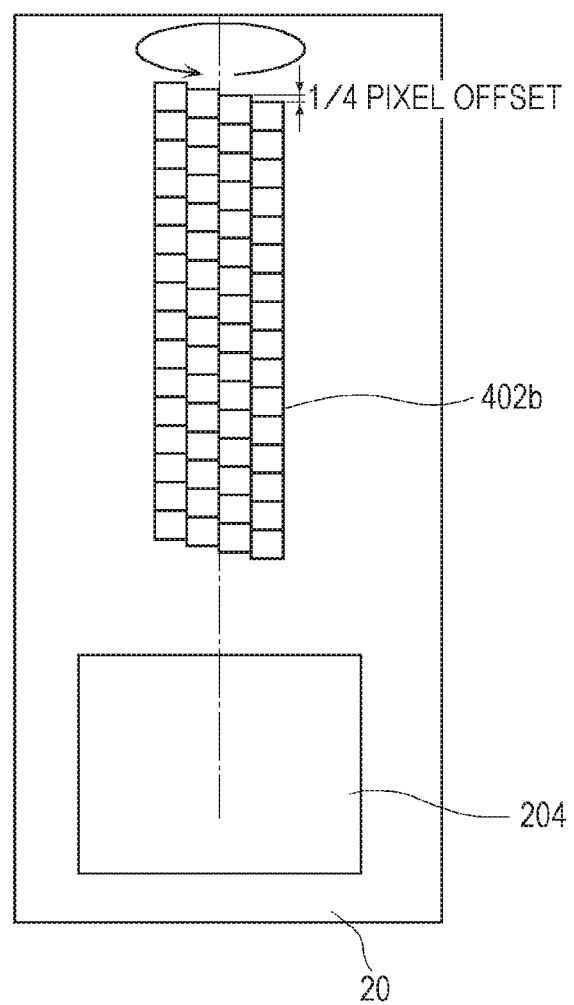
FIG. 39B is a schematic view illustrating one example of the arrangement of the infrared detection elements constituting the infrared sensor in the sixth embodiment.
Figure 39C:
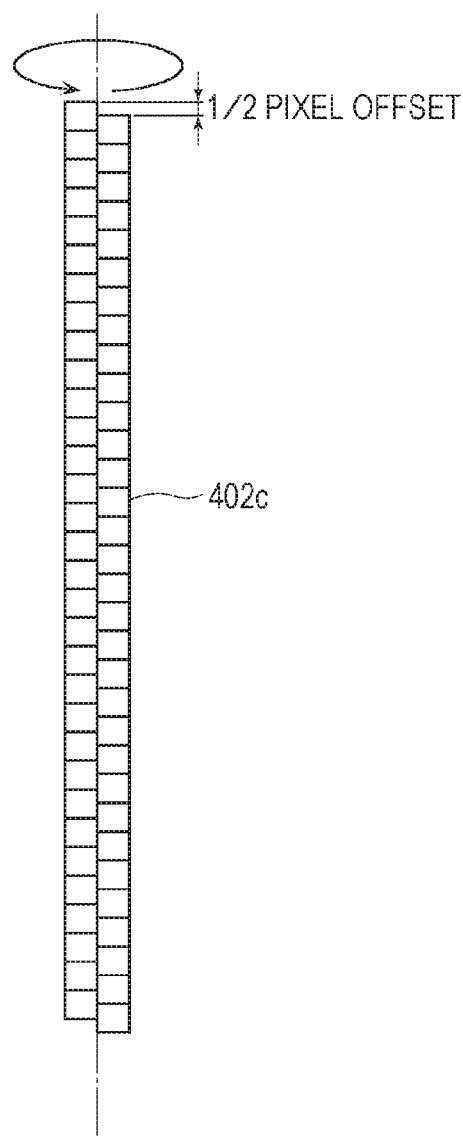
FIG. 39C is a schematic view illustrating one example of the arrangement of the infrared detection elements constituting the infrared sensor in the sixth embodiment.

An example in which the infrared detection elements in the adjacent columns are arranged offset from each other (pixel-offset arrangement) is not limited to the infrared sensor 402*a* illustrated in FIG. 39A. For example, the infrared sensor may be an infrared sensor 402*b* illustrated in FIG. 39B or may be an infrared sensor 402*c* illustrated in FIG. 39C. More specifically, as illustrated in FIG. 39B, in the infrared sensor 402*b*, infrared detection elements in 16 rows and 4 columns are arranged, and the infrared detection elements in the adjacent columns are offset from each other by a 1/4 pixel. Also, as illustrated in FIG. 39C, in the infrared sensor 402*c*, infrared detection element in 32 rows and 2 columns are arranged, and the infrared detection elements in the adjacent columns are offset from each other by a 1/2 pixel.

In the infrared sensor 402*a* and so on configured as described above, the number of pixels in the direction orthogonal to the scan rotation axis S1 (or the scan rotation axis S3) can be substantially increased, as described above in the second embodiment. That is, it is possible to enhance the resolution in the direction orthogonal to the scan rotation axis S1, without increasing the number of infrared detection elements constituting the infrared sensor.

(Fourth Arrangement Example)

Also, for example, as in the infrared sensor 202 and so on described above in the second embodiment and illustrated in FIGS. 7, 9, 10, and 11A to 15, the infrared sensor 102 may have a plurality of infrared detection elements arranged in one or more columns and be formed such that the horizontal edge of each of the infrared detection elements in each column, the horizontal edge being generally parallel to the bottom surface 42, has a smaller dimension as the infrared detection element is located closer to the bottom surface 42. Since details are substantially the same as those described above in the second embodiment, descriptions thereof are not given hereinafter.

According to the infrared sensor 202 and so on described above, even when the rotational speeds of the infrared detection elements in each row in the infrared sensor 202 whose central axis of the field of view is inclined relative to the scan rotation axis S1 are different from each other, the scan densities (resolutions) from the upper end to the lower end can be made equal to each other, as described above in the second embodiment. This offers an advantage in that distortion correction on the thermal images is not necessary.

[Advantages, Etc. of Sixth Embodiment]

As described above, according to the present embodiment, it is possible to realize the infrared detecting device 1B that can suppress influences of heat from the IC chip 204 during scanning.

The advantage of being able to suppress influences of heat from the IC chip 204 during scanning will now be described with reference to the accompanying drawings.

Figure 40A:
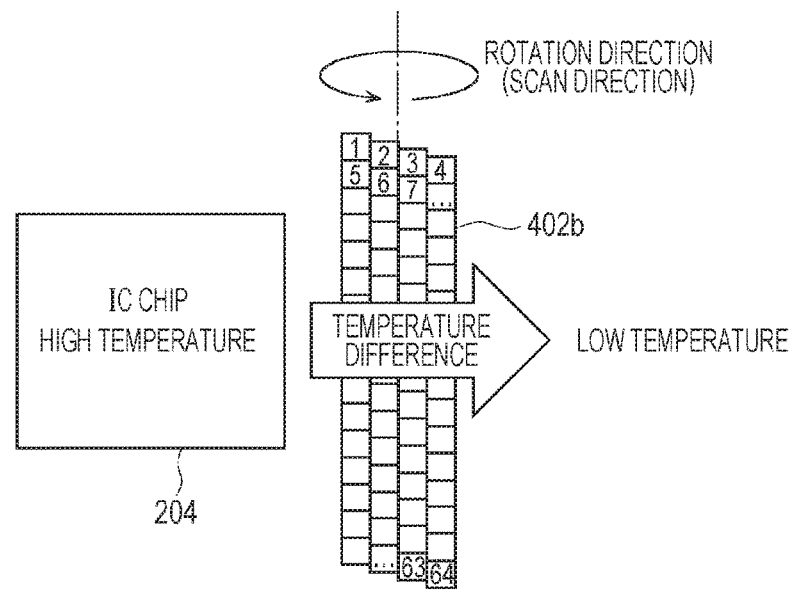
FIG. 40A is a schematic view for describing influences of heat from an IC chip during scanning in the comparative example.
Figure 40B:
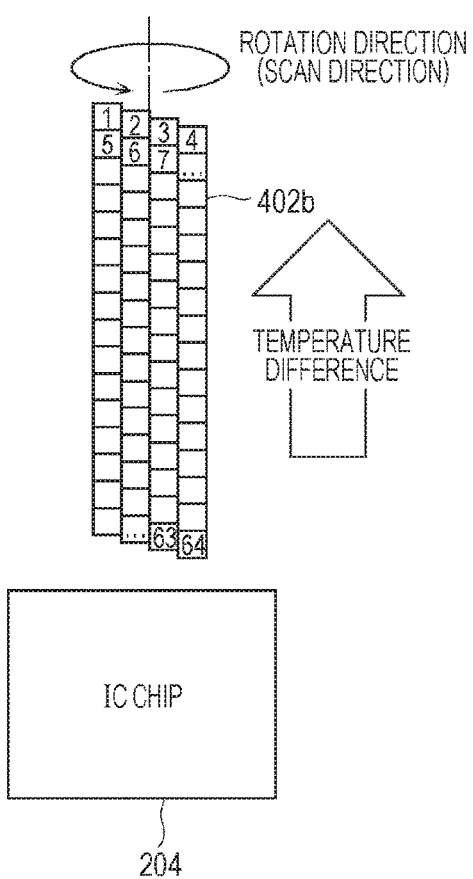
FIG. 40B is a schematic view for describing influences of heat from the IC chip during scanning in the infrared detecting device in the sixth embodiment.

FIG. 40A is a schematic view for describing influences of heat from the IC chip 204 during scanning in the comparative example. FIG. 40B is a schematic view for describing influences of heat from the IC chip 204 during scanning in the infrared detecting device in the present embodiment. In FIGS. 40A and 40B, a description will be given in conjunction with the infrared sensor 402*b* illustrated in FIG. 39B, since the same can be true for the (oblique) infrared sensor 102*a* having an inclination like that described above in FIG. 38 and for the infrared sensor 402*a* (in the pixel-offset arrangement) and so on in which the infrared detection elements in the adjacent columns are offset from each other like that described above in FIGS. 39A to 39C. In FIGS. 40A and 40B, the infrared detection elements constituting the infrared sensor 402*b* are assigned numbers (1, 2, 3, 4, 5, 6, 7, 8, . . . , 63, and 64) sequentially from the top.

For example, the IC chip 204, which is an ASIC, generates heat. In the arrangement of the IC chip 204 and the infrared sensor 402*b* in the comparative example illustrated in FIG. 40A, a temperature difference occurs toward the direction of rotation about the scan rotation axis (i.e., in the horizontal direction in FIG. 40A). Consequently, there is a problem in that, when a thermal image is acquired using the infrared sensor 402*b* (described above and illustrated in FIG. 39B) in which the pixels in the adjacent columns are offset from each other and is subjected to the super resolution processing, lateral-stripe noise occurs in a thermal image that has been subjected to the super resolution processing. For example, whereas the temperature of an infrared detection element with number 4 is low, the temperature of an infrared detection element with number 5 becomes high, and thus a temperature difference occurs therebetween. That is, a temperature difference occurs between the infrared detection elements with adjacent numbers. When such a temperature difference occurs in a lateral direction (i.e., the rotation direction and the scan direction), an unfavorable processing result due to, for example, generation of lateral-stripe noise, such as a jagged pattern, is output when the super resolution processing is performed.

On the other hand, in the arrangement of the IC chip 204 and the infrared sensor 402b in the present embodiment illustrated in FIG. 40B, a temperature difference occurs in the direction along the scan rotation axis (i.e., in the vertical direction in FIG. 40B). In this case, since the temperatures of the infrared detection elements increase in the order of numbers 1, 2, 3, . . . , 63, and 64, the temperature difference between the infrared detection elements with the adjacent numbers becomes small. Accordingly, even when the super resolution processing is performed on an acquired thermal image, it is possible to suppress lateral-stripe noise that occurs in the thermal image that has been subjected to the super resolution processing. That is, the infrared detecting device in the present embodiment can suppress influences of heat from the IC chip 204 during scanning.

FIG. 40B illustrates an example in which the IC chip 204 is disposed directly below the infrared sensor 402b. That is, FIG. 40B illustrates an example in which the angle θ (not illustrated) between the scan rotation axis and a line (hereinafter, a first line) that connects an approximate central position of the infrared sensor 402b and an approximate central position of the IC chip 204 is 0°. The present disclosure, however, is not limited to this example, and the infrared sensor 402b and the IC chip 204 may be generally juxtaposed in the direction along the scan rotation axis of the infrared sensor 402b. The expression "generally juxtaposed" as used herein refers to, for example, an arrangement in which the angle θ between the scan rotation axis and the first line satisfies −45°<θ<+45°. In other words, it is sufficient to have an arrangement that satisfies "the angle between the first line and the scan rotation axis"<"the angle between the first line and the direction orthogonal to the scan rotation axis". When the influences of the above-described temperature difference are considered, it is more desirable to satisfy −15°<θ<+15°.

In addition, for example, the infrared detector 20 may have temperature-measuring elements that are capable of detecting the temperatures on the infrared sensor 402b. Examples of the temperature measuring elements include thermistors and thermocouples. With such an arrangement, on the basis of output results of two or more thermistors 207, the IC chip 204 can perform correction processing on a signal output from the infrared sensor 402b and perform signal processing on the output signal on which the correction processing is performed. That is, the IC chip 204 corrects influences of heat from the IC chip 204 on the basis of output results of two or more thermistors 207 to thereby suppress the influences, thus making it possible to output a clearer thermal image. Hence, there is an advantage in that, even when the super resolution processing is performed subsequently, it is possible to acquire a thermal image having less lateral-stripe noise.

FIGS. 41A and 41B are schematic views illustrating examples of an arrangement of the thermistors 207 in the present embodiment. When the infrared detecting device 1B in the present embodiment uses two thermistors 207, for example, they are arranged as illustrated in FIG. 41A. For example, the two thermistors 207 are arranged at left side of the infrared detecting device 1B, as illustrated in FIG. 41A. Alternatively, the two thermistors 207 may be arranged at right side of the infrared detecting device 1B. Also, the two thermistors 207 are arranged along the scan rotation axis S1 (or the scan rotation axis S3). When the infrared detecting device 1B in the present embodiment uses six thermistors 207, for example, they are arranged as illustrated in FIG. 41B. As illustrated in FIG. 41B, for example, three thermistors 207 are arranged at left side of the infrared detecting device 1B and along the scan rotation axis S1 (or the scan rotation axis S3), and three thermistors 207 are arranged at right side of the infrared detecting device 1B and along the scan rotation axis S1 (or the scan rotation axis S3).

As described above, the infrared detecting device in the present embodiment includes an infrared sensor that has one or more infrared detection elements arranged in one or more columns and an IC chip that performs signal processing on a signal output from the infrared sensor, and the infrared sensor and the IC chip are generally juxtaposed in the direction along the scan rotation axis of the infrared sensor.

This can realize the infrared detecting device 1B that can suppress influences of heat from the IC chip 204 during scanning. Thus, the infrared detecting device 1B can acquire a clearer thermal image in which the amount of noise due to heat from the IC chip 204 is small.

Also, for example, the infrared detecting device 1B further includes a package main portion having one surface on which the infrared sensor and the IC chip are mounted.

For example, when the infrared sensor 102 or the like, which may be a sensor chip, and the IC chip 204, which may be an ASIC, are configured in a single package, a wiring line that connects the infrared sensor 102 or the like and the IC chip 204 can be shortened, and the signal-to-noise ratio (SNR) can be increased.

For example, the package main portion may have a package lid joined to the surface so as to surround the infrared sensor and the IC chip; the package lid may have, at a position that faces the infrared sensor, a window hole through which an infrared ray travels to the infrared sensor; and the window hole may be provided with a lens which guides infrared light to the infrared sensor.

In addition, for example, the infrared detecting device may further include a lens which guides infrared light to the infrared sensor. The lens may have an optical center through which the scan rotation axis passes, and the package main portion and the lens may be rotated about the scan rotation axis that passes through the optical center.

This allows the rotation center of the infrared sensor 102 or the like and the optical center of the lens 206 to substantially match each other, thus making it possible to clarify the boundary between a high-temperature area and a low-temperature area in a thermal image acquired by the infrared sensor 102 or the like. Meanwhile, the larger the displacement between the rotation center of the infrared sensor 102 or the like and the optical center of the lens 206 is, the less clear the boundary between the high-temperature area and the low-temperature area in the thermal image becomes. This is because, with a thermal image in which the boundary between a high-temperature area and a low-temperature area is not clear, objects, such as people, cannot be recognized with higher accuracy. Thus, this configuration allows objects, such as people, in a thermal image acquired by the infrared sensor 102 or the like to be recognized with higher accuracy.

For example, the infrared sensor may be rotated about the scan rotation axis to scan a detection range, and the one or more columns in the infrared sensor may be arranged so as to have an inclination at a predetermined angle relative to a direction of rotation about the scan rotation axis.

In this case, for example, the predetermined angle may be an angle adjusted such that all of the respective central positions of the infrared detection elements constituting the infrared sensor differ from one another, when viewed from a direction of rotation about the scan rotation axis center.

This makes it possible to enhance the resolution in the direction orthogonal to the scan rotation axis, without increasing the actual number of infrared detection elements constituting the infrared sensor 102 or the like.

For example, the infrared detection elements in the infrared sensor may be arranged in two or more columns in an arrangement direction of the infrared sensor and the IC chip, and the two or more columns may be offset from each other such that the column that is closer to a leading end in a direction of rotation about the scan rotation axis is closer to or farther from the IC chip.

For example, the infrared detecting device may further include two or more thermistors. The two or more thermistors may be arranged in proximity to the infrared sensor along the scan rotation axis, and based on an output result of the two or more thermistors, the IC chip may perform correction processing on a signal output from the infrared sensor and perform signal processing on the output signal on which the correction processing is performed.

Since this arrangement allows temperature correction on the thermal image to be performed using the thermistors, it is possible to acquire a clearer thermal image having less noise.

For example, the infrared detecting device may be attached to a housing installed on an installation surface that is generally orthogonal to a bottom surface of space and that is located at a predetermined height from the bottom surface, and an arrangement plane of the one or more infrared detection elements may be arranged so as to have an inclination relative to the installation surface.

For example, the scan rotation axis may be generally parallel to the installation surface, and the arrangement plane may intersect the scan rotation axis.

This arrangement makes it possible to increase the detection range in the area near and below the position where the infrared detecting device 1B is disposed.

For example, the scan rotation axis and the arrangement plane may be provided so as to have the above-described inclination relative to the installation surface, and the arrangement plane may be generally parallel to the scan rotation axis.

With such an arrangement, when the infrared sensor 102 or the like is rotated about the scan rotation axis, the rotational speed (the rotational pitch) at the upper end and the rotational speed at the lower end, viewed from the bottom surface of the infrared sensor, become equal to each other, thus making the distortion correction unnecessary. Since it is not necessary to perform the distortion correction, the amount of memory used and the amount of computational load can be further reduced.

Although the infrared detecting devices according to one or more aspects of the present disclosure have been described above based on the embodiments, the present disclosure is not limited to the embodiments. Modes obtained by applying various modifications conceived by those skilled in the art to the embodiments or modes constituted by combining constituent elements in different embodiments may also be encompassed by the scope of one or more aspects of the present disclosure, as long as such modes do not depart from the subject matter of the present disclosure. For example, the present disclosure also encompasses cases as described below.

Figure 42A:
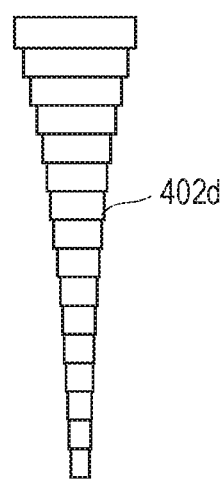
FIG. 42A illustrates one example of the shape of the infrared detection elements constituting the infrared sensor.
Figure 42B:
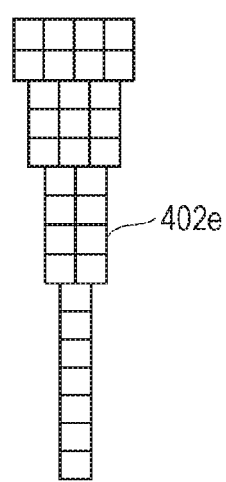
FIG. 42B illustrates one example of the shape of the infrared detection elements constituting the infrared sensor.

(1) FIGS. 42A and 42B illustrate examples of the shape of the infrared detection elements constituting the infrared sensor. For example, although described above in the second embodiment with reference to FIG. 14 and so on, the infrared sensor in one aspect of the present disclosure may be an infrared sensor 402*d* configured with a plurality of infrared detection elements whose dimensions are each gradually reduced, as illustrated in FIG. 42A. Also, the infrared sensor in one aspect of the present disclosure may be an infrared sensor 402*e* illustrated in FIG. 42B. More specifically, the infrared sensor 402*e* may be such that infrared detection elements in two or more columns are arranged in the arrangement direction of the infrared sensor 402*e* and the IC chip 204 (not illustrated), and the number of two or more columns decreases for every same or different number of rows, as the distance to one end in the arrangement direction of the infrared sensor 402*e* and the IC chip 204 decreases. That is, the number of infrared detection elements in each row illustrated in FIG. 42B may decrease, as the distance of the row to the IC chip 204 decreases. Alternatively, the number of infrared detection elements in each row may decrease, as the distance of the row to the IC chip 204 increases.

(2) In the above-described embodiments and so on, the angles, the size, and so on of each infrared sensor have been described as examples, and they are not limited to the examples. Even when the infrared sensor has angles, a size, and so on that do not conform to those described above, it is also encompassed by the scope of the present disclosure, as long as the same or similar effects are obtained.

(3) Each device described above may be, specifically, a computer system including a microprocessor, a read-only memory (ROM), a random-access memory (RAM), a hard disk unit, a display unit, a keyboard, a mouse, and so on. A computer program is stored in the RAM or the hard disk unit. The microprocessor operates in accordance with the computer program, so that each device realizes its functions. The computer program in this case is made of a combination of a plurality of instruction codes for giving instructions to a computer in order to achieve a predetermined function.

(4) Some or all of the constituent elements included in each device described above may be implemented by one system large-scale-integrated (LSI) circuit. The system LSI is a super-multifunctional LSI manufactured by integrating a plurality of constituent elements on one chip and is, specifically, a computer system including a microprocessor, a ROM, a RAM, and so on. The computer program is stored in the RAM. The microprocessor operates in accordance with the computer program, so that the system LSI realizes its functions.

(5) Some or all of the constituent elements included in each device described above may be implemented by an integrated circuit (IC) card or a single module that can be inserted into and removed from the device. The IC card or the module may be a computer system including a microprocessor, a ROM, a RAM, and so on. The IC card or the module may include the aforementioned super-multifunctional LSI. The microprocessor operates in accordance with the computer program, so that the IC card or the module realizes its functions. The IC card or the module may be tamper-proof.

(6) The present disclosure may also be implemented by the methods described above. Those methods may also be realized by a computer program implemented by a computer or may be realized using digital signals provided by the computer program.

In the present disclosure, the computer program or the digital signals may be recorded on computer-readable recording media, for example, a flexible disk, a hard disk, a CD-ROM, a magneto-optical (MO) disk, a digital versatile disk (DVD), a DVD-ROM, a DVD-RAM, a Blu-Ray® Disc (BD), and a semiconductor memory. Those methods may also be realized by the digital signals recorded on the recording media.

Additionally, in the present disclosure, the computer program or the digital signals may be transmitted over a telecommunication channel, a wireless or wired communication channel, a network typified by the Internet, data broadcasting, or the like.

Moreover, the present disclosure may be realized by a computer system including a microprocessor and a memory, the memory may store the computer program, and the microprocessor may operate in accordance with the computer program.

The present disclosure may also be implemented by another independent computer system by transporting the recording medium on which the program or the digital signals are recorded or transferring the program or the digital signals over the network or the like.

(7) The above-described embodiments and the modifications may also be combined together.

The present disclosure can be applied to an infrared detecting device for acquiring high-resolution thermal images and can be particularly applied to an infrared detecting device attached to other equipment, such as air-conditioning equipment, as a module and used for controlling the equipment.

What is claimed is:

1. An infrared detecting device comprising:
   an infrared sensor that has two or more infrared detection elements arranged in two or more columns; and
   an integrated circuit (IC) chip that performs signal processing on a signal output from the infrared sensor,
   wherein a position of a first infrared detection element in a first column in the two or more columns is offset from a second infrared detection element in a second column which is a column adjacent to the first column by 1/n of a dimension of a vertical edge of the second infrared detection element in the second column, the vertical edge being generally orthogonal to a bottom surface,
   wherein n is an integer equal to or larger than two, and
   wherein the infrared sensor and the IC chip are generally juxtaposed in a direction along a scan rotation axis of the infrared sensor.

2. The infrared detecting device according to claim 1, further comprising:
   a package main portion having one surface on which the infrared sensor and the IC chip are mounted.

3. The infrared detecting device according to claim 2,
   wherein the package main portion has a package lid joined to the surface so as to surround the infrared sensor and the IC chip;
   the package lid has, at a position that faces the infrared sensor, a window hole through which an infrared ray travels to the infrared sensor; and
   the window hole is provided with a lens which guides infrared light to the infrared sensor.

4. The infrared detecting device according to claim 1,
   wherein the infrared detection elements in the infrared sensor are arranged in the two or more columns in an arrangement direction of the infrared sensor and the IC chip; and
   the two or more columns are offset from each other such that a column that is closer to a leading end in a direction of rotation about the scan rotation axis is closer to or farther from the IC chip.

5. The infrared detecting device according to claim 1, further comprising:
   two or more thermistors,
   wherein the two or more thermistors are arranged in proximity to the infrared sensor along the scan rotation axis; and
   based on an output result of the two or more thermistors, the IC chip performs correction processing on a signal output from the infrared sensor and performs signal processing on the output signal on which the correction processing is performed.

6. The infrared detecting device according to claim 1,
   wherein positions of the topmost infrared detection elements in the two or more columns, viewed from the bottom surface, are sequentially offset toward the bottom surface.

7. The infrared detecting device according to claim 1,
   wherein the first infrared detection element in the first column in the two or more columns is the topmost infrared detection element in the first column,
   wherein the second infrared detection element in the second column in the two or more columns is the topmost infrared detection element in the second column, and
   wherein n is the number of the two or more columns.

* * * * *